US008103108B2

(12) United States Patent
Morimoto et al.

(10) Patent No.: US 8,103,108 B2
(45) Date of Patent: Jan. 24, 2012

(54) IMAGE PROCESSING APPARATUS, IMAGE FORMING APPARATUS, IMAGE PROCESSING SYSTEM, AND IMAGE PROCESSING METHOD

(75) Inventors: Atsuhisa Morimoto, Nara (JP); Masakazu Ohira, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 939 days.

(21) Appl. No.: 12/111,739

(22) Filed: Apr. 29, 2008

(65) Prior Publication Data

US 2008/0292189 A1   Nov. 27, 2008

(30) Foreign Application Priority Data

May 1, 2007   (JP) .................................. 2007-121115
Mar. 26, 2008   (JP) .................................. 2008-081663

(51) Int. Cl.
*G06K 9/68*   (2006.01)
*G06K 9/00*   (2006.01)

(52) U.S. Cl. ........ 382/219; 382/100; 382/181; 382/190; 382/223

(58) Field of Classification Search .................. 382/100, 382/181, 190–223
See application file for complete search history.

(56) References Cited

U.S. PATENT DOCUMENTS

| 5,799,115 | A | 8/1998 | Asano et al. | |
| 2003/0072491 | A1* | 4/2003 | Sirivara et al. | 382/220 |
| 2004/0220898 | A1* | 11/2004 | Eguchi et al. | 707/1 |

FOREIGN PATENT DOCUMENTS

| JP | 05-110815 A | 4/1993 |
| JP | 7-74945 | 3/1995 |
| JP | 8-255236 A | 10/1996 |
| JP | 10-210285 A | 8/1998 |
| JP | 11-284847 A | 10/1999 |
| JP | 2002-232707 A | 8/2002 |
| WO | WO-2006/092957 A1 | 9/2006 |

* cited by examiner

*Primary Examiner* — Wesley Tucker
(74) *Attorney, Agent, or Firm* — Birch, Stewart, Kolasch & Birch, LLP

(57) ABSTRACT

An image processing apparatus includes: a data obtaining section for obtaining input image data; a memory in which reference image data or features of a reference image is stored; and a similarity determination process section for performing a determination process in which it is determined whether the input image data is image data corresponding to the reference image or not. The similarity determination process section changes the determination process in accordance with related information of the input image data. Consequently, it is possible to realize an image processing apparatus capable of determining a similarity between input image data and a reference image and restricting a process on the input image data in accordance with the result of the determination.

26 Claims, 30 Drawing Sheets

| -3 | -2 | -1 | 1 | -1 | -2 | -3 |
|---|---|---|---|---|---|---|
| -2 | -2 | 1 | 4 | 1 | -2 | -2 |
| -1 | 1 | 8 | 15 | 8 | 1 | -1 |
| 1 | 5 | 16 | 25 | 16 | 5 | 1 |
| -1 | 1 | 8 | 15 | 8 | 1 | -1 |
| -2 | -2 | 1 | 4 | 1 | -2 | -2 |
| -3 | -2 | -1 | 1 | -1 | -2 | -3 |

FIG. 10 (a)

| HASH VALUE | INDEX INDICATIVE OF DOCUMENT |
|---|---|
| H1 | ID1 |
| H2 | ID1 |
| H3 | ID1、ID2 |
| H4 | ID1 |
| H5 | ID1 |
| H6 | ID1、ID2 |
| ⋮ | ⋮ |

FIG. 10 (b)

| HASH VALUE | INDEX INDICATIVE OF DOCUMENT |
|---|---|
| H1 | ID1、ID1 |
| H2 | ID1 |
| H3 | ID1、ID2 |
| H4 | ID1 |
| H6 | ID1、ID2 |
| ⋮ | ⋮ |

FIG. 14

|  | PROCESS CONDITION | COEFFICIENT |
|---|---|---|
| USER ID | USER 1 | $\alpha(1)$ |
|  | USER 2 | $\alpha(2)$ |
|  | ... | ... |
|  | USER m | $\alpha(m)$ |
| TIME | TIME ZONE 1 | $\beta(1)$ |
|  | TIME ZONE 2 | $\beta(2)$ |
|  | ... | ... |
|  | TIME ZONE n | $\beta(n)$ |
| PROCESS MODE | PROCESS MODE 1 | $\gamma(1)$ |
|  | PROCESS MODE 2 | $\gamma(2)$ |
|  | ... | ... |
|  | PROCESS MODE p | $\gamma(p)$ |

FIG. 16

No. X
DATE : DAY X, MONTH X, AND YEAR X
IMAGE FORMING APPARATUS : A
SETTING LOCATION : AA

| DOCUMENT ID | SIMILARITY | USER ID | NUMBER OF SHEETS TO BE PROCESSED | PROCESS MODE | REMARKS |
|---|---|---|---|---|---|
| ID1 | 0.6 | A1 | A2 | A3 | |

No. Y
DATE : DAY X, MONTH X, AND YEAR X
IMAGE FORMING APPARATUS : B
SETTING LOCATION : BB

| DOCUMENT ID | SIMILARITY | USER ID | NUMBER OF SHEETS TO BE PROCESSED | PROCESS MODE | REMARKS |
|---|---|---|---|---|---|
| ID2 | 0.7 | B1 | B2 | B3 | ERROR |

( COMPLETE )

FIG. 31

| ITEM(i) | CONTENTS OF ITEM | EVALUATED VALUE x(i) | REFERENCE EVALUATED VALUE xref(i) |
|---|---|---|---|
| USER(i=1) | USER GROUP A | a1 | aref |
| | USER GROUP B | a2 | |
| | USER GROUP C | a3 | |
| | USER GROUP D | a4 | |
| TIME ZONE(i=2) | TIME ZONE 1 | b1 | bref |
| | TIME ZONE 2 | b2 | |
| | TIME ZONE 3 | b3 | |
| | TIME ZONE 4 | b4 | |
| PROCESS MODE(i=3) | PROCESS MODE 1 | c1 | cref |
| | PROCESS MODE 2 | c2 | |
| | PROCESS MODE 3 | c3 | |
| | PROCESS MODE 4 | c4 | |

IMAGE PROCESSING APPARATUS, IMAGE FORMING APPARATUS, IMAGE PROCESSING SYSTEM, AND IMAGE PROCESSING METHOD

This non-provisional application claims priority under 35 U.S.C. §119(a) on Patent Application No. 2007-121115 filed in Japan on May 1, 2007 and Patent Application No. 2008-81663 filed in Japan on Mar. 26, 2008, the entire contents of which are hereby incorporated by reference.

FIELD OF THE INVENTION

The present invention relates to an image processing apparatus, an image forming apparatus, an image processing system, and an image processing method, each of which allows similarity determination between input image data and preliminarily stored image data and allows a control according to the result of the similarity determination.

BACKGROUND OF THE INVENTION

There has been used a technique for comparing (i) input image data obtained by reading a document image with a scanner and (ii) a preliminarily stored image, so as to determine a similarity between the input image data and the preliminarily stored image, and controlling a process (such as copy, transmission, and edition) to the input image data in accordance with the result of the determination.

Examples of a method for determining a similarity include: a method in which a keyword is extracted from an image with OCR (Optical Character Reader) so as to carry out matching with the keyword; a method in which a target image is limited to an image with ruled lines and matching is carried out based on features of the ruled lines (see Patent Document 1 (Japanese Unexamined Patent Publication No. Tokukaihei 8-255236 (published on Oct. 1, 1996))); and a method in which a similarity is determined based on distribution of color components of input image data and a reference image (see Patent Document 2 (Japanese Unexamined Patent Publication No. Tokukaihei 5-110815 (published on Apr. 30, 1993))). Furthermore, Patent Document 3 (International Publication No. 2006/092957, pamphlet (published on Sep. 8, 2006) discloses a technique in which plural feature points are extracted from a digital image, a set of local feature points are determined out of the extracted feature points, a partial set of feature points is selected out of the determined set of local feature points, invariants relative to geometric transformation each as a value characterizing the selected partial set is calculated in accordance with plural combinations of feature points in the partial set, features are calculated by combining the calculated invariants, and a document or an image with the calculated features in a database is voted for, thereby searching a document or an image corresponding to the digital image.

Furthermore, an example of a technique for controlling a process for input image data in accordance with the result of similarity determination is as follows: in order to prevent forgery of paper currency or stock certificate by a color image forming apparatus, it is determined whether input image data is identical with image data such as paper currency or stock certificate (reference image) or not based on a pattern extracted from the input image data, and when the input image data is identical with the image data of the reference image, a specific pattern is given to an output image so as to specify the image forming apparatus that carries out copying, a copied image is daubed, or copying is prevented.

Furthermore, Patent Document 4 (Japanese Unexamined Patent Publication No. Tokukaihei 11-284847 (published on Oct. 15, 1999)) discloses a technique in which it is determined whether input image data is identical with a reference image (specific image) or not, and when it is determined that the input image data is identical with the reference image, a notification that the input image data is identical with the reference image is sent to an apparatus administrator, thereby preventing a normal copy output of the reference image. Furthermore, Patent Document 4 discloses that, when the apparatus administrator finds that the input image data is not identical with the reference image after receiving the notification, the apparatus administrator changes a determination level for determining the reference image.

Furthermore, Patent Document 5 (Japanese Unexamined Patent Publication No. Tokukai 2002-232707 (published on Aug. 16, 2002)) discloses a technique in which it is determined whether input image data is identical with image data of a document (reference image) such as paper currency or not, and when it is determined that the input image data is identical with the image data of the reference image, an image forming function is restricted so as not to perform a normal image formation, and (i) information that the reference image is tried to be printed and (ii) circumstance information indicative of a detailed circumstance where the reference image is tried to be printed (such as date, the number of sheets tried to be printed, scaling, an image tried to be printed, a log for a recognition process, and a partial image recognized as being illegal) are sent to other apparatus. Furthermore, Patent Document 5 discloses that, when the log for the recognition process and the partial image recognized as being illegal are sent as the circumstance information, these information is encrypted before being sent.

In an image processing apparatus for determining whether input image data is identical with image data of a reference image or not (determining a similarity between an input image and a reference image), limitation of accuracy in reading an image etc. may result in erroneous determination depending on conditions under which the image is read.

For that reason, in order to ensure higher security, it is possible to set a small threshold value for a similarity at which input image data is determined as being identical with a reference image. However, in that case, there is a higher possibility that input image data that is not identical with image data of a reference image is erroneously determined as being identical with the image data of the reference image. This may result in restriction of a process on input image data that is not to be restricted in fact, or may result in frequent notification to the administrator due to erroneous determination, increasing a workload on the administrator. Thus, a convenience for the user or the administrator drops.

On the other hand, when the threshold value is set to be large, there is a higher possibility that input image data that is identical with image data of a reference image is erroneously determined as not being identical with the image data of the reference image, which results in problems such as lower security.

Therefore, it is necessary to set the threshold value depending on which of security and convenience is considered as being more important.

Which of security and convenience is considered as being more important may vary according to a circumstance condition of input image data (such as user, date, day of the week, time (time zone), a process mode, the amount of data to be processed, and whether image data with a specific hue is included or not).

For example, there is a case where convenience is considered as being important for a user satisfying a predetermined condition (e.g. a user belonging to a specific department in a corporation, a preliminarily stored user) whereas security is considered as being important for a user not satisfying the predetermined condition, so as to prevent an unspecified user from performing a process on an image that may be identical with a reference image, thereby preventing illegal use of the reference image or leakage of the reference image.

Further, there is a case where convenience is considered as being important at a predetermined date, a predetermined day of the week, or a predetermined time (e.g. normal working day, normal working time, preset date, preset day of the week, and preset time in a corporation) whereas security is considered as being important at date, day of the week, or time other than the predetermined date, the predetermined day of the week, or the predetermined time (e.g. holiday and nighttime), so as to limit date, day of the week, or time at which an image that may be identical with a reference image can be processed, thereby preventing use or leakage of the reference image.

Further, there is a case where security is considered as being important for a predetermined process mode (e.g. transmission to network, copy, printing) whereas convenience is considered as being important for a process other than the predetermined process mode, so as to limit a process mode that can be carried out for an image that may be identical with a reference image, thereby preventing illegal use or leakage of the reference image.

Further, there is a case where convenience is considered as being important for data with not more than a predetermined amount (e.g. predetermined number of documents, predetermined number of customer information) whereas security is considered as being important for data with more than the predetermined amount, so as to limit the amount of data that can be processed with respect to an image that may be identical with a reference image, thereby preventing a large amount of leakage of the reference image.

Further, a confidential document is often stamped with characters such as "confidential" written in a predetermined color such as red or blue. Therefore, there is a case where security is considered as being important when input image data includes a predetermined color image. Whereas, there is a case where convenience is considered as being important when input image data does not include the predetermined color image.

However, in the techniques of Patent Documents 1 to 5, determination for a similarity between an input image and a reference image is always performed on the same reference (the same threshold value), and as a result it is impossible to perform a similarity determination process according to a circumstance condition for input image data.

SUMMARY OF THE INVENTION

The present invention was made in view of the foregoing problems. An object of the present invention is to provide an image processing apparatus for determining whether input image data is identical with image data of a reference image and for performing a process according to the result of the determination, the image processing apparatus performing a determination process in accordance with related information of the input image data.

In order to achieve the foregoing object, the image processing apparatus of the present invention is an image processing apparatus, including: an input data obtaining section for obtaining input image data; a features extracting section for extracting features of the input image data; at least one of a storage section in which features of a reference image are stored and a reference image obtaining section for obtaining features of a reference image from an external apparatus communicably connected with the image processing apparatus; and a similarity determination section for comparing the features of the input image data with the features of the reference image so as to perform a determination process in which it is determined whether the input image data is image data corresponding to the reference image or not, the similarity determination section changing the determination process in accordance with related information of the input image data. The input data obtaining section may obtain the input image data by reading a document image, or may obtain the input image data via communications from other apparatus that are communicably connected with the image processing apparatus, or may obtain the input image data by superposing information input by a user on a pre-specified format.

With the arrangement, the image processing apparatus includes: the input data obtaining section for obtaining input image data; the features extracting section for extracting features of the input image data; at least one of the storage section in which features of a reference image are stored and the reference image obtaining section for obtaining features of a reference image from an external apparatus communicably connected with the image processing apparatus; and the similarity determination section for comparing the features of the input image data with the features of the reference image so as to perform a determination process in which it is determined whether the input image data is image data corresponding to the reference image or not. Further, the similarity determination section changes the determination process in accordance with related information of the input image data. Therefore, with the arrangement, it is possible to perform the determination process in accordance with the related information of the input image data.

For a fuller understanding of the nature and advantages of the invention, reference should be made to the ensuing detailed description taken in conjunction with the accompanying drawings.

BRIEF DESCRIPTION OF THE DRAWINGS

FIGS. 10(a) and 10(b) are explanatory drawings each illustrating an example of a hash value regarding a feature point stored in a hash table and an index indicative of input image data.

FIG. 14 is an explanatory drawing illustrating examples of coefficients that are stored in a memory of the image processing apparatus in FIG. 13 and that are preset with respect to each user, each time zone, and each process mode.

FIG. 16 is an explanatory drawing illustrating an example of information notified from the image processing apparatus in FIG. 13 to an administrator in a case where a process on a reference image is requested.

FIG. 31 is an explanatory drawing illustrating examples of evaluated values and reference evaluated values used in the image processing apparatus in FIG. 29.

DESCRIPTION OF THE EMBODIMENTS

Embodiment 1

An embodiment of the present invention is explained below. Explained in this embodiment is a case where the present invention is applied to a digital color multi-function printer (MFP).

(1-1. Arrangement of Digital Color Multi-Function Printer 1)

Figure 2:
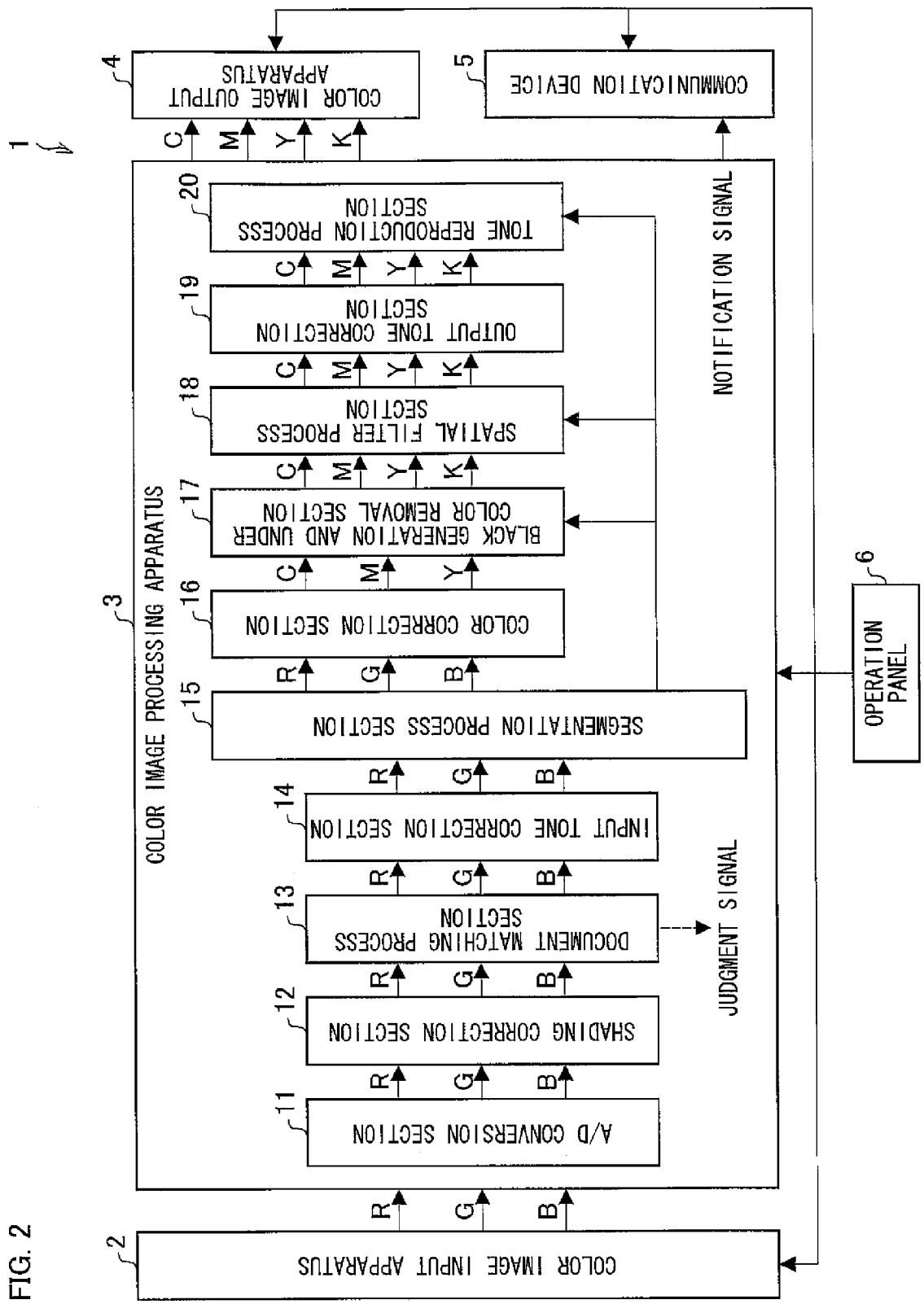
FIG. 2 is a block diagram schematically illustrating a structure of an image processing apparatus in accordance with an embodiment of the present invention.

FIG. 2 is a block diagram schematically illustrating an arrangement of a digital color multi-function printer (image processing apparatus, image forming apparatus, image reading apparatus) 1 according to the present embodiment. The digital color multi-function printer 1 has a copying function, a printing function, a facsimile-transmission function, a scanning function, a scan-to-E-mail function, and the like.

As illustrated in FIG. 2, the digital color multi-function printer 1 includes a color image input apparatus 2, a color image processing apparatus 3, a color image output apparatus 4, a communication device 5, and an operation panel 6.

The color image input apparatus (image reading apparatus) 2 is, for example, composed of a scanner (not shown) including a CCD (Charge Coupled Device) for converting optical information into an electric signal. The color image input apparatus 2 reads an optical image reflected from an original document as RGB (R: Red, G: Green, B: Blue) analog signals and supplies the RGB analog signals to the color image processing apparatus 3.

The color image processing apparatus 3 includes an A/D converter 11, a shading correction section 12, a document matching process section 13, an input tone correction section 14, a segmentation process section 15, a color correction section 16, a black generation and under color removal section 17, a spatial filter process section 18, an output tone correction section 19, and a tone reproduction process section 20. The analog signals read by the color image input apparatus 2 are transmitted to the A/D converter 11, the shading correction section 12, the document matching process section 13, the input tone correction section 14, the segmentation process section 15, the color correction section 16, the black generation and under color removal section 17, the spatial filter process section 18, the output tone correction section 19, and the tone reproduction process section 20 in this order in the color image processing apparatus 3. Ultimately, the analog signals are outputted to the color image output apparatus 4 as CMYK digital color signals.

The A/D (Analog/Digital) converter 11 converts the RGB analog signals into RGB digital signals.

The shading correction section 12 removes various distortions produced in an illumination system, an image focusing system, and an image sensing system of the color image input apparatus 2 from the RGB digital signals transmitted from the A/D converter 11. Moreover, the shading correction section 12 adjusts color balance of the RGB digital signals and converts each signal into a signal such as a density signal which can be processed easily by an image processing system used in the color image processing apparatus 3.

The document matching process section 13 gives determination on a similarity between input image data and a reference image (determines whether there is any similarity or not). Further, the document matching process section 13 outputs the inputted RGB signals to the subsequent input tone correction section 14 without any modification. Note that, the document matching process section 13 will be detailed later.

The input tone correction section 14 removes background color (density component of the background: background density) from the RGB signals whose various distortions have been removed by the shading correction section 12, and adjusts image quality such as contrast.

The segmentation process section 15 separates each pixel of an input image into either one of a text region, a halftone dot region, or a photograph (continuous tone) region, according to the KGB signals. On the basis of a result of the separation, the segmentation process section 15 outputs a segmentation class signal, indicating which region a pixel of the input image belongs to, to the color correction section 16, the black generation and under color removal section 17, the spatial filter process section 18, and the tone reproduction process section 20. The segmentation process section 15 also outputs the input signal as received from the input tone correction section 14 to the subsequent color correction section 16 without any modification.

The color correction section 16 removes color impurity on the basis of spectral characteristics of CMY (C: Cyan, M: Magenta, and Y: Yellow) color materials including an unnecessarily absorption component, in order to realize a faithful color reproduction.

The black generation and under color removal section 17 performs (i) black generation processing for generating a black (K) signal from three color (CMY) signals after the color correction processing and (ii) generation processing of new CMY signals by removing the K signal obtained by the black generation processing from the original CMY signals. As a result, the three CMY signals are converted into four CMYK signals.

With the use of a digital filter, the spatial filter process section 18 performs a spatial filter processing on the basis of a segmentation class signal, with respect to the image data which is received in the form of the CMYK signals from the black generation and under color removal section 17. In the spatial filter processing, the spatial filter process section 18 corrects a spatial frequency characteristic, so as to reduce blur or granularity deterioration in an output image. The tone reproduction process section 20, as with the spatial filter process section 18, performs a predetermined process with respect to the image data in the form of the CMYK signals, on the basis of the segmentation class signal.

For example, in the region separated into a text region by the segmentation process section 15, the spatial filter process section 18 strongly emphasizes a high frequency component in an edge enhancement process of a spatial filter process, in order to improve reproducibility of a black text or a color text especially. Concurrently, the tone reproduction process section 20 selects either binary processing or multi-level dithering on a high-resolution screen suitable for reproducing the high frequency component.

In the region separated into a halftone dot region by the segmentation process section 15, the spatial filter process section 18 performs a low pass filter processing for removing an input halftone dot component. The output tone correction section 19 performs the output tone correction processing in which a signal such as a density signal is converted into a halftone dot area rate that is characteristics of the color image output apparatus 4. Subsequently, the tone reproduction process section 20 performs the tone reproduction processing (half tone generation) so that, ultimately, an image is segmented into pixels and each tone of the pixels can be reproduced. In the region separated into a photograph region by the segmentation process section 15, the binary processing or the multi-value processing is performed on a screen suitable for tone reproduction.

The image data which has been subjected to each of the processing mentioned above is temporarily stored in a storage device (not shown). The image data is read from the storage device at a predetermined timing and supplied to the color image output apparatus 4.

The color image output apparatus 4 outputs the image data supplied from the color image processing apparatus 3 to a recording medium such as paper. The color image output apparatus 4 is not particularly limited and may be a color image output apparatus which uses an electrophotographic method or an ink-jet method.

The communication device 5 is composed of a modem or a network card for example. The communication device 5 communicates with other apparatus connected to a network (e.g., a personal computer, a server device, other digital multi-function printer, a facsimile device, and the like) via a network card, a LAN cable, and the like.

Note that, in case of transmitting image data, the communication device 5 carries out a transmission procedure to secure a state where transmission can be performed, and then reads out, from a memory, the image data compressed in a predetermined format (image data scanned by a scanner) and carries out necessary processing such as change of the encoding format so as to sequentially transmit the image data via a communication line.

Further, in case of receiving image data, the communication device 5 carries out a communication procedure and receives the image data from a transmission end so as to input the image data to the color image processing apparatus 3. The received image data is subjected to a predetermined process such as a decoding process, a rotation process, a resolution conversion process, output tone correction, and a tone reproduction process by the color image processing apparatus 3, and the image data thus processed is outputted by the color image output apparatus 4. Note that, the present invention may be arranged so that the received image data is stored in a storage device (not shown) and the stored image data is read out by the color image processing apparatus 3 as necessary so as to be subjected to the aforementioned processing.

The operation panel 6 includes, for example, a display section (not shown) such as a liquid crystal display and setting buttons (not shown). The operation panel 6 causes the display section to display information corresponding to an instruction of a main control section (not shown) of the digital color multi-function printer 1 and transmits information, inputted by the user with use of the setting buttons, to the main control section. The user can input, via the operation panel 6, a processing request (e.g., a processing mode (copy, printing, transmission, editing and the like), the number of images to be processed (the number of images to be copied, the number of images to be printed), a destination of input image data, and the like) with respect to the image data. The main control section is composed of a CPU (Central Processing Unit) and the like for example. In accordance with a program or various data stored in a ROM (not shown) or the like and information which is entered via the operation panel 6, the main control section controls each operation of each section of the digital color multi-function printer 1.

(1-2 Document Matching Process Section 13)

Next explained is the document matching process section 13 in detail. The document matching process section 13 according to the present embodiment extracts plural feature points from the input image data, determines a set of local feature points relative to each of the extracted feature points, selects a partial set of feature points out of the determined set of local feature points, calculates invariants each of which is relative to geometric transformation as a value characterizing the selected partial set in accordance with plural combinations of feature points in the partial set, calculates a hash value by combining the calculated invariants, and votes for a reference image corresponding to the hash value, thereby retrieving a reference image similar to the input image data and carrying out a similarity determination process (whether there is any similarity or not) with respect to the reference image.

Figure 1:
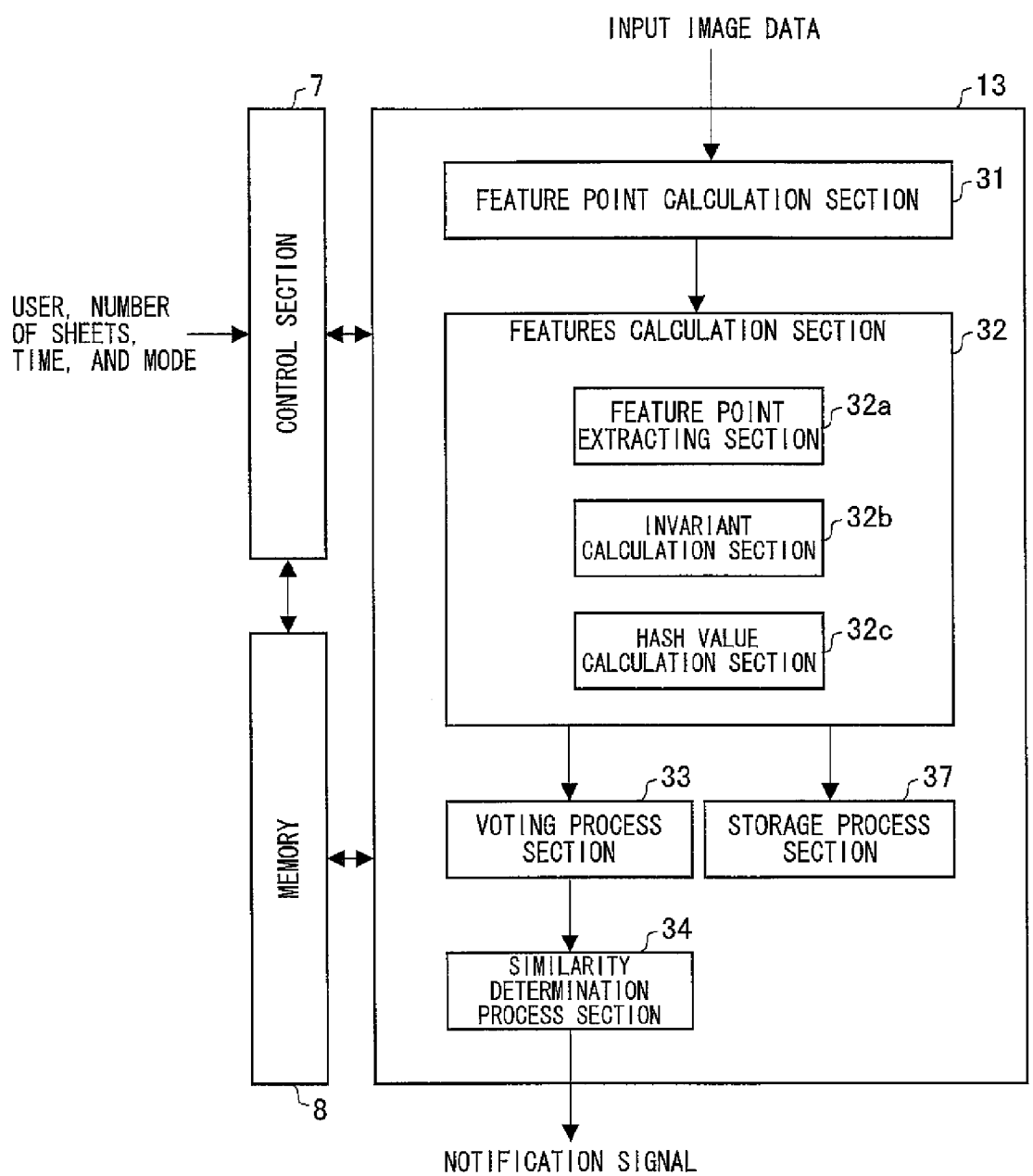
FIG. 1 is a block diagram schematically illustrating a structure of a document matching process section included in an image processing apparatus in accordance with an embodiment of the present invention.

FIG. 1 is a block diagram schematically illustrating an arrangement of the document matching process section 13. As illustrated in FIG. 1, the document matching process section 13 includes a feature point calculation section 31, a features (feature vectors) calculation section 32, a voting process section 33, a similarity determination process section 34, and a storage process section 37. Operations of the sections of the document matching process section 13 are controlled by a control section 7 included in the color image processing apparatus 3. Note that, the control section 7 may be provided in the main control section for controlling operations of the sections of the digital color multi-function printer 1 or may be provided separately from the main control section so as to cooperate with the main control section in controlling operations of the document matching process section 13. Further, the color image processing apparatus 3 includes a memory 8 in which various data used in processes of the sections of the document matching process section 13 and results of the processes are stored. The control section 7 performs a process by referring to these information stored in the memory 8.

The feature point calculation section 31 extracts a connected component of a text or a ruled line and performs calculation with a centroid of the connected component used as a feature point.

Figures 3, 4:
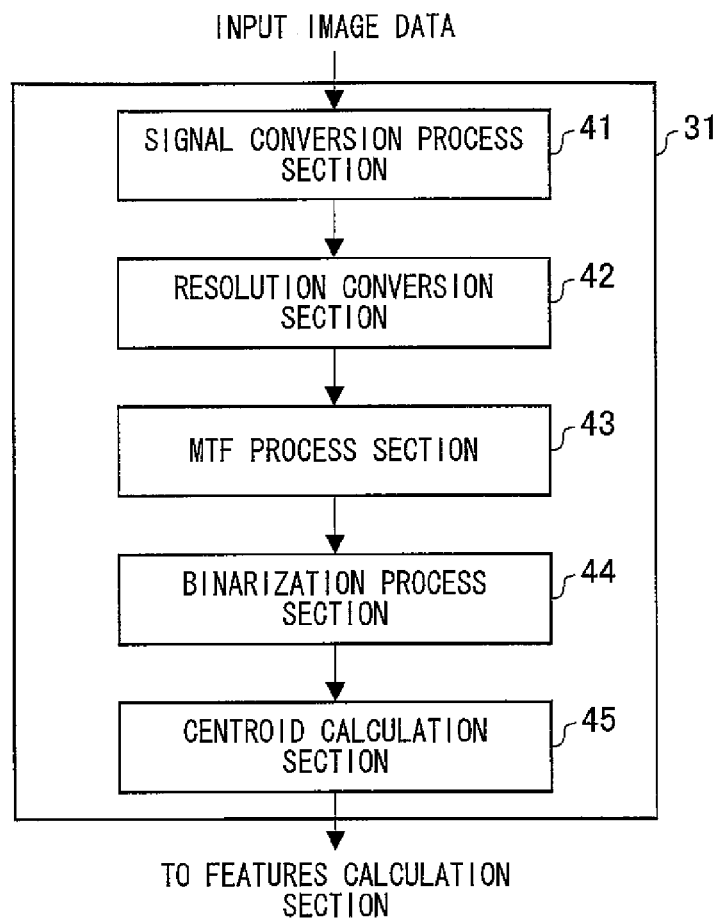
FIG. 3 is a block diagram schematically illustrating a structure of a feature point calculation section included in the image processing apparatus in FIG. 2.
FIG. 4 is an explanatory drawing illustrating an example of filter coefficients for a mixing filter included in an MTF process section of the image processing apparatus in FIG. 2.

FIG. 3 is a block diagram schematically illustrating an arrangement of the feature point calculation section 31. As illustrated in FIG. 3, the feature point calculation section 31 includes a signal conversion process section 41, a resolution conversion section 42, an MTF process section 43, a binarization process section 44, and a centroid calculation section 45.

In case where image data (RGB signals) inputted from the shading correction section 12 is a color image, the signal conversion process section 41 achromatizes the image data and converts the achromatized image data into a lightness signal or a luminance signal.

For example, the signal conversion process section 41 converts the RGB signals into a luminance signal Y in accordance with the following expression (1).

$$Yi = 0.30Ri + 0.59Gi + 0.11Bi \quad (1)$$

"Y" refers to a luminance signal of each pixel, and each of R, G, and B is a color component of the RGB signals, and "i" subsequently added to "Y", "R", "G", and "B" represents a value given to each pixel (i is an integer not less than 1).

Alternatively, the RGB signals may be converted into CIE1976L*a*b* signal (CIE: Commission International de l'Eclairage, L*: lightness, a*, b*: chromaticity).

The resolution conversion section 42 scales up/down the input image data. For example, in case where the input image data is optically scaled up/down by the image input device 2, the resolution conversion section 42 scales up/down the input image data again so as to have a predetermined resolution. Further, in order to reduce processes carried out by the subsequent process sections, the resolution conversion section 42 may convert resolution so as to make the resolution lower than a resolution in being scanned by the image input device 2 at an equal scale factor (for example, image data scanned at 600 dpi (dot per inch) is converted into data of 300 dpi or a similar operation is carried out).

The MTF (modulation transfer function) process section 43 is used to cover (adjust) unevenness of spatial frequency characteristics among a plurality of color image input apparatuses 2. In the image signal outputted from the CCD, MTF deterioration occurs due to an optical component such as a lens or a mirror, an aperture in a light receiving surface of the CCD, transfer efficiency or afterimage, storage effect or scanning unevenness caused by physical scanning, and a similar cause. The MFT deterioration causes the scanned image to blur. The MTF process section 43 carries out an appropriate filtering process (emphasizing process) so as to recover the blur caused by the MTF deterioration. Further, the MTF process section 43 is used also to suppress an unnecessary high frequency component in extracting feature points by the subsequent centroid calculation section 45. That is, a mixing filter (not shown) is used to carry out an emphasizing process and a smoothing process. Note that, FIG. 4 illustrates an example of a filter coefficient of the mixing filter.

The binarization process section 44 compares achromatized image data (luminance value (luminance signal) or lightness value (lightness signal)) with a preset threshold value so as to binarize the image data.

Figure 5:
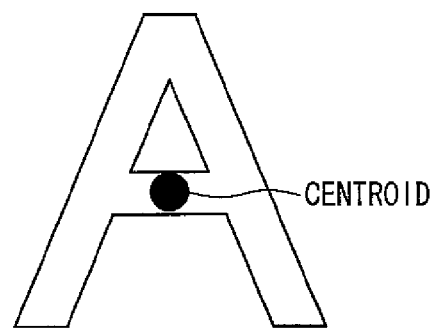
FIG. 5 is an explanatory drawing illustrating examples of a connected component extracted by the feature point calculation section in the image processing apparatus in FIG. 2 from input image data and a centroid of the connected component.
Figure 6:
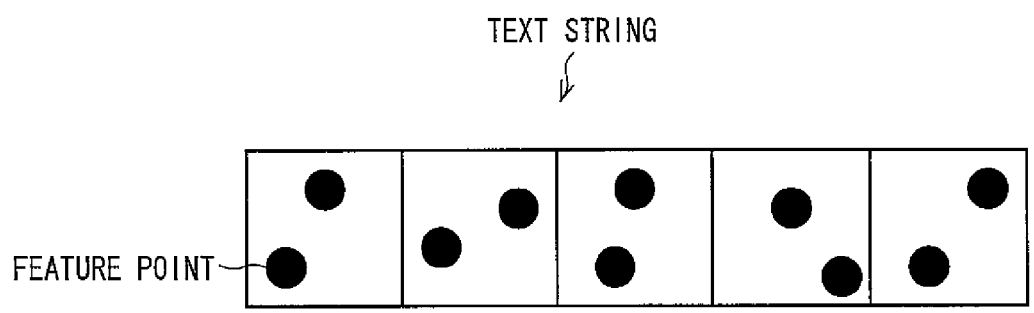
FIG. 6 is an explanatory drawing illustrating an example of centroids (feature points) of connected components extracted from a text string in input image data by the feature point calculation section in the image processing apparatus in FIG. 2.

The centroid calculation section 45 carries out labeling (labeling process) with respect to each pixel in accordance with the image data binarized by the binarization process section 44 (for example, the binarized data is represented by "1" or "0"). Further, a connected component between pixels having the same label is specified and a centroid of the specified connected component is extracted as a feature point. Further, the extracted feature point is outputted to the features calculation section 32. FIG. 5 is an explanatory drawing illustrating the connected component extracted from the input image data and a centroid of the connected component as an example. In this figure, the connected component corresponding to a character "A" and the centroid thereof are illustrated. Further, FIG. 6 is an explanatory drawing illustrating an example of centroids (feature points) of plural connected components extracted from a text string included in the input image data. Note that, the feature point can be expressed by coordinate values (x coordinate, y coordinate) of a binary image.

The features (feature vectors) calculation section 32 includes a feature point extraction section 32a, an invariant calculation section 32b, and a hash value calculation section 32c. A feature point calculated by the feature point calculation section 31 is used to calculate features (hash value and/or invariant) which are invariable relative to geometric transformation such as rotation, parallel shift, scaling up, scaling down, and the like of a document image.

Figure 7:
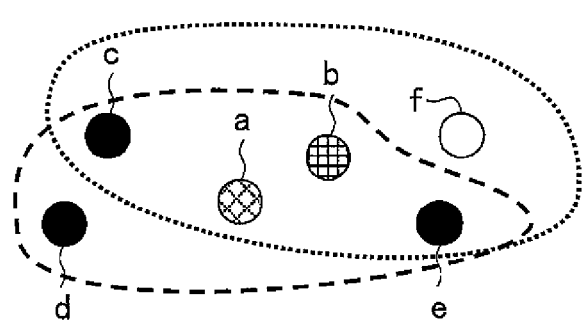
FIG. 7 is an explanatory drawing illustrating examples of a target feature point and a peripheral feature point that are extracted at a time when the features calculation section in the image processing apparatus in FIG. 2 calculates features.

As illustrated in FIG. 7, the feature point extraction section 32a regards only one feature point as a target feature point and sequentially extracts peripheral feature points around the target feature point in such order that a feature point nearer to the target feature point is more preferentially extracted so as to extract a predetermined number of feature points (four feature points herein). In FIG. 7, four feature points b, c, d, and e are extracted as peripheral feature points in case where a feature point a is regarded as a target feature point, and four feature points a, c, e, and f are extracted as peripheral feature points in case where a feature point b is regarded as a target feature point.

Figure 8:
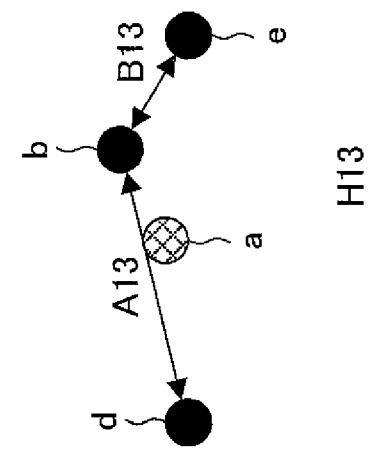
FIGS. 8(a) to 8(c) are explanatory drawings each illustrating an example of a combination of a target feature point and a peripheral feature point that are extracted at a time when the features calculation section in the image processing apparatus in FIG. 2 calculates features.
Figure 8:
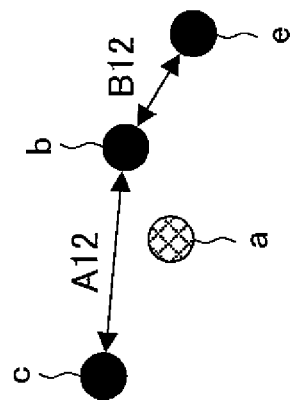
Figure 8:
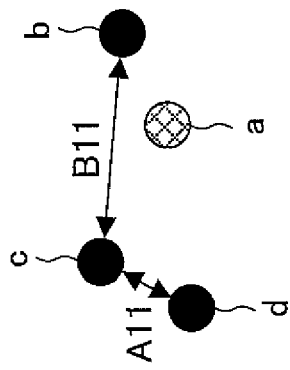

Further, the feature point extraction section 32a extracts a combination of three points which can be selected from the four peripheral feature points extracted in the foregoing manner. For example, as illustrated in FIGS. 8(a) to 8(c), in case where a feature point a is regarded as a target feature point, a combination of three feature points b, c, d, and e, that is, a combination of peripheral feature points b, c, and d, a combination of peripheral feature points b, c, and e, and a combination of peripheral feature points b, d, and e are extracted.

Next, the invariant calculation section 32b calculates an invariant (one of characteristic quantities) Hij of the extracted combination relative to geometrical transformation. Herein, "i" represents the number of target feature point(s) (i is an integer not less than 1), and "j", represents the number of combinations of three peripheral feature points (j is an integer not less than 1). In the present embodiment, a ratio of lengths of two lines connecting the peripheral characteristics is set as the invariant Hij. Note that, the lengths of the lines are calculated in accordance with coordinates of the peripheral characteristics. For example, in FIG. 8(a), when a length of a line connecting the feature point c and the feature point d is A11 and a length of a line connecting the feature point c and the feature point b is B11, the invariant H11 is such that H11=A11/B11. Further, in FIG. 8(b), when a length of a line connecting the feature point c and the feature point b is A12 and a length of a line connecting the feature point b and the feature point e is B12, the invariant H12 is such that H12=A12/B12. Further, in FIG. 8(c), when a length of a line connecting the feature point d and the feature point b is A13 and a length of a line connecting the feature point b and the feature point e is B13, the invariant H13 is such that H13=A13/B13. In this manner, the invariants H11, H12, and H13 are calculated in the examples illustrated in FIGS. 8(a) to 8(c). Note that, in the foregoing examples, a line connecting a peripheral feature point positioned at the left side in the horizontal direction and a peripheral feature point positioned at the center in the horizontal direction is indicated as Aij and a line connecting a peripheral feature point positioned at the center in the horizontal direction and a peripheral feature point positioned at the right side in the horizontal direction is indicated as Bij, but the definition is not limited to this, and the lines used to calculate the invariant Hij may be set in any manner.

Next, the hash value calculation section 32c calculates a remainder of the following expression (2) as a hash value (one of characteristic quantities) Hi and stores the calculated Hi into the memory 8.

$$(Hi1 \times 10^2 + Hi2 \times 10^1 + Hi3 \times 10^0)/D \qquad (2)$$

Note that, D is a constant number which is set beforehand according to a range which is to be set as a remainder value range.

Note that, how to calculate the invariant Hij is not particularly limited. For example, a value calculated in accordance with a compound ratio of five points in the vicinity of the target feature point, or a value calculated in accordance with a compound ratio of five points extracted from n points in the vicinity of the target feature point (n is such an integer that $n \geq 5$), or a value calculated in accordance with an arrangement of m points extracted from n points in the vicinity of the target feature point (m is such an integer that m<n and $m \geq 5$) and a compound ratio of five points extracted from the m points may be set as the invariant Hij relative to the target feature point. Note that, the compound ratio is a value calculated from four points in a straight line or from five points on a plane and is known as an invariant relative to projective transformation which is a kind of geometric transformation.

Further, an expression for calculating the hash value Hi is not limited to the foregoing expression (2), and other hash function (for example, any one of hash functions mentioned in Patent Document 3) may be used.

Further, when extraction of peripheral feature points around a target feature point and calculation of the hash value Hi are completed, each section of the features calculation section 32 focuses on another feature point to change the target feature point and performs extraction of peripheral feature points and calculation of a hash value. In this manner, each section of the features calculation section 32 calculates hash values corresponding to all the feature points.

Figure 9:
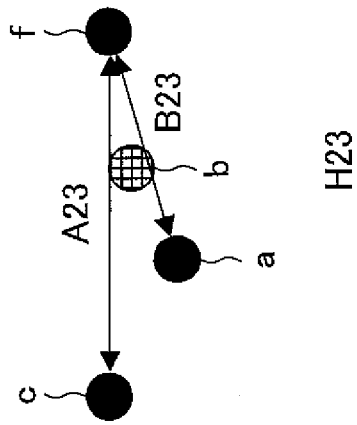
FIGS. 9(a) to 9(c) are explanatory drawings each illustrating an example of a combination of a target feature point and a peripheral feature point that are extracted at a time when the features calculation section in the image processing apparatus in FIG. 2 calculates features.
Figure 9:
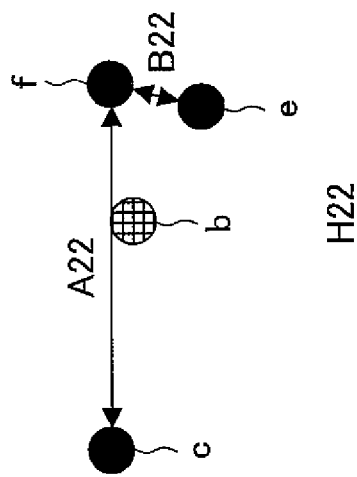
Figure 9:
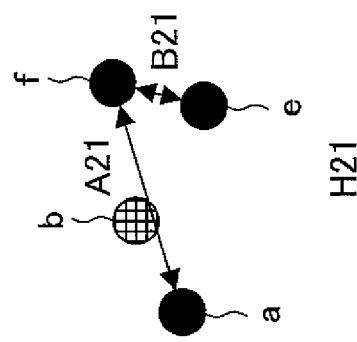

In FIG. 7, when extraction of peripheral feature points around a feature point a regarded as a target feature point and calculation of a hash value are completed, peripheral feature points around a feature point b regarded as a target feature point are extracted and a hash value is calculated. In FIG. 7, four feature points a, c, e, and f are extracted as peripheral feature points in case where the feature point b is regarded as a target feature point. Further, as illustrated in FIGS. 9(a) to 9(c), a combination of three points (peripheral feature points a, e, and f, peripheral feature points c, e, and f, peripheral feature points a, c, and f) selected from the peripheral feature points a, c, e, and f is extracted and a hash value corresponding to the combination is calculated, and the calculated hash value is stored in the memory 8. Further, this process is repeated so as to correspond to the number of the feature points, thereby calculating hash values corresponding to the respective feature points each of which is regarded as the target feature point. Then, the calculated hash values are stored in the memory 8.

Note that, how to calculate the invariant when the feature point a is regarded as the target feature point is not limited to the aforementioned manner. For example, it may be so arranged that: as illustrated in FIG. 28(a) to FIG. 28(d), in case where the feature point a illustrated in FIG. 7 is regarded as the target feature point, a combination of three points out of peripheral feature points b, c, d, and e, that is, a combination of peripheral feature points b, c, and d, a combination of peripheral feature points b, c, and e, a combination of peripheral feature points b, d, and e, and a combination of peripheral feature points c, d, and e are extracted, and an invariant (one of characteristic quantities) Hij relative to geometric transformation is calculated with respect to each of the extracted combinations.

Further, it may be so arranged that: in case where the feature point b illustrated in FIG. 7 is regarded as the target feature point, as illustrated in FIGS. 29(a) to 29(d), a combination of three points (peripheral feature points a, e, and f, peripheral feature points a, c, and e, peripheral feature points a, f, and c, peripheral feature points e, f, and c) is extracted from four feature points a, c, e, and f, and an invariant Hij relative to geometric transformation is calculated with respect to each combination. Note that, in this case, a remainder of $(Hi1 \times 10^3 + Hi2 \times 10^2 + Hi3 \times 10^1 + Hi4 \times 10^0)/D$ is calculated as a hash value, and the calculated hash value is stored in the memory 8.

Further, in the aforementioned example, a line connecting a peripheral feature point nearest to the target feature point and a peripheral feature point secondarily nearest to the target feature point is Aij and a line connecting the peripheral feature point nearest to the target feature point and a peripheral feature point thirdly nearest to the target feature point is Bij, but the definition is not limited to this. The lines used to calculate the invariant Hij may be set in any manner as in such a manner that the lines are set in accordance with a length of each of lines connecting the peripheral feature points.

Note that, in case of storing the input image data as a reference image, the features calculation section 32 transmits the hash value (features) calculated in the foregoing manner and corresponding to each characteristic of the input image data to the storage process section 37.

The storage process section 37 sequentially stores (i) hash values calculated by the features calculation section 32 and corresponding to the respective feature points and (ii) indices (document IDs) each indicative of a document (input image data) to the hash table 103 provided in the memory 8 (see FIG. 10(*a*)). In case where the hash values have already been stored, the document IDs are stored with them respectively corresponding to the hash values. Document IDs are serially assigned to respective documents without any duplication. Note that, in case where the number of documents stored in the hash table 103 is larger than a predetermined value (for example, 80% of the number of documents which can be stored), old document IDs may be searched and sequentially deleted. Further, the deleted document IDs may be reused as document IDs of new input image data. Further, in case where the calculated hash values are identical with each other (H1=H5 in FIG. 10(*b*)), these values may be collectively stored into the hash table 103.

Further, in case of determining whether the input image data is identical with image data of an image having been already stored (similarity determination process), the features calculation section 32 transmits, to the voting process section 33, the hash value calculated in the foregoing manner and corresponding to each feature point.

Figure 11:
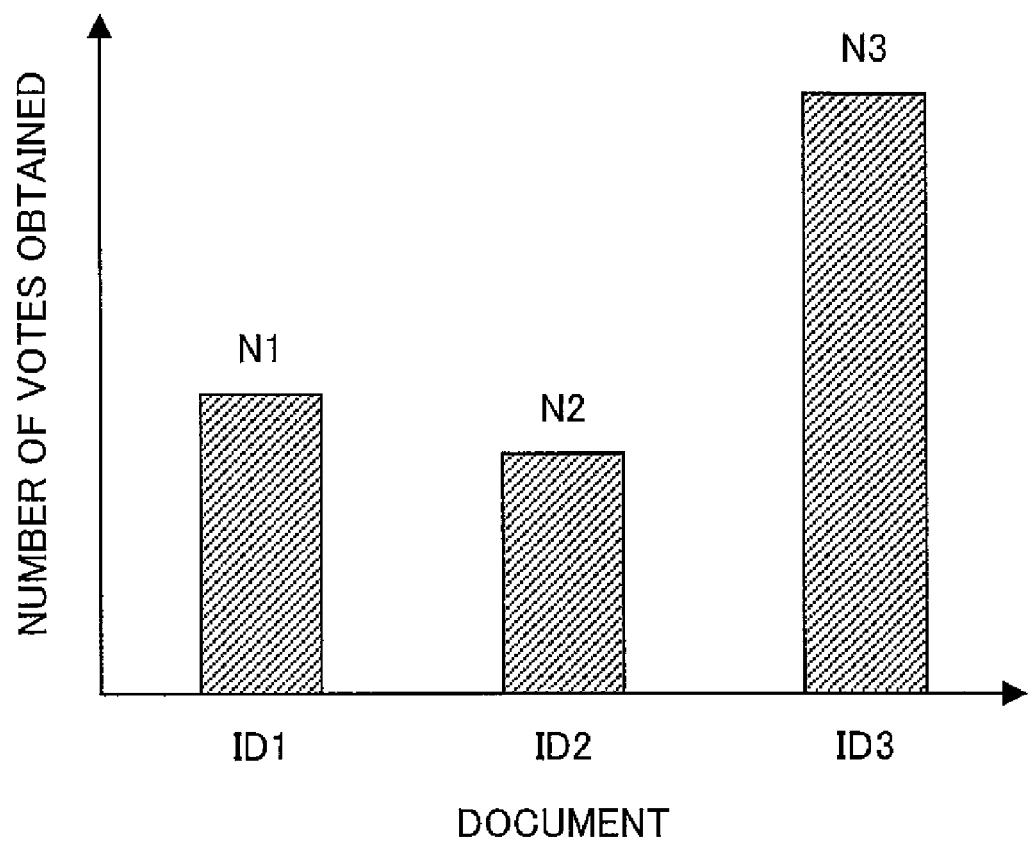
FIG. 11 is a graph showing an example of the number of votes for each reference image in a voting process section of the image processing apparatus in FIG. 2

The voting process section 33 compares the hash value calculated from the input image data and corresponding to each feature point with the hash value stored in the hash table 103 so as to vote for a reference image having the same hash value. In other words, there is counted the number of times the same hash value as a hash value of the reference image is calculated from the input image data for each reference image, and the counted number is stored in the memory 8. FIG. 11 is a graph illustrating an example of the number of votes for reference images ID1, ID2, and ID3.

The similarity determination process section 34 reads out a vote result of the voting process section 33 (an index of each reference image and the number of votes for each reference image: a similarity) from the memory 8, and extracts the maximum number of votes obtained and an index of a reference image with the maximum number of votes obtained. Further, the similarity determination process section 34 compares the maximum number of votes obtained with a predetermined threshold value (second threshold value) TH2 so as to determine whether there is any similarity or not (whether the input image data is identical with image data of the reference image or not), and sends a determination signal indicative of the determination result to the control section 7. That is, in case where the maximum number of votes obtained is not less than the predetermined threshold value TH2, it is determined that "there is a similarity (the input image data is identical with image data of the reference image)", and in case where the maximum number of votes is less than the threshold value TH2, it is determined that "there is no similarity (the input image data is not identical with image data of the reference image)".

Alternatively, it may be so arranged that: the similarity determination process section 34 divides the number of votes obtained for each reference image by a total number of votes (total number of feature points extracted from the input image data) and normalizes the result so as to calculate the similarity, thereby comparing the similarity with the predetermined threshold value TH2 (80% of the number of total votes for example) to determine the similarity.

Further, it may be so arranged that: the similarity determination process section 34 divides the number of votes obtained for each reference image by the number of times of storing a hash value (maximum number of times a hash value is stored) corresponding to a reference image whose hash value is most frequently stored and normalizes the result so as to calculate the similarity, thereby comparing the similarity with the predetermined threshold value TH2 (80% of the number of total votes for example) to determine the similarity. That is, in case where the calculated similarity is not less than a threshold value TH2, it is determined that "there is a similarity", and in case where the calculated similarity is less than the threshold value TH2, it is determined that "there is no similarity". Note that, in this case, the total number of hash values extracted from the input image data may be larger than the maximum number of times of storing a hash value (particularly, a case where the document and/or the reference image partially has a handwritten part), so that the calculated value of the similarity may exceed 100%.

Further, the threshold value TH2 in determining the similarity may be constant for each reference image or may be set for each reference image in accordance with importance or the like of the reference image. As to the importance of the reference image, for example, a paper currency, a valuable stock certificate, a top-secret document, a restricted document, and the like are regarded as having maximum importance, and a secret document is regarded as being less important than a paper current or the like. In this manner, the importance may be set by stages according to each reference image. In this case, a weighting coefficient according to importance of a reference image is stored in the memory 8 with the weighting coefficient corresponding to an index of the reference image, and the similarity determination process section 34 determines the similarity by using the threshold value TH2 corresponding to the reference image with the maximum number of votes obtained.

Further, it may be so arranged that: in determining the similarity, the threshold value TH2 is made constant and the number of votes for each reference image (the number of votes obtained for each reference image) is multiplied by a weighting coefficient of each reference image so as to determine the similarity. In this case, the weighting coefficient according to the importance of each reference image is stored in the memory 8 with the weighting coefficient corresponding to an index of each reference image, and the similarity determination process section 34 calculates a corrected number of obtained votes by multiplying the number of obtained votes of each reference image by the weighting coefficient of the reference image, thereby determining the similarity in accordance with the corrected number of obtained votes. For example, a maximum corrected number of obtained votes may be compared with the threshold value TH2, or a value obtained by normalizing the maximum corrected number of obtained votes by the number of total votes may be compared with the threshold value TH2, or a value obtained by normalizing the maximum corrected number of obtained votes by the maximum number of times of storage may be compared with the threshold value TH2. Further, in this case, for example, the weighting coefficient is set to be more than 1 and to be larger as the importance of the reference image is higher.

Further, in the present embodiment, a single hash value is calculated for a single feature point (target feature point), but the present invention is not limited to this, and it may be so arranged that a plurality of hash values are calculated for a single feature point (target feature point). For example, it may be so arranged that: six points are extracted as peripheral feature points around the target feature point, and three points are extracted from five points for each of six combinations obtained by extracting five points from the six points, so as to calculate an invariant, thereby calculating a hash value. In this case, six hash values are calculated for a single feature point.

The control section 7 judges whether the determination process for determining whether input image data is identical with image data of a reference image or not is required or not. The judgment is performed in accordance with related information of the input image data (information such as: user ID of a user having entered the input image data or a process request for the input image data; date, day of the week, and time when the input image data or the process request was entered; the number of pages (the number of sheets) of the input image data or the amount of the input image data; contents of the process request (e.g. process mode (copying, printing, transmission, editing, etc.), the number of sheets to be processed (the number of copies and the number of printing), and transmission destination of the input image data); whether the input image data includes an image with a predetermined hue or not; and combinations thereof). That is, the control section 7 judges whether the input image data is an image to be monitored or not in accordance with the related information of the input image data. When judging that the input image data is the image to be monitored, the control section 7 performs the determination process, and when judging that the input image data is not the image to be monitored, the control section 7 does not perform the determination process.

In the present embodiment, an administrator folder (folder which only an administrator (specific user such as a person in charge of security administration in corporation, shop, etc.) can browse and write in) of the memory 8 includes, in advance, information regarding a combination of related information in a case where it is necessary to determine whether input image data is identical with image data of a reference image and/or a combination of related information in a case where it is not necessary to determine. The control section 7 compares the information with the related information of the input image data so as to judge whether it is necessary to perform the determination process on the input image data or not.

The related information of the input image data may be input to the color image processing apparatus 3 (or the digital color multi-function printer 1) in such a manner that the related information is attached to the input image data. Alternatively, the related information may be input to the color image processing apparatus 3 (or the digital color multi-function printer 1) in such a manner that the related information is input separately from the input image data. For example, the related information may be input via the operation panel 6, or may be input by reading a storage medium such as a personal card inserted to reading means such as a card reader, or may be input from an external apparatus via communications. Further, the related information may be calculated by the control section 7 or the main control section based on (i) the input image data and (ii) a condition under which the input image data is input, timing at which the input image data is input, etc.

Further, the present invention may be arranged so that it is judged whether input image data includes an image with a specific hue or not based on the input image data and the result of the judgment is considered as related information. A method for judging whether input image data includes an image with a specific hue or not may be a method disclosed in Patent Document 6 (Japanese Unexamined Patent Publication No. Tokukai 2004-88663 (published on Mar. 18, 2004)).

In the method, first, reference density (Base_Intensity) of RGB signals is calculated in accordance with the following equation. R, G, and B in the following equation represent R value, G value, and B value, respectively, of the RGB signals.

$$Base\_Intensity = (R+G+B)/3$$

Then, the reference density obtained from the equation is compared with values of color components (R, G, B) of image data so as to determine magnitude relations between the values of the color components (R, G, B) and the reference density, and the values of the color components (R, G, B) are binarized in accordance with the following equation. That is, the values of the color components (R, G, B) are converted into values of (HR, HG, and HB).

$$HR = \{1(R > Base\_Intensity), 0(R \leq Base\_Intensity)\}$$

$$HG = \{1(G > Base\_Intensity), 0(G \leq Base\_Intensity)\}$$

$$HB = \{1(B > Base\_Intensity), 0(B \leq Base\_Intensity)\}$$

Then, the values of (HR, HG, HB) obtained by the conversion are caused to be related to hues. That is, when (HR, HG, HB)=(1, 0, 0), the hue of the RGB signals is determined as red. When (HR, HG, HB)=(0, 1, 0), the hue of the RGB signals is determined as green. When (HR, HG, HB)=(0, 0, 1), the hue of the RGB signals is determined as blue. In a case where a magenta color is regarded as red, when (HR, HG, HB)=(1, 0, 0) or when (HR, HG, HB)=(1, 0, 1), the hue of the RGB signals is determined as red.

Then, pixels belonging to a specific hue (e.g. red) as a result of the determination process are extracted. When the number of pixels belonging to the specific hue is within a predetermined range (e.g. a range not less than 7000 pixels and not more than 100000 pixels), it is determined that input image data includes an image with the specific hue.

The control section 7 may be provided inside or outside the color image processing apparatus 3. Alternatively, the control section 7 may be provided in the main control section of the digital color multi-function printer 1.

(1-3. Process of Digital Color Multi-Function Printer 1)

Figure 12:
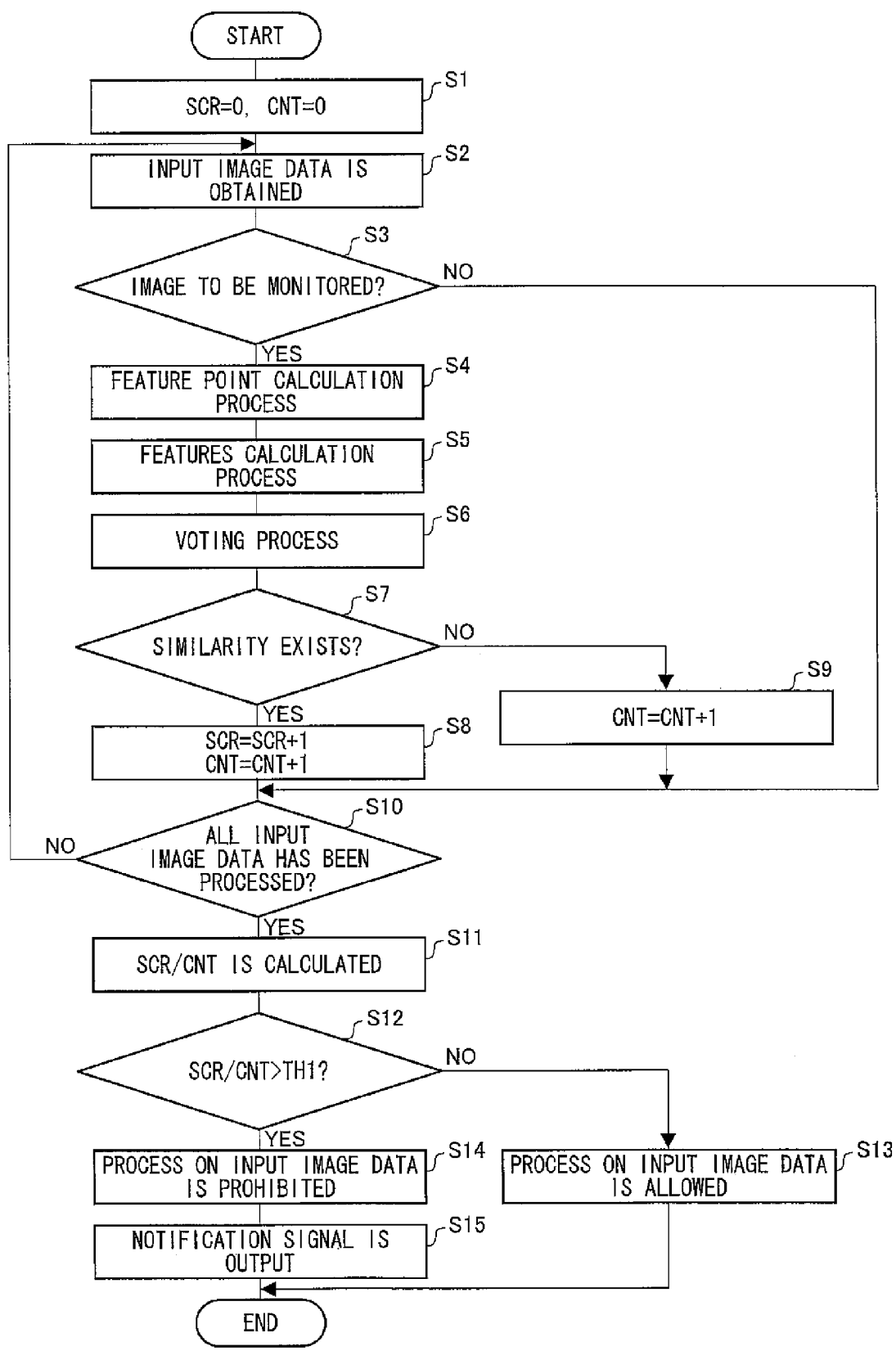
FIG. 12 is a flowchart illustrating a flow of a process in the image processing apparatus in FIG. 2.

The following explains a process of the digital color multi-function printer 1 with reference to a flowchart of FIG. 12.

Initially, when receiving an instruction input (process request) from a user via the operation panel 6 or the communication device 5, the control section 7 resets a score value SCR and a counter value CNT stored in the memory 8 (SCR=0, CNT=0) (S1). The counter value CNT is a value indicative of the number of documents (the number of pages of input image data), and the score value SCR is a value indicative of the number of documents determined as having a similarity.

Next, the control section 7 obtains input image data (S2). For example, the control section 7 may obtain input image data by the color image input apparatus 2 reading a document image, or by the communication device 5 obtaining input image data from an external apparatus, or by reading input image data from various storage media via a card reader (not shown) included in the digital color multi-function printer 1.

Next, the control section 7 judges whether it is necessary or not to perform a determination process for determining whether there is an image to be monitored, i.e. whether input image data is identical with image data of a reference image (S3). Specifically, (i) a condition under which a certain process is performed on input image data regardless of a result of similarity determination between input image data and a reference image (condition such as related information of input image data, whether the input image data includes an image with a predetermined hue, and a combination thereof) and (ii) a condition under which a process to be performed on the input image data is changed in accordance with the result of the similarity determination, are stored in the memory (condition storage section) 8 in advance, and the control section 7 judges whether it is necessary or not to perform the determination process by comparing a condition extracted from input image data or related information thereof with the condition stored in the memory 8.

When judging in S3 that it is unnecessary to perform the determination process, the control section 7 performs a process of S10. On the other hand, when judging in S3 that it is necessary to perform the determination process, the control section 7 controls each section of the document matching process section 13 so that a feature point calculation process (S4), a features calculation process (S5), a voting process (S6), and a similarity determination process (S7) are performed.

When it is determined that a similarity exists as a result of the similarity determination process, the control section 7 increments the score value SCR and the counter value (SCR=SCR+1, CNT=CNT+1) (S8), and goes to a process of S10.

On the other hand, when it is determined that a similarity does not exist as a result of the similarity determination process, the control section 7 does not increment the score value SCR but increments the counter value (CNT=CNT+1) (S9), and goes to the process of S10.

Next, the control section 7 judges whether all documents (input image data) have been subjected to the processes of S2 to S9 (S10). When an unprocessed document still exists, the control section performs the process of S2 and the subsequent processes on a next document selected from the unprocessed document.

On the other hand, when judging that all documents have been subjected to the processes of S2 to S9, the control section 7 calculates a ratio of the score value SCR to the counter value CNT, i.e. an average value of the score value to the number of the documents (SCR/CNT) (S11). Then, the control section 7 judges whether the value of SCR/CNT is more than a predetermined threshold value TH1 or not (whether SCR/CNT>TH1 or not) (S12).

As described above, by using the average value of the score value to the number of documents, that is, by accumulating and evaluating a similarity of a plurality of documents, it is possible to absorb a variable factor in the result of similarity calculation that is due to a condition under which a document is read or accuracy with which a document is read. For example, even when a similarity is calculated with respect to input image data of the same document, a similarity varies according to the condition etc. under which the document is read. However, by accumulating and evaluating the similarity, it is possible to absorb such variable factor and to evaluate a similarity with high accuracy. Further, even when different document images are serially processed instead of the same document image, it is possible to suitably evaluate a similarity.

When judging in S12 that SCR/CNT≦TH1, the control section 7 judges that the input image data is not related to the reference image (input image data does not resemble to a reference image), permits a process on the input image data (a process according to a process mode specified by an instruction input) (transmits to the main control section a signal for permitting the process), and finishes the process (S13).

On the other hand, when judging that SCR/CNT>TH1, the control section 7 judges that the input image data is related to the reference image, and prohibits or restricts the process on the input image data (transmits to the main control section a signal for prohibiting or restricting the process) (S14), causes the similarity determination process section 34 to output to the communication device 5 a notification signal indicating that a process on the reference image was requested (S5), and finishes the process.

An explanation was made above as to a case where the average value of the score value to the number of documents (SCR/CNT) is calculated and compared with the threshold value TH1 after all documents have been processed. Alternatively, the present invention may be arranged so that the average value of the score value is calculated and compared with the threshold value TH1 per predetermined number of documents (e.g. per 5 documents or 10 documents). Alternatively, the present invention may be arranged so that timing for calculating the score value and making determination is set according to the number of documents (e.g. the determination is made at a time when ½ of the number of documents to be processed has been processed and at a time when all documents have been processed).

Further, in S15, the communication device 5 notifies a predetermined transmission destination (e.g. server) that the process on the reference image was requested. The present invention may be arranged so that at that time, the communication device 5 notifies the server (job log system) of not only information that the process on the reference image was requested, but also a log at a time when it is determined that a similarity exists (operation recording condition; e.g. document ID of the input image, user ID of a user having requested the process request, date/day of the week/time when the process request was input, and contents of the process request), the input image data (alternatively, encoded image data obtained by encoding the input image data or image data obtained by changing the input image data to have lower resolution), index of the reference image etc., and the server stores therein these information if necessary.

Alternatively, the present invention may be arranged so that, instead of the input image data (alternatively, encoded image data obtained by encoding the input image data or image data obtained by changing the input image data to have lower resolution), a reference image corresponding to an input image (alternatively, encoded image data obtained by encoding the reference image or image data obtained by changing the reference image to have lower resolution) is notified to the transmission destination. The present invention may be arranged so that at that time, both the document ID of the input image and the reference image (alternatively, encoded image data obtained by encoding the reference image or image data obtained by changing the reference image to have lower resolution) is notified, or only the reference image (alternatively, encoded image data obtained by encoding the reference image or image data obtained by changing the reference image to have lower resolution) is notified. As described above, by notifying data of the reference image instead of the input image data, even when input image data includes user's personal information for example, it is possible to prevent illegal use of the personal information.

Further, notification to the transmission destination may be made by the communication device 5 of the digital color multi-function printer 1 directly to the transmission destination, or the notification may be made via other apparatus (not shown) connected with the digital color multi-function printer 1 via a network.

Further, the present invention may be arranged so that in S15 the control section 7 causes the various information to be stored in an administrator folder of the memory 8 or an administrator folder of a storage section included in a device connected with the digital multi-function printer 1 via a network, and an administrator accesses the administrator folder if necessary so as to obtain the information. Further, the present invention may be arranged so that the information is stored in the administrator folder and when a predetermined time passes or when the administrator folder becomes full, data stored in the administrator folder is deleted in a sequential order from the oldest.

Further, in the present embodiment, an explanation was made as to a case where the process on input image data is prohibited or restricted only when it is judged in S12 that SCR/CNT>TH1. Further, the present invention may be arranged so that the process on input image data is also prohibited or restricted when the number of documents is more than a predetermined number (e.g. 50) (or when the number of pages of input image data or the amount of input image data is more than a predetermined value) as well as when it is judged that SCR/CNT>TH1. This allows preventing outflow of a large amount of personal information for example.

As described above, in the digital color multi-function printer 1 of the present embodiment, information for judging whether it is necessary or not to perform the determination process for determining whether input image data is identical with a reference image (information indicative of a combination of related information in a case where it is necessary to determine whether input image data is identical with image data of a reference image or indicative of a combination of related information in a case where it is unnecessary to determine) is stored in the administrator folder of the memory 8 in advance. In accordance with the information and the related information of the input image data, the control section 7 judges whether it is necessary or not to perform the determination process on input image data.

Consequently, it is possible to judge whether the determination process is necessary or not in accordance with the related information of the input image data, and to perform the determination process only when the determination process is necessary. Therefore, in a case where input image data is identical with a reference image for example, when it is unnecessary to limit or prohibit the process or to notify a predetermined notification destination, the process on the input image is permitted without the determination process. In the case, when it is necessary to limit or prohibit the process or to notify the predetermined notification destination, the determination process is performed, and the process on the input image data is limited or prohibited in accordance with the result of the determination.

In the present embodiment, an explanation was made as to a case where the control section 7 judges whether it is necessary or not to perform the similarity determination process and the similarity determination process is performed only when the control section 7 judges that it is necessary to perform the similarity determination process. Alternatively, the present invention may be arranged so that the similarity determination process is performed on all input image data, and when the similarity determination process section 34 determines that an input image is identical with image data of a reference image, it is judged whether it is necessary or not to limit or prohibit the process on input image data and/or whether it is necessary or not to notify a predetermined notification destination, in accordance with (i) related information of input image data and (ii) information indicative of a combination of related information in a case where it is necessary to determine whether the input image data is identical with the image data of the reference image or indicative of a combination of related information in a case where it is unnecessary to determine.

Embodiment 2

The following explains another embodiment of the present invention. For convenience of explanation, members having the same functions as those in Embodiment 1 are given the same reference numerals and explanations thereof are omitted here.

(2.1. Arrangement of Document Matching Process Section)

Figure 13:
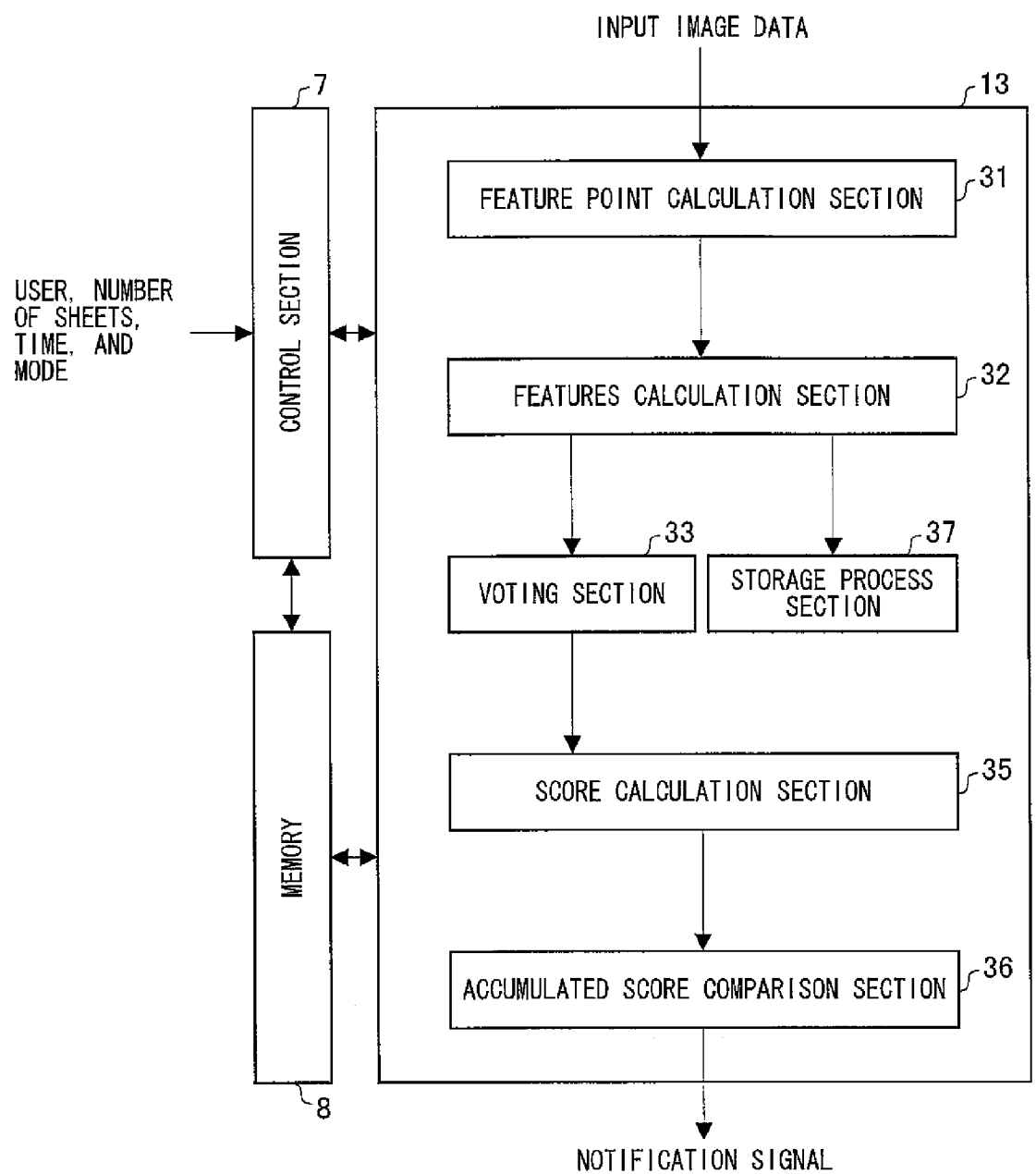
FIG. 13 is a block diagram schematically illustrating a structure of a document matching process section included in an image processing apparatus in accordance with another embodiment of the present invention.

FIG. 13 is a block diagram schematically illustrating an arrangement of the digital color multi-function printer 1 of the present embodiment. As illustrated in FIG. 13, the document matching process section 13 includes the feature point calculation section 31, the features calculation section 32, the voting process section 33, a score calculation section 35, an accumulated score comparison section 36, and the storage process section 37. The feature point calculation section 31, the features calculation section 32, the voting process section 33, and the storage process section 37 may be the same as those in Embodiment 1.

The score calculation section 35 calculates a similarity MCH (i) and a score value (modified similarity) SCR (i) in accordance with the vote result from the voting process section 33, and transmits the similarity MCH (i) and the score value SCR (i) to the accumulated score comparison section 36. Specifically, the score calculation section 35 calculates the similarity MCH (i) by dividing (a) the number of votes obtained for a reference image with the maximum number of votes obtained with respect to i-th (i is an integer of 1 or more) page (or block) of input image data by (b) the number of votes (total number of features extracted from input image data) and normalizing the divided value. Alternatively, MCH (i) may be obtained by dividing (a) the number of votes obtained for a reference image with the maximum number of votes obtained with respect to i-th (i is an integer of 1 or more) page (or block) of input image data by (b) the number of stored hash values of a reference image with the maximum number of stored hash values.

Further, the score calculation section 35 calculates the score value SCR (i) with respect to i-th page (or block) of input image data, in accordance with the following equation (3).

$$SCR(i)=MCH(i)\times(\alpha(m)+\beta(n)+\gamma(p)+\delta(q))/4 \quad (3)$$

where $\alpha(m)$ is a coefficient preset for each user, $\beta(n)$ is a coefficient preset for each time zone, $\gamma(p)$ is a coefficient preset for each process mode, and $\delta(q)$ is a coefficient indicative of whether an image with a specific hue is included or not. m, n, and p are values set for each user, each time zone, and each process mode, respectively, and are integers of 1 or more. q is a value that is given according to whether an image with a specific hue is included or not. q may be a binary value indicative of whether an image with a specific hue is include or not, or may be a value set in accordance with the number of pixels of an image with a specific hue (e.g. a value set to be larger as the number of pixels increases). These coefficients are stored beforehand in an administrator folder in the memory 8 or in an administrator folder of a device communicably connected via a network. The score calculation section 35 calculates the score value SCR(i) by referring to these coefficients stored in the administrator folder. FIG. 14 illustrates examples of these coefficients stored in the memory 8.

The accumulated score comparison section 36 calculates an accumulated score (summation of similarities) ASCR (i) by serially adding (accumulating) the score value (modified similarity) SCR (i) calculated by the score calculation section 35 with respect to each page (or each block) of input image data. Further, the accumulated score comparison section 36 performs an accumulated score comparison process in which the accumulated score ASCR (i) is compared with a threshold value TH2 stored in the administrator folder so as to show a magnitude relation therebetween, and transmits a judgment signal indicative of the result of the comparison to the control section 7. The threshold value TH2 may be changed according to whether the score value is calculated with respect to each page or with respect to each block. That is, a first threshold value may be used in calculating the score value with respect to each page, and a second threshold value different from the first threshold value may be used in calculating the score value with respect to each block.

In accordance with the judgment signal from the accumulated score comparison section 36, the control section 7 judges whether input image data is related to a reference image or not. Specifically, when ASCR (i)>TH2, the control section 7 judges that the input image data is related to the reference image (a similarity exists), and when ASCR (i)≦TH2, the control section 7 judges that the input image data is not related to the reference image (a similarity does not exist). Further, when judging that a similarity exists, the control section 7 limits or prohibits a process on the input image data, and notifies a predetermined notification destination that the process on the reference image was requested. On the other hand, when judging that a similarity does not exist, the control section 7 permits the process on the input image data.

The control section 7 may be provided inside or outside the color image processing apparatus 3. Alternatively, the control section 7 may be provided in the main control section of the digital color multi-function printer 1.

(2-2. Process in the Digital Color Multi-Function Printer 1)

Figure 15:
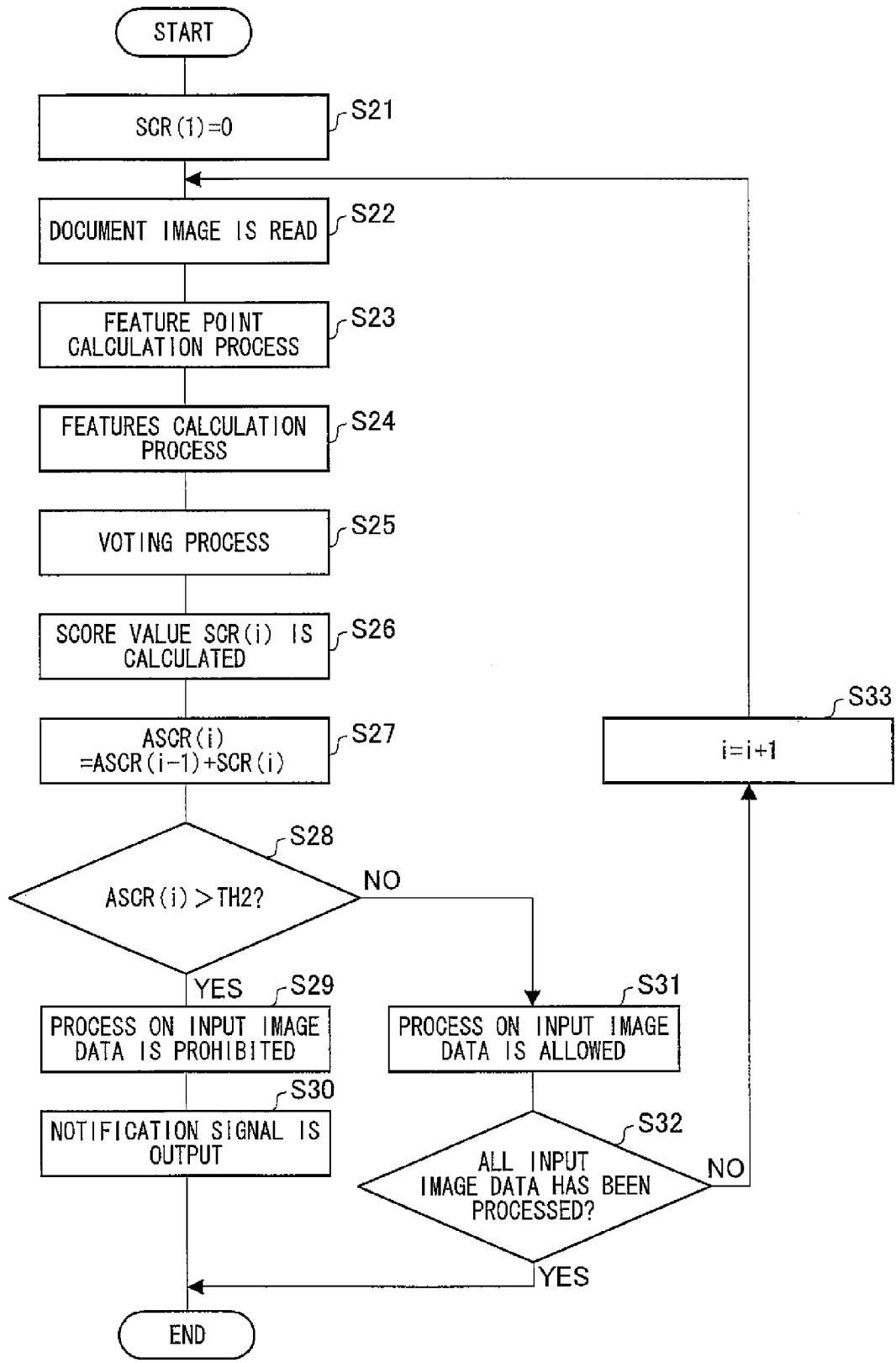
FIG. 15 is a flowchart illustrating an example of a flow of a process in the image processing apparatus in FIG. 13.

The following explains a similarity determination process in the digital color multi-function printer 1 of the present embodiment with reference to a flowchart in FIG. 15.

When receiving an instruction input from a user via the operation panel 6 or the communication device 5, the control section 7 resets a score value SCR stored in the memory 8 (SCR(1)=0) (S21).

Then, the control section 7 obtains input image data (S22). For example, the control section 7 may obtain input image data by the color image input apparatus 2 reading a document image, or by the communication device 5 obtaining input image data from an external apparatus, or by reading input image data from various storage media via a card reader (not shown) included in the digital color multi-function printer 1.

Then, the control section 7 controls sections of the document matching process section 13 so that a feature point calculation process (S23), a features calculation process (S24), a voting process (S25), a score calculation process (S26), and an accumulated score calculation process (S27) are performed.

Then, the control section 7 judges whether an accumulated score ASCR(i) is more than the threshold value TH2 or not, i.e. whether ASCR (i)>TH2 or not (S28).

When judging that ASCR(i)>TH2, the control section 7 judges that the input image data is related to a reference image, transmits to the main control section of the digital color multi-function printer 1 a signal for prohibiting or restricting a subsequent process (process corresponding to a process mode) (S29), and causes the accumulated score comparison section 36 to output to the communication device 5 a notification signal indicating that a process on the reference image was requested (S30). The communication device 5 notifies a predetermined notification destination (e.g. administrator) that the process on the reference image was requested. At that time, the communication device 5 may notify not only the information that the process on the reference image was requested, but also information such as ID of the digital color multi-function printer 1, the position where the digital color multi-function printer 1 is located and the department to which the digital color multi-function printer 1 belongs, an index of the reference image, document ID of the input image data, time/date/day of the week when a process request was input, user ID of a user who has input the process request, contents of the process request (e.g. process mode and the number of sheets to be processed), and document ID of a document having been processed before the accumulated score ASCR(i) exceeds the threshold value TH2. FIG. 16 illustrates an example of the information notified to the administrator as well as the information indicating that the process on the reference image was requested.

Notification to the notification destination may be made directly to the transmission destination from the communication device 5 included in the digital color multi-function printer 1 or may be made via a server (not shown) connected with the digital color multi-function printer 1 via a network.

The present invention is not limited to the arrangement in which notification is made to the transmission destination. Alternatively, the present invention may be arranged so that the control section 7 causes the information to be stored in an administrator folder of the memory 8 or an administrator folder of other apparatus communicably connected with the digital color multi-function printer 1 via a network, and the administrator accesses the administrator folder if necessary so as to obtain the information.

On the other hand, when judging in S28 that ASCR(i)≦TH2, the control section 7 judges that the input image data is not related to the reference image, and transmits to the main control section of the digital color multi-function printer 1 a signal for permitting a process on i-th page (or block) of the input image data (S31). When receiving the signal, the main control section of the digital multi-function printer 1 causes the i-th page (or block) of the input image data to be subjected to a process corresponding to the process specified by the instruction input. The present invention may be arranged so that when judging that ASCR(i)>TH2, the control section 7 transmits to the main control section a signal indicative of the judgment, whereas when judging that ASCR(i)≦TH2, the control section 7 does not transmit the signal to the main control section.

Figure 17:
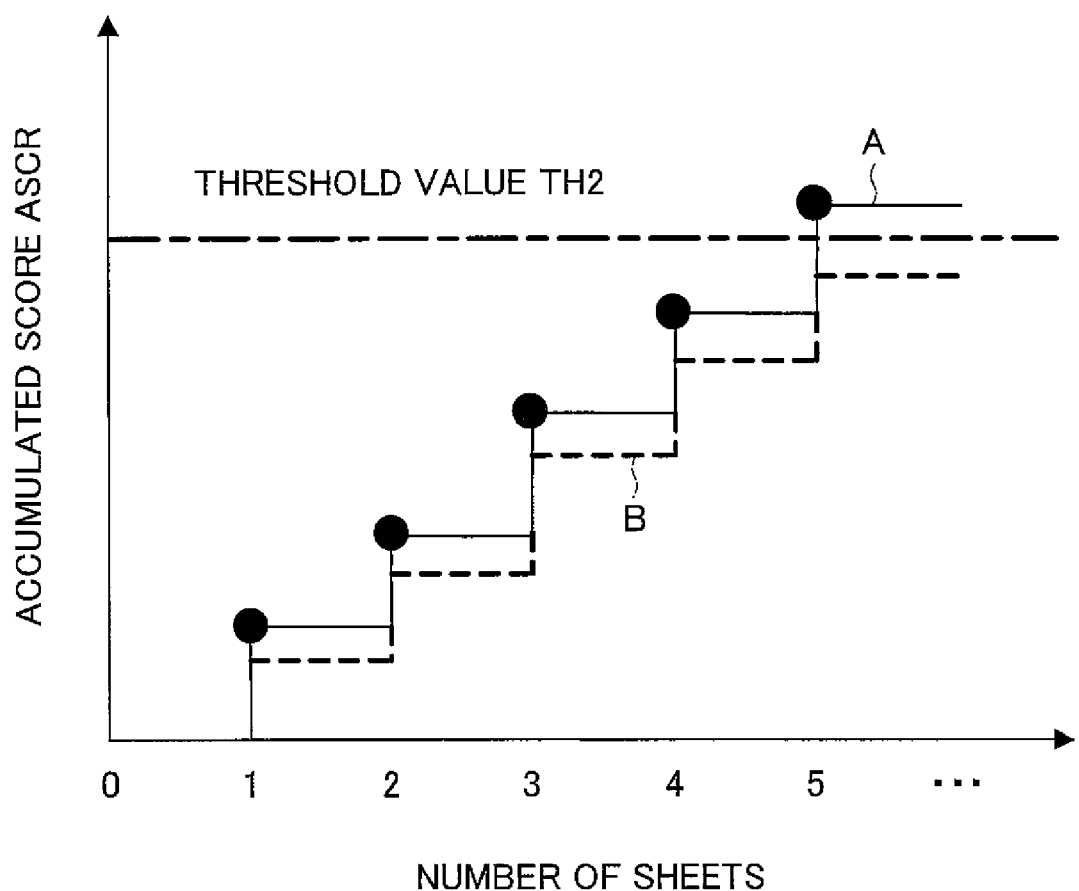
FIG. 17 is a graph illustrating examples of accumulated score calculated by the image processing apparatus in FIG. 13 and the number of documents.

FIG. 17 is a graph illustrating an example of the number of documents (the number of pages of input image data) and an accumulated score. In a case of input image data A, 1 to 4th documents are permitted to be processed, whereas 5th document is prohibited from being processed. In a case of input image data B, 1 to 5th documents are permitted to be processed.

After the process of S31, the control section 7 judges whether all pages (or all blocks) of the input image data have been processed (S32). When an unprocessed page (or block) remains, the control section 7 performs the process of S3 and subsequent processes with respect to the next i+1th page (or block) (S33). On the other hand, when judging in S32 that all pages (blocks) have been processed, the control section 7 finishes the process.

As described above, the digital color multi-function printer 1 of the present embodiment causes coefficient α(m) set with respect to each user, coefficient β(n) set with respect to each time zone, coefficient γ(p) set with respect to each process mode, and coefficient δ(q) set according to whether an image with a specific hue is included or not, to be stored in the memory 8 beforehand. The score calculation section 35 calculates a score value SCR(i) based on a similarity MCH(i) of a reference image having obtained the maximum number of votes in the voting process by the voting process section 33 and on the coefficients α(m), β(n), γ(p), and δ(q). Based on the score value SCR(i), a similarity between the input image data and the reference image is calculated.

Consequently, it is possible to set in advance a security level (coefficient) with respect to each user, each time zone, and each process mode, and according to whether an image with a specific hue is included or not, and to determine a similarity with respect to each user, each time zone, and each process mode, and according to whether an image with a specific hue is included or not, when a process on input image data is requested. Therefore, it is possible to perform a determination process while setting whether to put a higher value on security or workability with respect to each user, each time zone, and each process mode, and according to whether an image with a specific hue is included or not.

Further, in the present embodiment, the accumulated score ASCR(i) obtained by serially accumulating a score value for each page (or each block) of the input image data is compared with the threshold value TH2 so as to judge whether to limit the contents of the process or not.

As described above, by judging whether to limit the contents of the process or not with use of the accumulated score, it is possible to absorb a variable factor in the result of similarity calculation that is due to a condition under which a document is read or due to accuracy with which a document is read. For example, even when a similarity is calculated with respect to input image data of the same document, a similarity varies according to the condition etc. under which the document is read. However, by accumulating and evaluating the similarity, it is possible to absorb such variable factor and to evaluated a similarity with high accuracy. Further, even when different document images are serially processed instead of the same document image, it is possible to suitably evaluate a similarity.

The present invention is not limited to the arrangement where the accumulated score ASCR(i) is compared with the threshold value TH2. The present invention may be arranged so that a score value SCR (i) for each page (or each block) of input image data is compared with a threshold value TH3 stored in the memory 8 in advance so as to perform a determination process with respect to each page (or each block) of the input image data.

Further, in the present embodiment, an explanation is made as to a case where, when the accumulated score ASCR(i) exceeds the threshold value TH2, the process on the input image data is limited and a notification signal is output. However, the present invention is not limited to this case.

Figure 18:
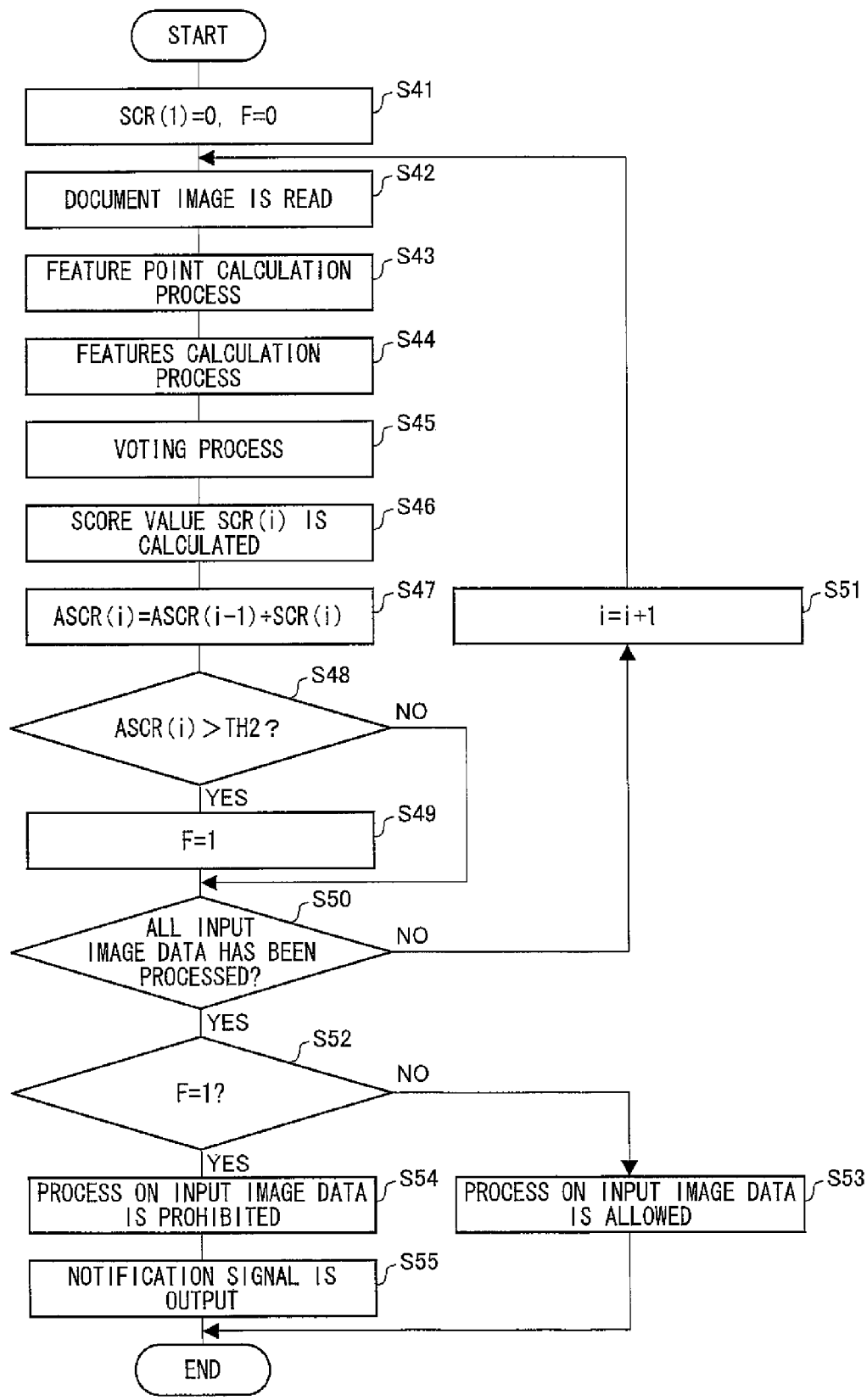
FIG. 18 is a flowchart illustrating another example of a flow of a process in the image processing apparatus in FIG. 13.

For example, instead of the arrangement where a notification signal is sent when the accumulated score ASCR exceeds the threshold value TH2, the present invention may be arranged so that a flag F indicating whether the accumulated score ASCR exceeds the threshold value TH2 or not (when ASCR>TH2, F is "1" and when ASCR≦TH2, F is "0") is stored in the memory 8, and when all input image data has been processed, it is judged whether the flag is "F=1" or not, and in accordance with the result of the judgment, it is judged whether to prohibit or restrict a process on the input image data and/or whether to notify the administrator or not. FIG. 18 is a flow chart illustrating a flow of a process in this case.

When receiving an instruction input from a user via the operation panel 6 or the communication device 5, the control section 7 resets a score value SCR and the flag F stored in the memory 8 (SCR(1)=0 and F=0) (S41).

Then, the control section 7 obtains input image data (S42), controls sections of the document matching process section 13 so that a feature point calculation process (S43), a features calculation process (S44), a voting process (S45), a score calculation process (S46), and an accumulated score calculation process (S47) are performed. Further, the control section 7 judges whether the accumulated score ASCR is more than the threshold value TH2 or not, i.e. whether ASCR (i)>TH2 or not (S48).

When judging that ASCR (i)>TH2, the control section 7 causes the flag F indicating that F=1 to be stored in the memory 8 (S49), and goes to a process of S50.

On the other hand, when judging that ASCR (i)≦TH2, the control section 7 does not change the flag F (F=0) and goes to the process of S50.

In the present embodiment, an explanation is made as to a case where a Judgment whether a process on the input image data (process corresponding to a process mode) is to be permitted, prohibited, or restricted is made after all pages of the input image data are subjected to the determination process. Alternatively, the present invention may be arranged so that a process (process corresponding to the process mode) with respect to the i-th page (or block) of the input image data is permitted after the process of S48.

Then, the control section 7 judges whether all pages (or blocks) of the input image data have been subjected to the processes of S42 to S49 (S50). When an unprocessed page (or block) remains, the control section 7 performs the process of S42 and the subsequent processes with respect to the next i+1th page (or block).

On the other hand, when judging in S50 that all pages (or blocks) have been processed, the control section 7 judges whether the flag F stored in the memory 8 indicates F=1 or not (S52). When the flag F does not indicate F=1 (when F=0), the control section 7 transmits to the main control section a signal for permitting a process on the input image data (process corresponding to the process mode) (S53), and finishes the process.

On the other hand, when the flag F indicates F=1, the control section 7 transmits to the main control section a signal for prohibiting or restricting the process on the input image data (process corresponding to the process mode) (S54), causes the accumulated score comparison section 36 to output to the communication device 5 a notification signal indicating that the process on the reference image has been requested (S55), and finishes the process.

The communication device 5 notifies a predetermined notification destination (e.g. administrator) that the process on the reference image has been requested. At that time, the communication device 5 may notify not only the information that the process on the reference image has been requested, but also information such as ID of the digital color multi-function printer 1, the position where the digital color multi-function printer 1 is located and the department to which the digital color multi-function printer 1 belongs, ID of the reference image, document ID of an input image, input image data, user ID of a user having input a process request, date/day of the week/time when the process request was input, the contents of the process request (e.g. the number of sheets to be processed and a process mode), document ID of a document having been processed before the accumulated score ASCR (i) exceeds the threshold value TH2. Instead of notifying a document ID of an input image and input image data, a document ID of an input image and a reference image corresponding to the input image may be notified, or only the reference image corresponding to the input image may be notified. Notification to the notification destination may be made directly to the transmission destination from the communication device 5 included in the digital color multi-function printer 1 or may be made via a server (not shown) connected with the digital color multi-function printer 1 via a network.

The present invention is not limited to the arrangement in which notification is made to the transmission destination. Alternatively, the present invention may be arranged so that the control section 7 causes the information to be stored in an administrator folder of the memory 8 or an administrator folder of other apparatus communicably connected with the digital color multi-function printer 1 via a network, and the administrator accesses the administrator folder if necessary so as to obtain the information.

Further, the present invention may be arranged so that the process stops when the number of documents exceeds a predetermined number (e.g. 50 sheets) (when the number of pages of input image data or the amount of input image data exceeds a predetermined number or amount).

Further, the present invention may be arranged so that the coefficients $\alpha(m)$, $\beta(n)$, $\gamma(p)$, and $\delta(q)$ stored in the administrator folder of the memory 8 may be added or changed by the administrator accessing the administrator folder.

Further, the present invention may be arranged so that, for example, when the accumulated score ASCR(i) exceeds the threshold value TH2, the control section 7 stores, in the administrator folder of the memory 8, information such as ID of the digital color multi-function printer 1, the position where the digital color multi-function printer 1 is located and the department to which the digital color multi-function printer 1 belongs, ID of a reference image, document ID of an input image, input image data, user ID of a user having input a process request, date/day of the week/time when the process request was input, the contents of the process request (e.g. the number of sheets to be processed and a process mode), document ID of a document having been processed before the accumulated score ASCR(i) exceeds the threshold value TH2.

Consequently, with respect to input image data determined as data of a reference image as a result of the accumulated score ASCR(i) exceeding the threshold value TH2, the administrator can judge whether the determination was right or not. When the determination was false, it is possible to change the coefficients $\alpha(m)$, $\beta(n)$, $\gamma(p)$, and $\delta(q)$ or the threshold value TH2, or perform the similar operation.

The present invention may be arranged so that, when the administrator judges that the determination was false, the control section 7 changes the coefficients $\alpha(m)$, $\beta(n)$, $\gamma(p)$, and $\delta(q)$ stored in the administrator folder of the memory 8. For example, the present invention may be arranged so that, when the administrator accesses the information stored in the administrator folder, the control section 7 causes a display section of a device via which the administrator accesses to display a button with which the administrator enters that the determination is false, and when the button is selected, the control section 7 judges that the determination was false, and changes at least one of the coefficients $\alpha(m)$, $\beta(n)$, $\gamma(p)$, and $\delta(q)$ (e.g. drops the coefficient by 1%). At that time, only a coefficient specified by the administrator may be changed.

Further, the present invention may be arranged so that a combination of the coefficients at the time when the administrator judged that the determination was false is stored, and a change ratio of a coefficient is set in accordance with the number of the judgment that the determination was false. For example, the change ratio may be $K^n$ % where n (n: an integer of 1 or more) is the number of the judgment that the determination was false and K is a constant (e.g. 2). That is, at least one of the coefficients $\alpha(m)$, $\beta(n)$, $\gamma(p)$, and $\delta(q)$ is multiplied by $K^n/100$.

In the present embodiment, an explanation was made as to a case where the score value SCR is calculated using the coefficients $\alpha$, $\beta$, $\gamma$, and $\delta$ corresponding to a user, time zone, a process mode, and whether an image with a specific hue is included or not, respectively, out of related information of input image data. Alternatively, the present invention may be arranged so that, instead of using a part of or all of the coefficients, or in addition to using the coefficients, the score value SCR may be calculated using a coefficient regarding the number of pages of input image data or the amount of input image data, destination of the input image data, or a combination thereof.

Further, in the above embodiments, an explanation was made as to a case where the document matching process section 13 calculates as a feature point a centroid of a connected component of each pixel of input image data and determines a similarity based on the positional relationship of feature points. However, a method for determining a similarity is not limited to this case.

For example, similarity determination may be performed through the method disclosed in Patent Document 1. In the method, a ruled line image is raster-scanned through an outline extraction process so as to detect a tracking start point thereof, and then a closed curve formed by graphic limits is tracked clockwise or counterclockwise. Information of an outline extracted by the tracking of the closed curve is stored as a coordinate point sequence. Thereafter, feature points such as intersections of images and salient points of images are detected, and a frame is extracted from a combination of point sequences. Then, a circumscribing shape of input frame information is calculated.

Then, central coordinate data for each frame data is calculated. For example, assume that frame coordinates are set as (x0, y0), (x1, y1), (x2, y2), and (x3, y3) from the lower left corner, and the intersection of the diagonal lines is set as (cx, cy). Then, differences between the coordinate on the upper left of a reference format and the coordinate on the upper left of an input image are set as dx and dy, and the central position of a frame of the reference format or a frame of the ruled line image is corrected. Then, each frame data is caused to be related to each other. For example, the central coordinate of frame data on the reference format is set as (tcx, tcy) and the central coordinate of frame data on the rule line image is set as (icx, icy), and distance $D=(icx-tcx)^2+(icy-tcy)^2$. Further, a similarity is voted for when a corresponding frame exists in frames on the reference format (D<dth: dth is a threshold value of a distance). When all the frames on the reference format have been voted for, the number of corresponding frames is divided by the number of frames n. That is, a similarity is calculated based on a relation that a similarity=the number of corresponding frames/the number of frames on a reference ruled line image.

Further, a similarity may be determined through a matching method using hue distribution, which is disclosed in Patent Document 2. According to the method, image data in an RGB space corresponding to a reference image is stored in a determination ROM, the number of pixels in a region of input image data that is determined as being identical with a reference image is counted, and volume Tjd in the RGB space of the input image data identical with the reference image is calculated. When the number of pixels in the region determined as being identical with the reference image is not less than a constant K, it is considered that there is a possibility that the input image data is a reference document (e.g. paper currency), and a similarity R is calculated based on the following equation (4). Torg is a volume of reference image data.

$$R=Tjd/Torg \quad (4)$$

When the similarity R is not less than a hue matching ratio βm in a color space, it is judged that input image data includes a reference image. This process is made with respect to each reference image. Thus, the process for determining a similarity of each reference image is performed.

Further, a similarity of input image data to a reference image may be determined by extracting a keyword from the input image data with OCR and matching the keyword with a keyword included in the reference image. Alternatively, similarity determination may be performed in such a manner that features of input image data are extracted through a method other than the above methods, the features are compared with features of a reference image so as to calculate a similarity, and the calculated similarity is compared with a predetermined threshold value.

Furthermore, in the above embodiments, an explanation was made as to a case where the present invention is applied to the digital color multi-function printer 1. However, the present invention is not limited to this case. For example, the present invention is applicable to a monochrome multi-function printer. Furthermore, in addition to the multi-function printer, the present invention is applicable to a single-function apparatus such as a facsimile, a copier, and an image reading apparatus.

Figure 19:
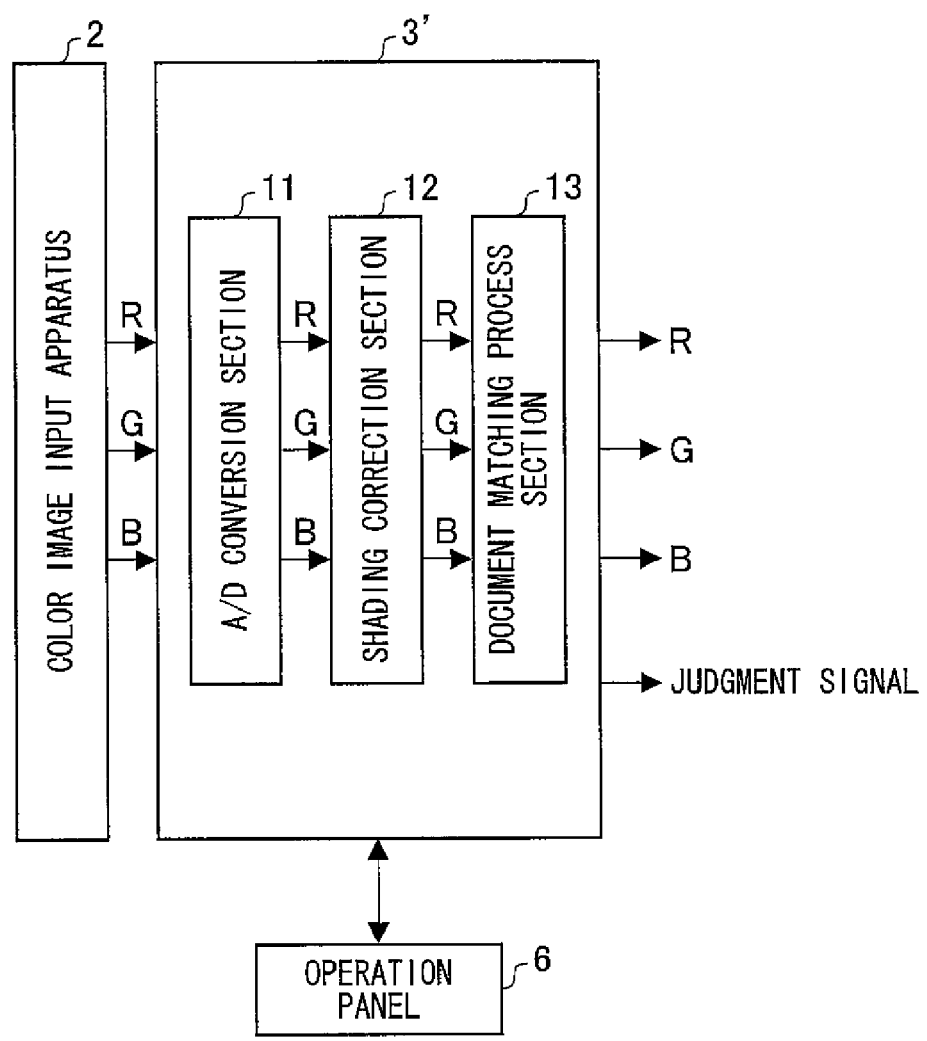
FIG. 19 is a block diagram illustrating a modification example of the image processing apparatus in accordance with one embodiment of the present invention.

FIG. 19 is a block diagram illustrating an example of a structure in a case where the present invention is applied to a flat bed scanner (image reading apparatus, image processing apparatus) 1'.

As illustrated in FIG. 19, the color image processing apparatus 3' includes an A/D conversion section 11, a shading correction section 12, a document matching process section 13, a control section 7 (not shown in FIG. 19), and a memory 8 (not shown in FIG. 19). The color image input apparatus 2 is connected with the color image processing apparatus 3', and the color image input apparatus 2 and the color image processing apparatus 3' constitute the image reading apparatus 1' as a whole. Functions of the A/D conversion section 11, the shading correction section 12, the document matching process section 13, the control section 7, and the memory 8 included in the color image input apparatus (image reading means) 2 are the same as those of the members in the digital color multi-function printer 1 as described above and therefore explanations thereof are omitted here.

Embodiment 3

The following explains further another embodiment of the present invention. For convenience of explanation, members having the same functions as those in the above embodiments are given the same reference numerals and explanations thereof are omitted here.

Figure 30:
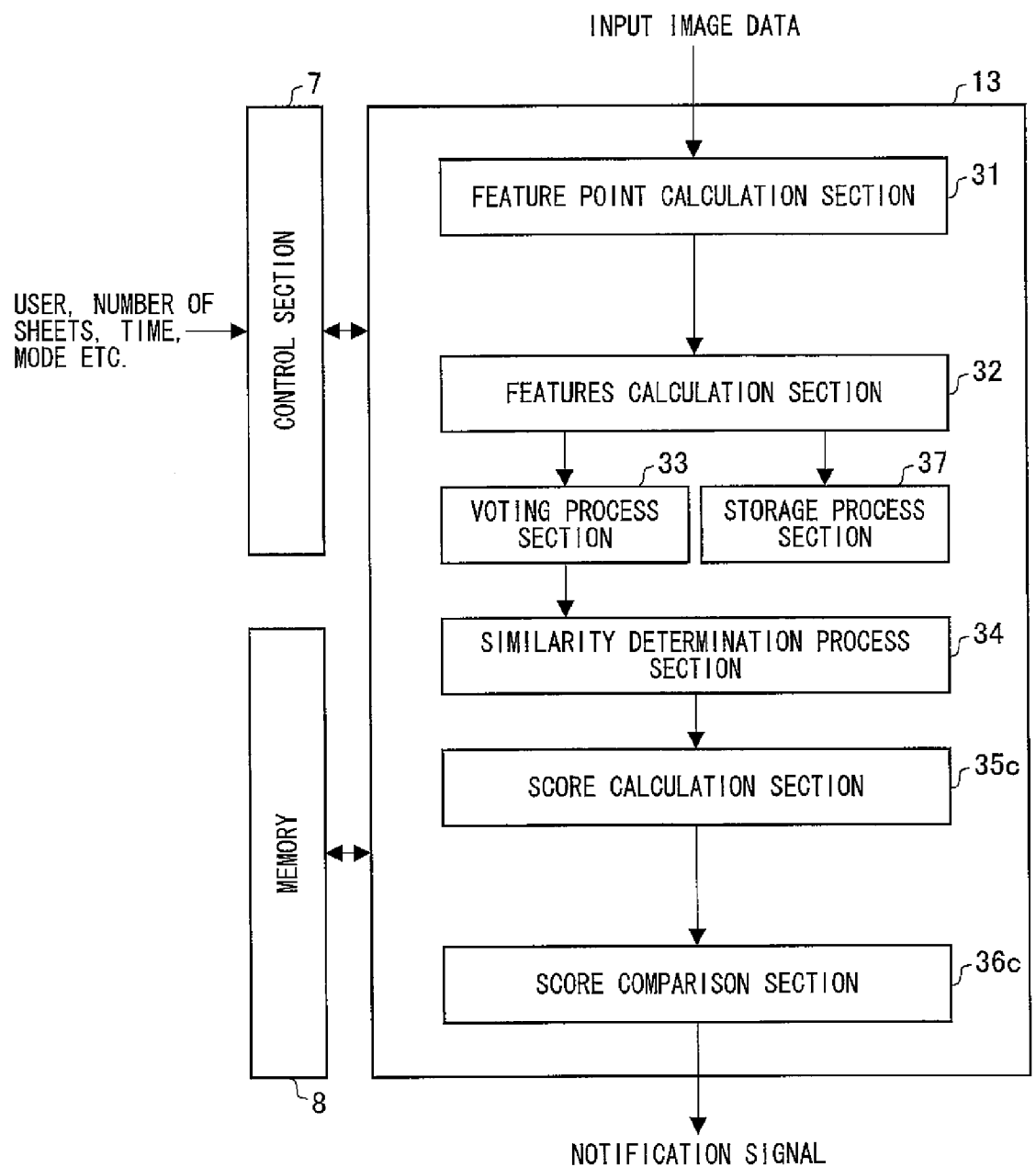
FIG. 30 is a block diagram schematically illustrating a structure of a document matching process section included in an image processing apparatus in accordance with further another embodiment of the present invention.

FIG. 30 is a block diagram schematically illustrating a structure of a document matching process section 13 included in a digital color multi-function printer 1 of the present embodiment. The digital color multi-function printer 1 of the present embodiment includes this document matching process section 13 instead of the document matching process section 13 in Embodiment 1 or 2.

As illustrated in FIG. 30, the document matching process section 13 includes a feature point calculation section 31, a features calculation section 32, a voting process section 33, a similarity determination process section 34, a score calculation section 35c, a score comparison section 36c, and a storage process section 37. The feature point calculation section 31, the features calculation section 32, the voting process section 33, the similarity determination process section 34, and the storage process section 37 may be the same as those in Embodiment 1 or 2.

With respect to each item of related information of input image data (item such as user ID of a user having input a process request on input image data, date/day of the week/time when the input image data or the process request was input, the number of pages (number of sheets) of the input image data or the amount of the input image data, the contents of the process request (e.g. process mode (such as copying, printing, transmission, and editing), the number of sheets to be processed (such as the number of copies and the number of printings), transmission destination of the input image data, and a predetermined hue included in the input image data), the score calculation section 35 calculates an evaluated value for the contents of each item.

Specifically, with respect to each item of the related information of the input image data, the memory (evaluated value storage section) 8 stores therein (a) an evaluated value x(i) set for the contents of each item and (b) a reference evaluated value xref(i) set for each item. The score calculation section 35 extracts the related information of the input image data and calculates an evaluated value for each item based on the contents of each item of the extracted related information and the above relationship stored in the memory 8.

FIG. 31 is an explanatory drawing illustrating examples of related information of input image data, evaluated values, and reference evaluated values stored in the memory 8. In the examples in FIG. 31, related information of input image data includes items: user; time zone; and process mode, and an evaluated value x(i) corresponding to the contents of each item is preset for each item. For example, users are classified into groups A to D, and evaluated values a1 to a4 are set for the groups A to D, respectively. The evaluated values a1 to a4 are set within a range of 1 to 10 for example. Further, a reference evaluated value xref(i) is set for each item. The reference evaluated value may be stored in an administrator folder (a folder to which only a person having authority for access in advance is accessible) of the memory 8 or an administrator folder provided in an external apparatus communicably connected with the digital color multi-function printer 1 via a network.

A reference evaluated value for each item may be set, for example, with respect to each user group that uses the digital color multi-function printer 1 (user group corresponding to a department to which users belong or to a location where the digital color multi-function printer 1 is located). Further, in the present embodiment, as explained later, a reference evaluated value is corrected in accordance with a past record (e.g. statistical average value of evaluated values for each item with respect to each user group). Accordingly, a reference evaluated value is set to be a default value at an initial state. The default value may be set with respect to each user group.

The score calculation section 35 compares (a) an evaluated value calculated for each item of related information of input image data with (b) a reference evaluated value for each item, and calculates a score value SCRst in accordance with the result of the comparison. In the present embodiment, the score value SCRst is calculated based on the following equation (5).

$$SCRst = \sum_i (xi - xref)^2 \quad (5)$$

The method for calculating the score value SCRst is not limited to this. For example, the score value SCRst may be a total sum of an absolute value of a difference between an evaluated value x(i) and a reference evaluated value xref(i).

Figure 32:
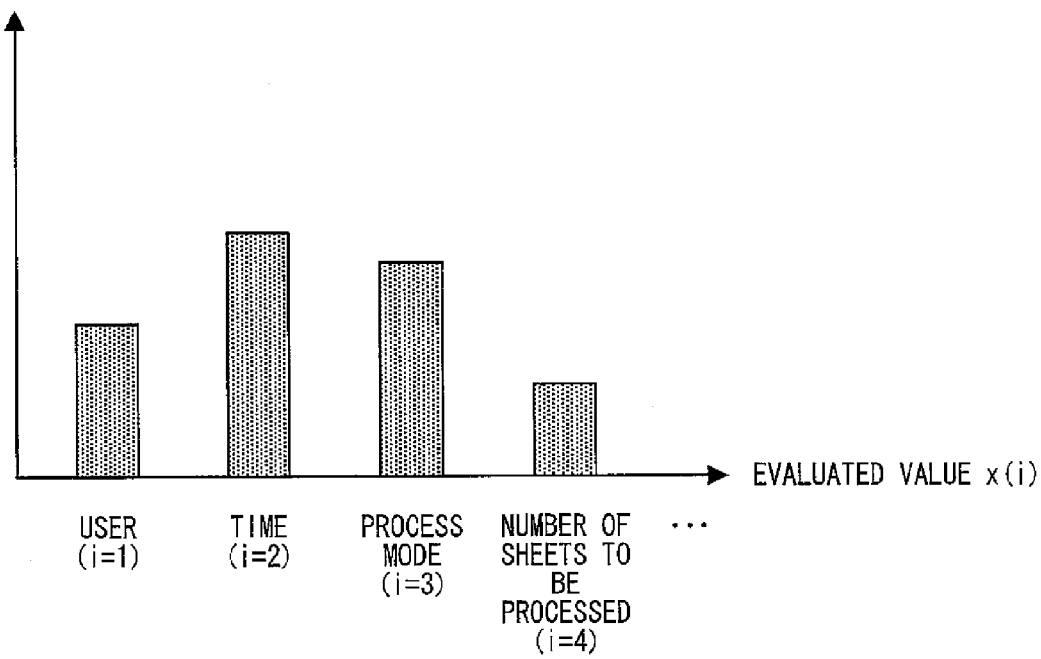
FIG. 32(a) is an explanatory drawing illustrating examples of evaluated values used in the image processing apparatus in FIG. 29.
FIG. 32(b) is an explanatory drawing illustrating examples of reference evaluated values used in the image processing apparatus in FIG. 29.
Figure 32:
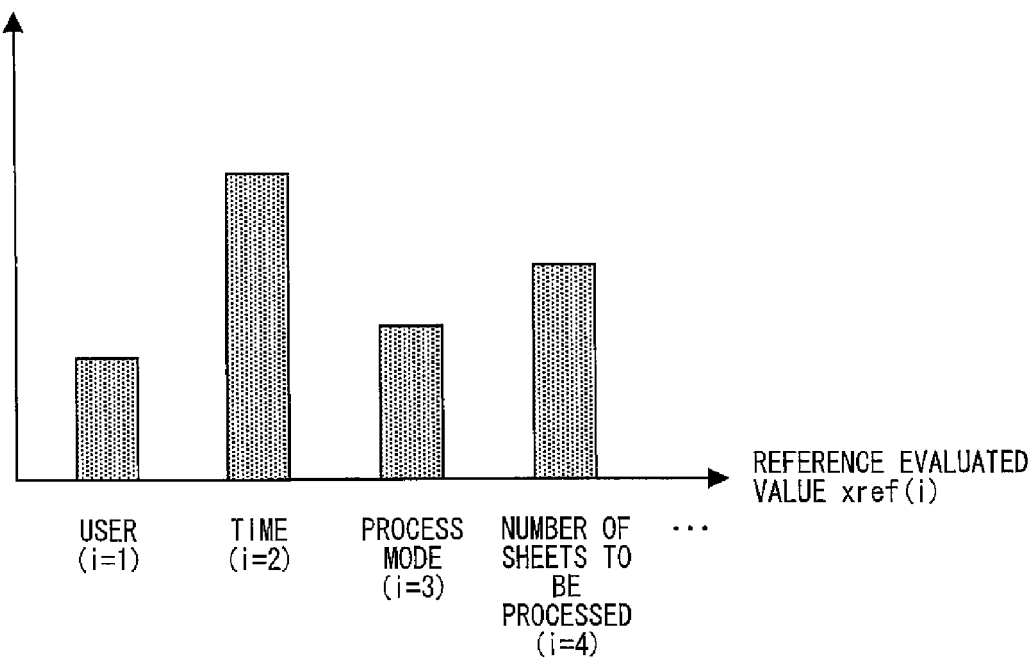

FIG. 32(*a*) illustrates examples of evaluated values for items that are calculated based on related information of input image data. FIG. 32(*b*) illustrates examples of reference evaluated values set for the items.

The score comparison section 36*c* compares the score value SCRst calculated by the score calculation section 35 with a threshold value (third threshold value) TH3 stored in the memory 8 or the administrator folder in advance, and transmits the result of the comparison to the control section 7.

The control section 7 causes the score calculation section 35*c* and the score comparison section 36*c* to perform the above process when the similarity determination process section 34 determines that "a similarity exists." When the result of the comparison by the score comparison section 36*c* shows that SCRst≦TH3, the control section 7 judges that the input image data is not related to the reference image (a similarity does not exist), and permits execution of a process on the input image data.

On the other hand, when the result of the comparison by the score comparison section 36*c* shows that SCRst>TH3, the control section 7 judges that the input image data is related to the reference image (a similarity exists), transmits to a main control section a signal for prohibiting or restricting execution of a process (process corresponding to a process mode) on the input image data, and controls the communication device 5 so that a notification signal indicating that the process on the reference image has been requested is transmitted to a predetermined transmission destination (e.g. administrator).

In the present embodiment, not only the notification signal indicating that the process on the reference image has been requested, but also various information such as ID of the digital color multi-function printer 1, location of the digital color multi-function printer 1 and department to which the digital color multi-function printer 1 belongs, an index of a reference image (or reference image itself), document ID of input image data, time/date/day of the week when a process request was input, user ID of a user having input the process request, and the contents of the process request (e.g. process mode and the number of sheets to be processed), are notified. Alternatively, the present invention may be arranged so that the information is stored in the memory or an administrator folder of other apparatus communicably connected with the digital color multi-function printer 1 via a network, and the administrator accesses the administrator folder if necessary to obtain the information.

Consequently, the administrator can Judge whether the result of the determination in the digital color multi-function printer 1 is right or false according to the information transmitted from the digital color multi-function printer 1, and when the result of the determination is false, the administrator can change (update) the reference evaluated value for an item that is considered to be the cause of the false determination.

The method for changing the reference evaluated value is not particularly limited. In the present embodiment, the reference evaluated value is changed in accordance with the following equation (6).

$$xref'(i) = (M \times xref(i) + x(i))/(M+1) \quad (6)$$

where xref(i) is a preset reference evaluated value (reference evaluated value before the change), x(i) is an evaluated value calculated from input image data, and xref'(i) is a reference evaluated value after the change. M is a constant and is set to 100 for example.

As described above, a reference evaluated value is changed when the result of comparing a score value is false. This allows setting a reference evaluated value in accordance with a past record (e.g. statistical data with respect to each user group), thereby judging more suitably whether to permit execution of a process on input image data or not.

Figure 33:
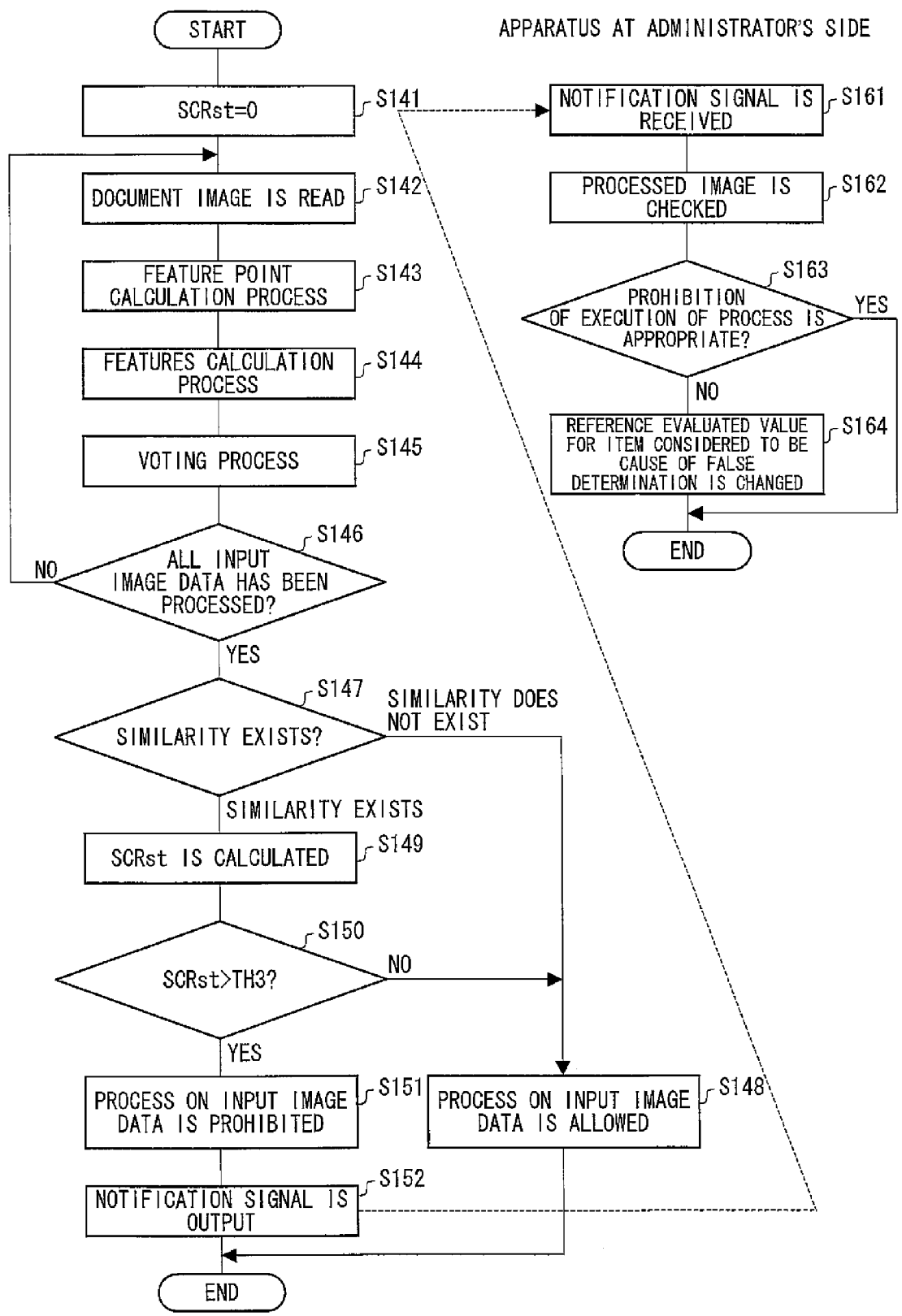
FIG. 33 is a flowchart illustrating a flow of a process in the image processing apparatus in FIG. 29.

The following explains a similarity determination process in the digital color multi-function printer 1 of the present embodiment with reference to the flowchart of FIG. 33.

Initially, when receiving an instruction input from a user via the operation panel 6 or the communication device 5, the control section 7 resets a score value SCRst stored in the memory 8 (SCR=0) (S141).

Then, the control section 7 obtains input image data by reading a document image (S142), and controls sections of the document matching process section 13 so that a feature point calculation process (S143), a features calculation process (S144), and a voting process (S145) are performed. Next, the control section 7 judges whether all document images have been subjected to the processes of S142 to S145 (S146). When an unprocessed document still exists, the control section performs the processes of S142 to S145 on the unprocessed document image.

On the other hand, when all document images have been subjected to the processes of S142 to S145, the control section 7 causes the similarity determination process section 34 to perform a similarity determination process (S147) in accordance with the result of the voting process. When it is determined that a similarity does not exist, the control section 7 permits a process on the input image data (S148), and finishes the process.

On the other hand, when it is determined that a similarity exists, the control section 7 causes the score calculation section 35*c* to calculate the score value SCRst (S149), and causes the score comparison section 36*c* to compare the score value SCRst with the threshold value TH3 (S150).

When SCRst≦TH3, the control section 7 permits execution of a process (process corresponding to a process mode) on the input image data (S148), and finishes the process.

On the other hand, when SCRst>TH3, the control section 7 prohibits or restricts execution of a process (process corresponding to a process mode) on the input image data (S151), causes (i) a notification signal indicating that a process on a reference image has been requested and (ii) information such as ID of the digital color multi-function printer 1, location of the digital color multi-function printer 1 and department to which the digital color multi-function printer 1 belongs, an index of a reference image (or reference image itself), document ID of input image data, time/date/day of the week when a process request was input, user ID of a user having input the process request, and the contents of the process request (e.g. process mode and the number of sheets to be processed) to be transmitted to a predetermined transmission destination (S152), and finishes the process.

When the administrator receives the notification signal (S161), the administrator checks the input image data according to the information (S162), and judges whether the input image data is in fact related to a reference image prohibited or restricted from being processed and whether prohibiting or restricting the process on the input image data was appropriate or not (S163). When judging that prohibiting or restricting the process was appropriate, the administrator finishes the process.

On the other hand, when judging that the prohibiting or restricting the process was not appropriate, i.e. when judging that the determination was false, the administrator changes a reference evaluated value for an item considered to be the cause of the false determination (S164), and finishes the process. Specifically, when judging that the determination was false, the administrator notifies the digital color multi-function printer 1 of the item considered to be the cause of the false determination. The control section 7 receives this notification via the communication device (validity input section) 5 or the operation panel (validity input section) 6, and changes the reference evaluated value of the notified item in accordance with the equation (6) for example.

Embodiment 4

The following explains further another embodiment of the present invention. For convenience of explanation, members having the same functions as those in the above embodiments are given the same reference numerals and explanations thereof are omitted here.

Figure 20:
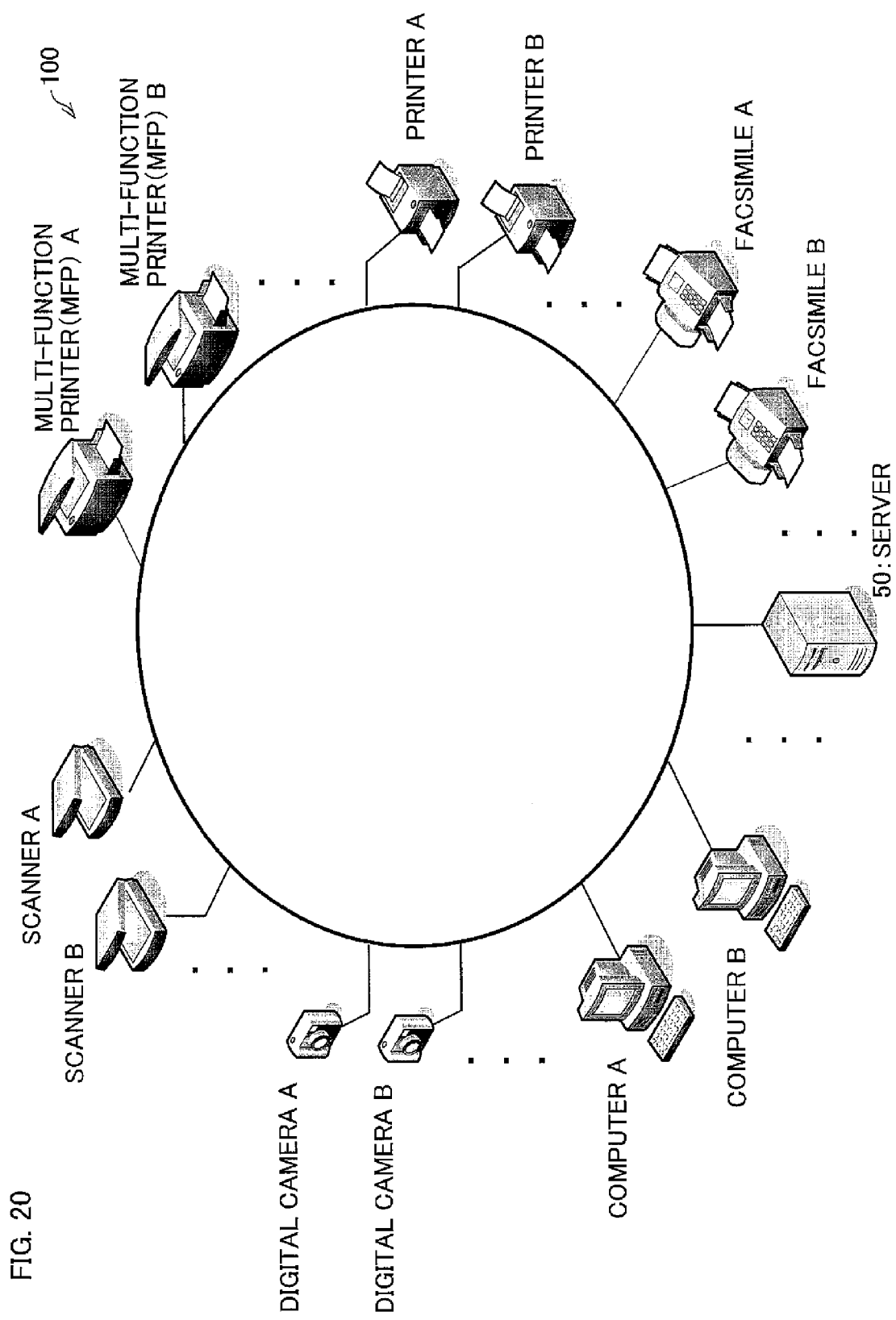
FIG. 20 is an explanatory drawing schematically illustrating a structure of an image processing system in accordance with further another embodiment of the present invention.

FIG. 20 is an explanatory drawing schematically illustrating a structure of an image processing system 100 of the present embodiment. As illustrated in FIG. 20, the image processing system 100 includes: a server 50; multi-function printers (MFPs) A, B, . . . ; printers A, B, . . . , facsimiles A, B, . . . ; computers A, B, . . . ; digital cameras A, B, . . . ; scanners A, B, . . . etc. that are connected with the server 50 via a network.

The server 50 performs a part of or all functions of the control section 7 and the document matching process section 13 of Embodiments 1 to 3. That is, the server 50 receives input image data or features of input image data from other apparatus (such as a multi-function printer, a printer, a facsimile, a computer, a digital camera, and a scanner) connected with the server 50 via a network, and performs a similarity determination process in accordance with the received information.

The following explains an example of a process in the image processing system 100. Here, an explanation is made as to a case where a digital color multi-function printer 1 (color image processing apparatus 3) and the server 50 included in the image processing system 100 cooperate with each other to perform the process, as illustrated in FIG. 20.

Figure 21:
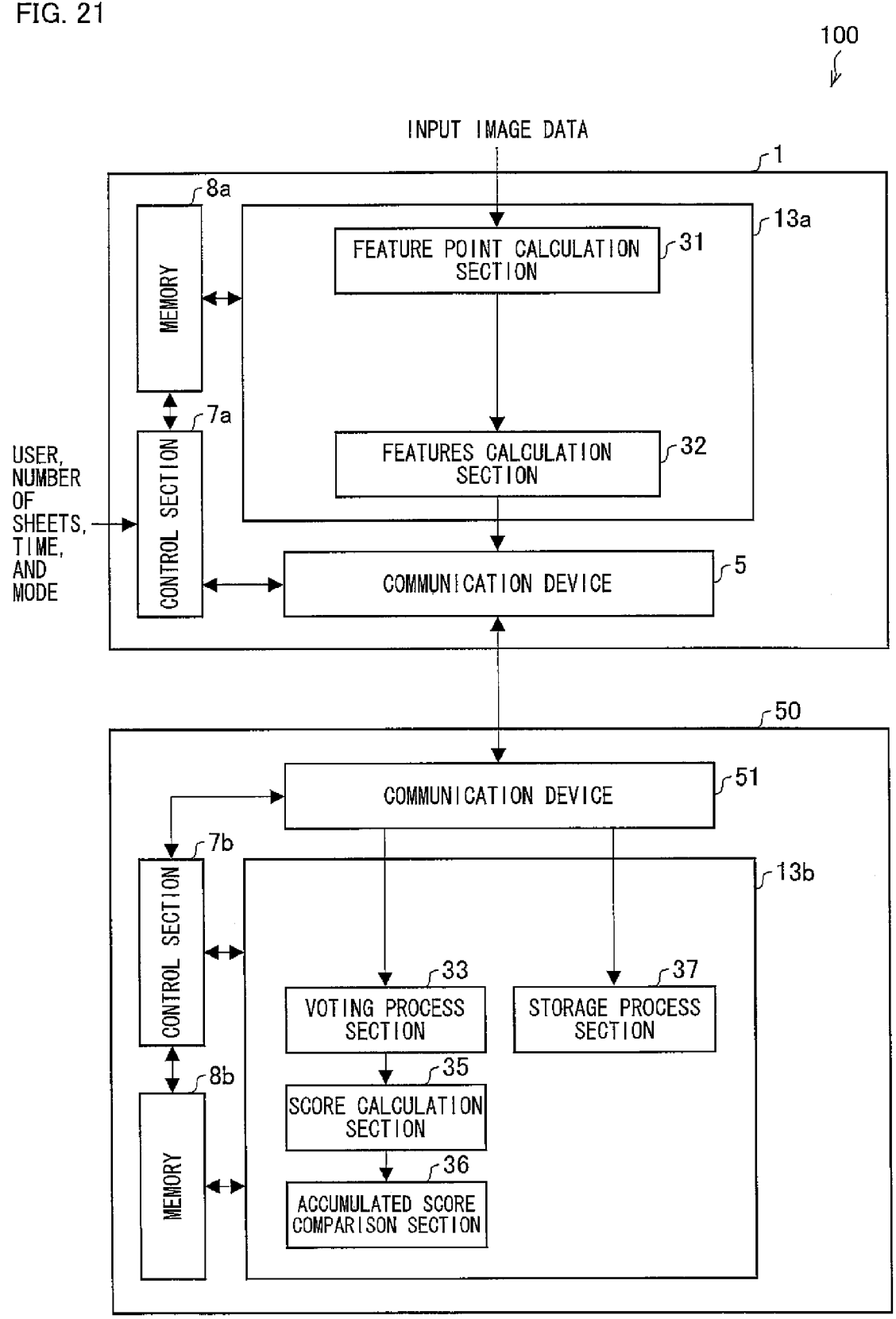
FIG. 21 is a block diagram schematically illustrating a structure of an image processing system in accordance with further another embodiment of the present invention.

As illustrated in FIG. 21, the color image processing apparatus 3 of the digital color multi-function printer 1 includes: a document matching process section 13a including a feature point calculation section 31 and a features calculation section 32; a control section 7a for controlling the operation of the document matching process section 13a; a memory 8a in which information necessary for the process of the document matching process section 13a is stored; and a communication device 5 for communicating with an external apparatus. The server 50 includes: a communication device 51 for communicating with an external apparatus; a document matching process section 13b including a voting process section 33, a score calculation section 35, an accumulated score comparison section 36, and a storage process section 37; a control section 7b for controlling the document matching process section 13b; and a memory 8b in which information necessary for the process of the document matching process section 13b is stored.

Figure 22:
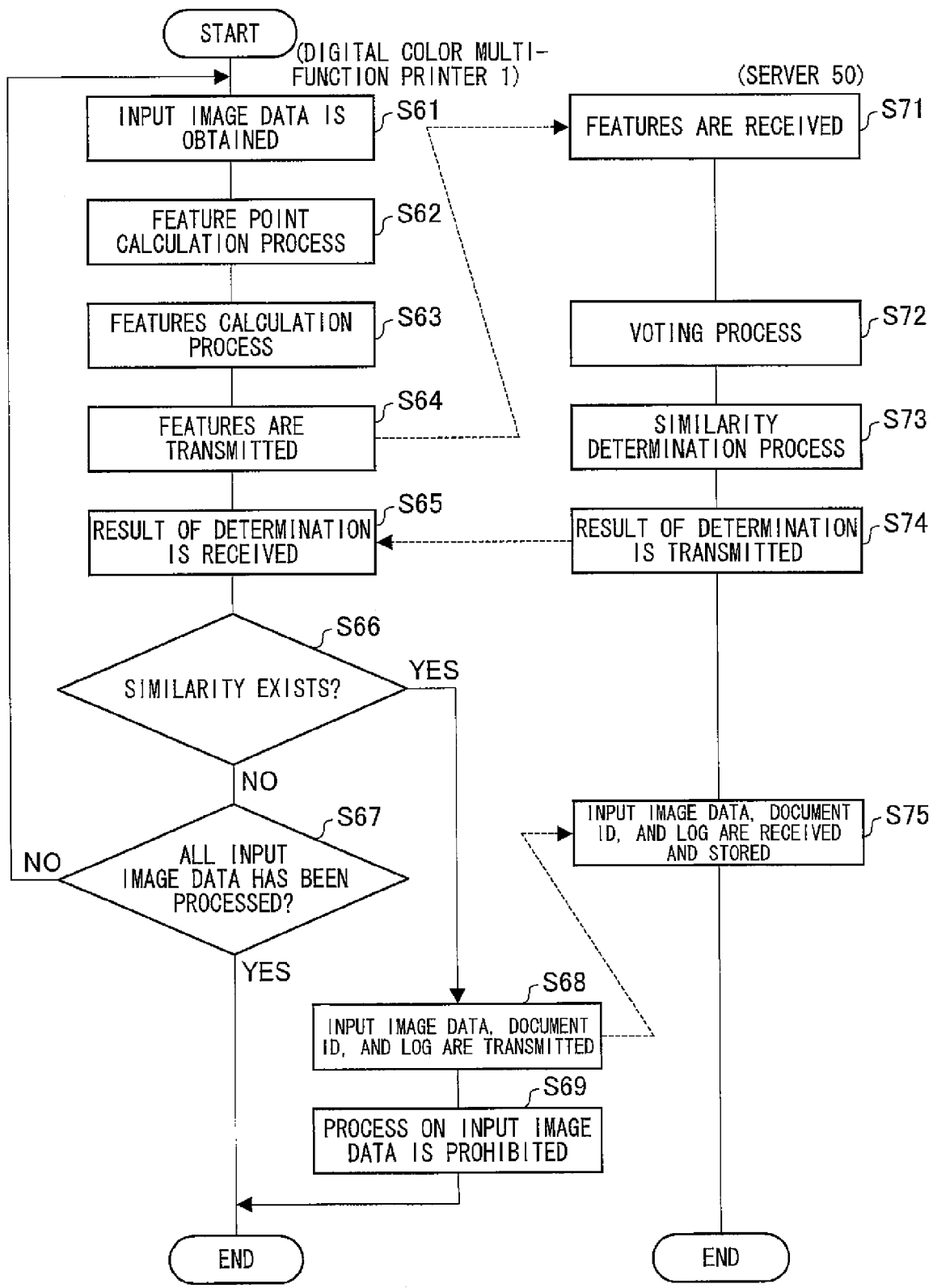
FIG. 22 is a flowchart illustrating a flow of a process in the image processing system in FIG. 21.

FIG. 22 is a flowchart illustrating a flow of the process in the image processing system 100.

When the control section 7a of the digital color multi-function printer 1 obtains input image data (S61), the control section 7a controls the feature point calculation section 31 and the features calculation section 32 so that a feature point calculation process (S62) and a features calculation process (S63) are performed.

Then, the control section 7a causes the communication device 5 to transmit features (hash value) calculated by the features calculation section 32 to the server 50 (S64). At that time, document ID, input image data etc. as well as the features may be transmitted if necessary.

In the server 50, when the communication device 51 receives the features (S71), the control section 7b controls the voting process section 33 so that a voting process is performed based on the features (hash value) received by the communication device 51 and a hash table stored in the memory 8b (S72). Further, the control section 7b controls the score calculation section 35 and the accumulated score comparison section 36 so that a similarity determination process (S73) is performed. Here, an explanation is made as to a case where the similarity determination process is performed in the manner described in Embodiment 2. Alternatively, the similarity determination process may be performed in the manner described in Embodiment 1 or 3 for example.

The control section 7b causes the communication device 51 to transmit a judgment signal indicative of the result of the similarity determination process (a similarity exists/a similarity does not exist) to the digital color multi-function printer 1 (S74).

In the digital color multi-function printer 1, when the communication device 5 receives the judgment signal (S65), the control section 7a judges whether a similarity exists or not (S66).

When judging in S66 that a similarity does not exist, the control section 7a judges whether all input image data has been processed (S67). When unprocessed input image data remains, the control section 7a causes the unprocessed input image data to be subjected to the process of S61 and the subsequent processes, and when all input image data has been processed, the control section 7a finishes the process.

On the other hand, when judging in S66 that a similarity exists, the control section 7a generates a log (operation recording information: such as document ID of input image data, user ID of a user having input a process request, date/day of the week/time when the process request was input, contents of the process request), causes the communication device 5 to transmit input image data and the log to the server 50 (S68), prohibits a process on the input image data (process such as copy, printing, transmission, editing, storage etc.) (S69), and finishes the process.

In the server 50, when the communication device 51 receives the input image data and the log from the digital color multi-function printer 1, the control section 7b causes these information to be stored in the memory 8b (S75), and finishes the process.

An explanation is made above as to a case where, when it is determined in S66 that a similarity exists, the communication device 5 transmits the log to the server 50. Alternatively, the present invention may be arranged so that, in transmitting features, the digital color multi-function printer 1 transmits not only the features but also a log to the server 50. Alternatively, the present invention may be arranged so that not only a log but also document ID of an input image, input image data (or encoded image data obtained by encoding the input image data or image data obtained by changing the input image data to have lower resolution), an index of a reference image etc. are transmitted. Further, instead of the input image data (or encoded image data obtained by encoding the input image data or image data obtained by changing the input image data to have lower resolution), a reference image corresponding to an input image (or encoded image data obtained by encoding the reference image or image data obtained by changing the reference image to have lower resolution) may be notified. At that time, the document ID of the input image and the reference image (or encoded image data obtained by encoding the reference image or image data obtained by changing the reference image to have lower resolution) may be notified, or only the reference image (or encoded image data obtained by encoding the reference image or image data obtained by changing the reference image to have lower resolution) may be notified.

Figure 23:
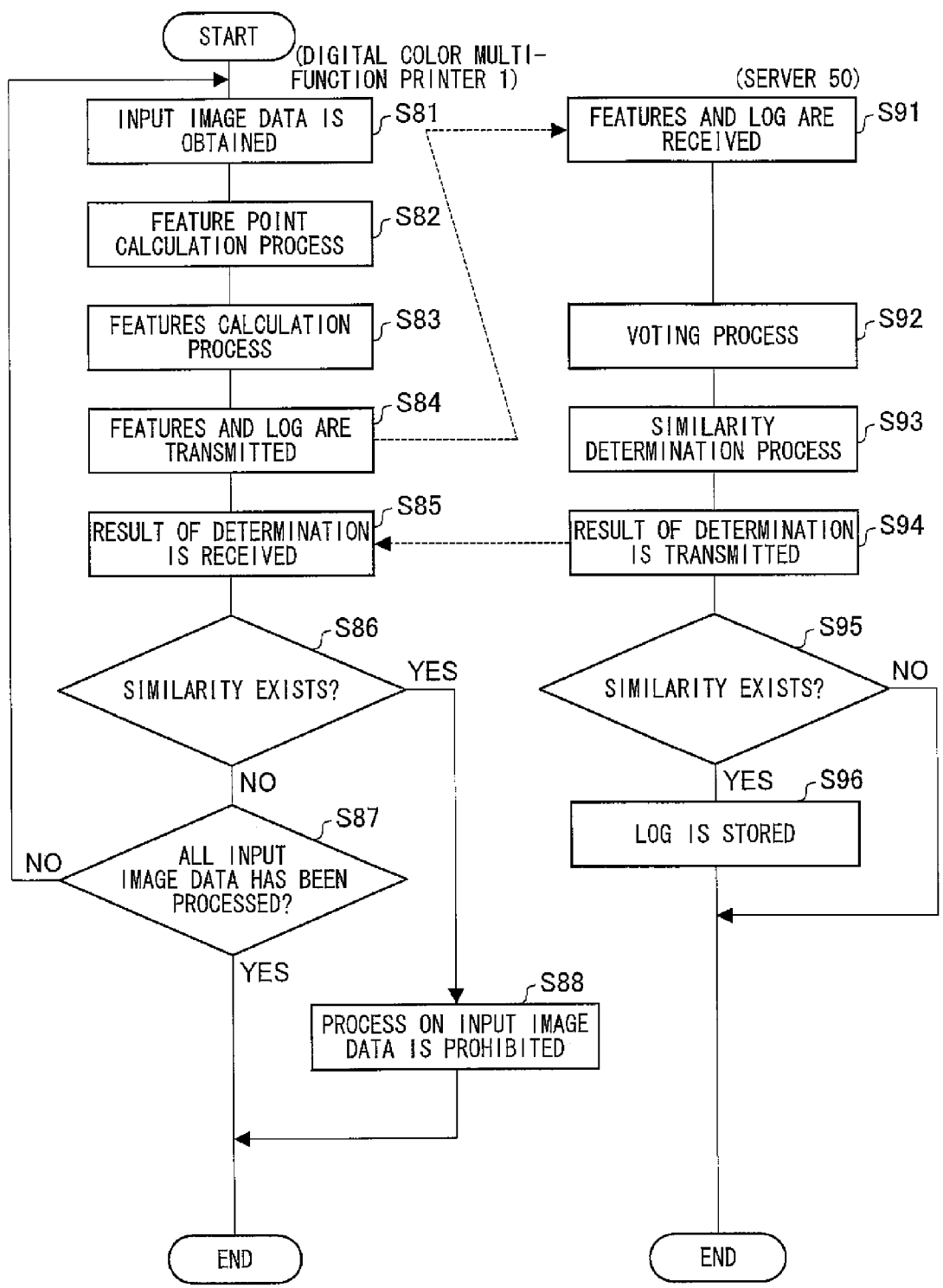
FIG. 23 is a flowchart of a modification example of a flow of a process in the image processing system in FIG. 21.

FIG. 23 is a flowchart illustrating a flow of the process at that time. When the control section 7a of the digital color multi-function printer 1 obtains input image data (S81), the control section 7a controls the feature point calculation section 31 and the features calculation section 32 so that a feature point calculation process (S82) and a features calculation process (S83) are performed.

Next, the control section 7a generates a log (operation recording information) based on, for example, document ID of the input image, user ID of a user having input a process request, date/day of the week/time when the process request was input, and contents of the process request etc., and causes the communication device 5 to transmit the generated log and features (hash value) calculated by the features calculation section 32 to the server 50 (S84). The log is not particularly limited as long as it is information regarding an operation record. The log may include at least one of document ID, user ID, a process mode, the number of sheets to be processed, and time.

In the server 50, when the communication device 51 receives the features and the log (S91), the control section 7b controls the voting process section 33 so that a voting process is performed based on the features (hash value) received by the communication device 51 and the hash table stored in the memory 8b (S92). Further, the control section 7b controls the score calculation section 35 and the accumulated score comparison section 36 so that a similarity determination process (S93) is performed.

Then, the control section 7b causes the communication device 51 to transmit a judgment signal indicative of the result of the similarity determination process (a similarity exists/a similarity does not exist) to the digital color multi-function printer 1 (S94).

Further, the control section 7b judges whether the result of the similarity determination process is "a similarity exists" or not (S95). When judging in S95 that a similarity exists, the control section 7b stores the log in the memory 8b (S96), and finishes the process. On the other hand, when judging in S95 that a similarity does not exist, the control section 7b finishes the process without storing the log.

In the digital color multi-function printer 1, when the communication device 5 receives the judgment signal (S85), the control section 7a judges whether a similarity exists or not in accordance with the judgment signal (S86). When judging in S86 that a similarity does not exist, the control section 7a judges whether all input image data has been processed (S87). When unprocessed input image data remains, the control section 7a causes the unprocessed input image data to be subjected to the process of S81 and the subsequent processes. When all input image data has been processed, the control section 7a finishes the process.

On the other hand, when judging in S86 that a similarity exists, the control section 7a prohibits input image data from being subjected to a process (such as copying, printing, transmission, editing, storage) (S88), and finishes the operation. The present invention may be arranged so that when judging in S86 that a similarity exists, the control section 7a transmits input image data to the server 50 and the server 50 stores input image data as well as a log in the memory 8b. Further, the present invention may be arranged so that the processes of S94, S85, S86, and S88 are omitted in the process example of FIG. 23, and the server 50 does not transmit the result of similarity determination to the digital color multi-function printer 1.

In the example of FIG. 21, an explanation was made as to a case where all sections of the features calculation section 32 (feature point extracting section 32a, invariant calculation section 32b, and hash value calculation section 32c) are included in the digital color multi-function printer 1 and the digital color multi-function printer 1 transmits a hash value to the server 50. However, the present invention is not limited to this case.

Figure 24:
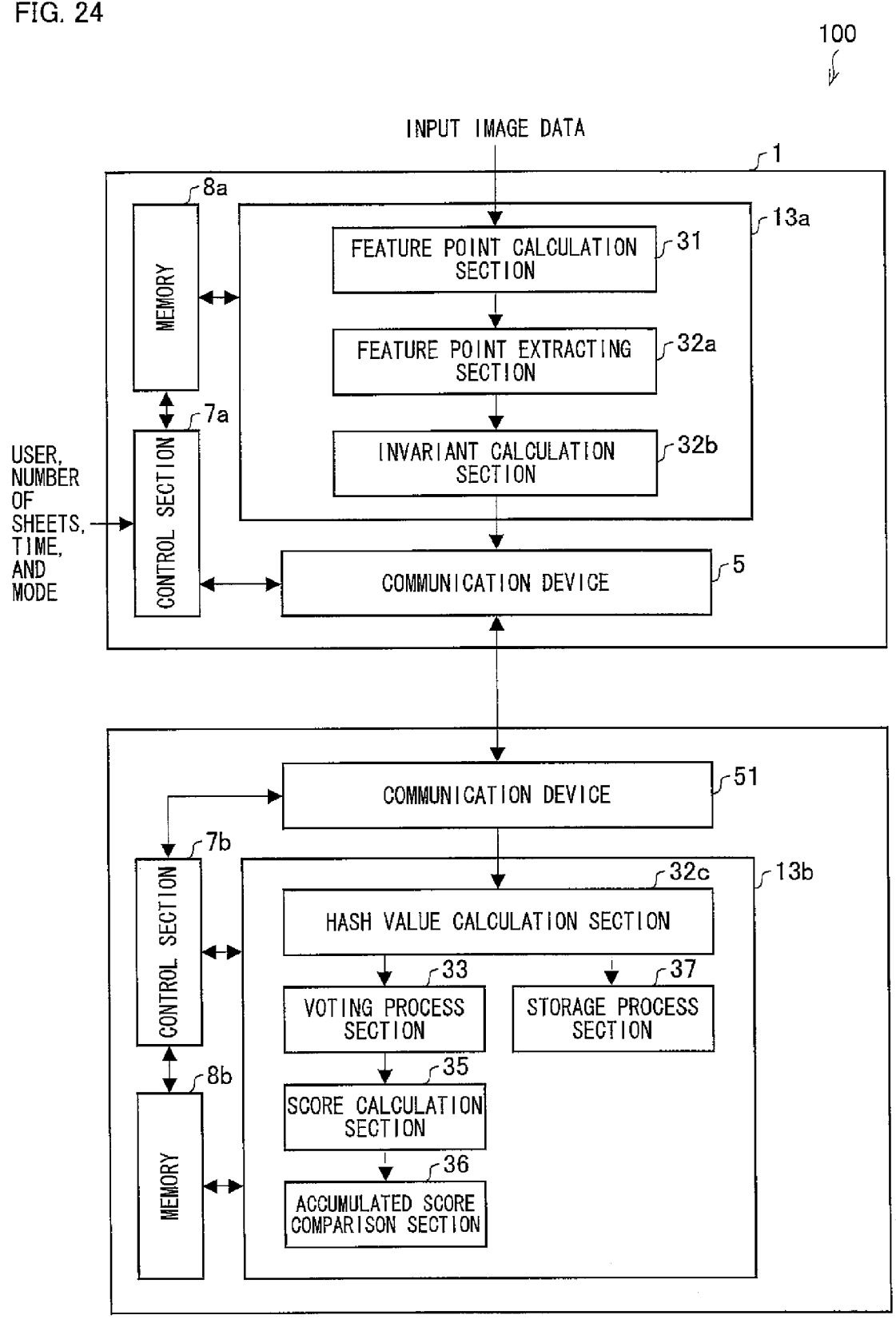
FIG. 24 is a block diagram illustrating a modification example of the image processing system in FIG. 21.

For example, the present invention may be arranged so that, as illustrated in FIG. 24, the feature point extracting section 32a and the invariant calculation section 32b are included in the digital color multi-function printer 1 and the hash value calculation section 32c is included in the server 50.

Figure 25:
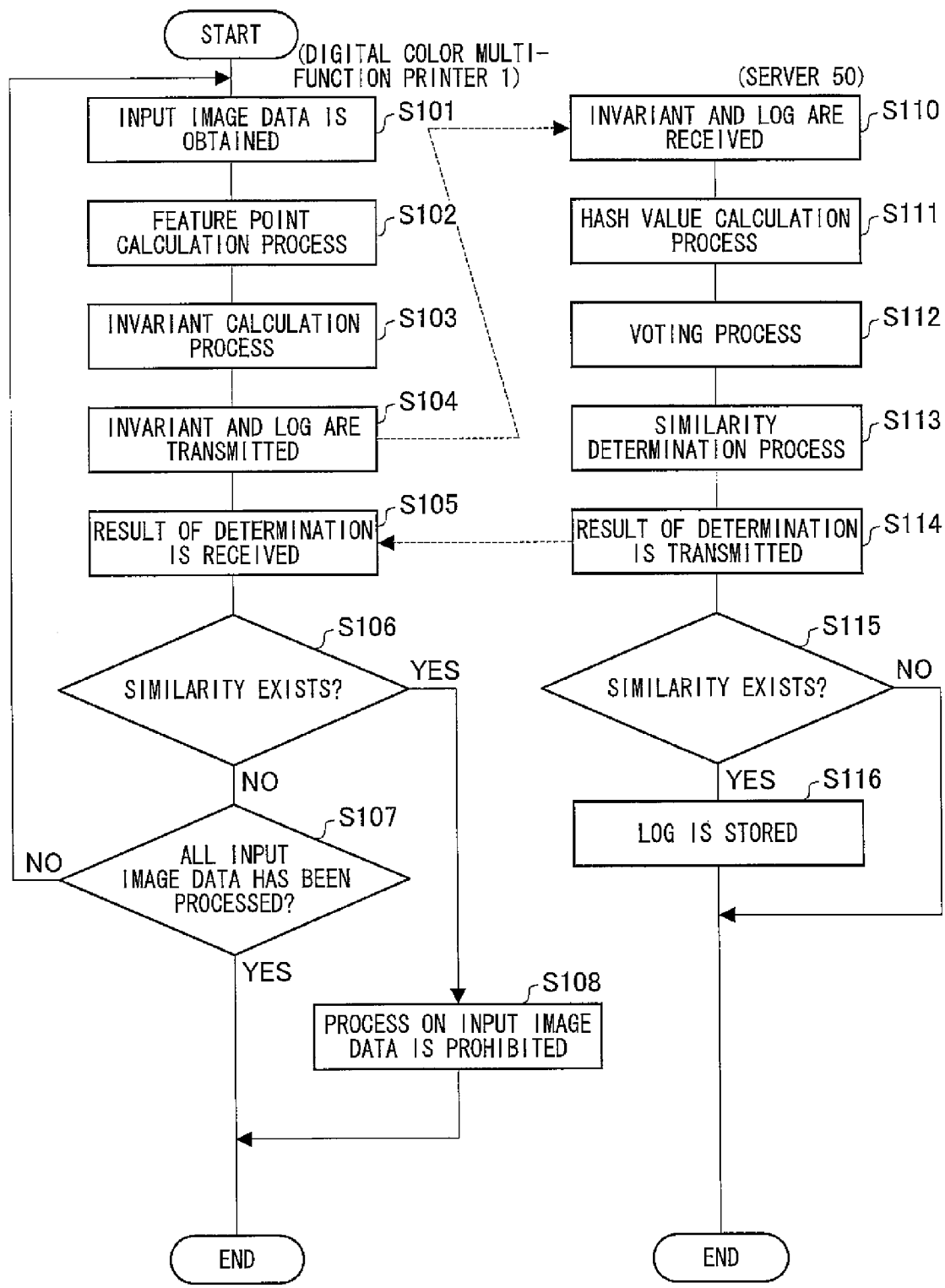
FIG. 25 is a flowchart illustrating a flow of a process in the image processing system in FIG. 24.

FIG. 25 is a flowchart illustrating a flow of a similarity determination process at that time. When the control section 7a of the digital color multi-function printer 1 obtains input image data (S101), the control section 7a controls the feature point calculation section 31 so that a feature point calculation process is performed (S102), and controls the feature point extracting section 32a and the invariant calculation section 32b so that an invariant Hij is calculated (S103).

Then, the control section 7a generates a log (operation recording information) based on, for example, document ID of input image, user ID of a user having input a process request, date/day of the week/time when the process request was input, and contents of the process request etc., and causes the communication device 5 to transmit the generated log and the invariant (features) calculated by the invariant calculation section 32b to the server 50 (S104).

In the server 50, when the communication device 51 receives the features and the log (S110), the control section 7b controls the hash value calculation section 32c so that a hash value is calculated (S111).

Next, the control section 7b controls the voting process section 33 so that a voting process is performed based on the hash value calculated by the hash value calculation section 32c and a hash table stored in the memory 8b (S112). Further, the control section 7b controls the score calculation section 35 and the accumulated score comparison section 36 so that a similarity determination process (S113) is performed.

Then, the control section 7b causes the communication device 51 to transmit a judgment signal indicative of the result of the similarity determination process (a similarity exists/a similarity does not exist) to the digital color multi-function printer 1 (S114).

Further, the control section 7b judges whether the result of the similarity determination process indicates a similarity exists or not (S115). When a similarity exists, the control section 7b stores a log in the memory 8b (S116), and finishes the process. On the other hand, when a similarity does not exist, the control section 7b finishes the process without storing the log.

In the digital color multi-function printer 1, when the communication device 5 receives the judgment signal (S105), the control section 7a judges whether a similarity exists or not in accordance with the judgment signal (S106). When judging in S106 that a similarity does not exist, the control section 7a judges whether all input image data has been processed or not (S107). When unprocessed input image data remains, the control section 7a causes the unprocessed input image data to be subjected to the process of S101 and the subsequent processes. When all input image data has been processed, the control section 7a finishes the operation.

On the other hand, when judging in S106 that a similarity exists, the control section 7a prohibits input image data from being subjected to a process (such as copying, printing, transmission, editing, storage) (S108), and finishes the operation. The present invention may be arranged so that when judging in S106 that a similarity exists, the control section 7a transmits input image data to the server 50 and the server 50 stores the input image data as well as a log in the memory 8b. In a case where efficiency in a communication process is required to increase, it is preferable to arrange the present invention so that the digital color multi-function printer 1 transmits a hash value to the server 50, since a hash value has a smaller amount of data than an invariant has. In order to simplify the structure of the digital color multi-function printer 1, it is preferable to provide the hash value calculation section 32c in the server 50.

Further, the present invention may be arranged so that each section of the features calculation section 32 is included in the server 50, data indicative of feature points calculated by the feature point calculation section 31 is transmitted from the digital color multi-function printer 1 to the server 50, and the features calculation section 32 included in the server 50 calculates a hash value in accordance with a hash table stored in the memory 8b and the received data indicative of feature points. Alternatively, the present invention may be arranged so that each section of the feature point calculation section 31 and each section of the features calculation section 32 are included in the server 50, input image data is transmitted from the digital color multi-function printer 1 to the server 50, and the feature point calculation section 31 and the features calculation section 32 included in the server 50 calculate a hash value in accordance with input image data received from the server 50 and a hash table stored in the memory 8b.

An explanation was made above as to a case where a similarity determination process is performed. In a case where a storage process is performed, the storage process section 37 included in the server 50 causes (i) document ID received from the digital color multi-function printer 1 and (ii) a hash value received from the digital color multi-function printer 1 (or hash value calculated by the hash value calculation section 32c included in the server 50) to be stored in a hash table provided in the memory 8b. Whether to perform the similarity determination process or the storage process may be designated by a user of the digital color multi-function printer 1 via the operation panel 6 so that a signal indicative of the designated process is transmitted to the server 50. Alternatively, the server 50 performs the storage process with respect to an input image determined as having no similarity as a result of the similarity determination process.

In a case where the hash value calculation section 32c is included in the server 50, the present invention may be arranged so that a hash value is calculated through a method different from the method used in calculating hash values stored in the hash table (i.e. using other hash function), and the hash table is updated using the calculated hash value. With the arrangement, it is possible to store in the hash table a suitable hash value obtained by referring to features (invariant) according to the kind etc. of a document image (i.e. it is possible to update the hash table), and the voting process can be performed with use of the updated hash value. This allows increasing matching accuracy (accuracy in similarity determination).

Figure 26:
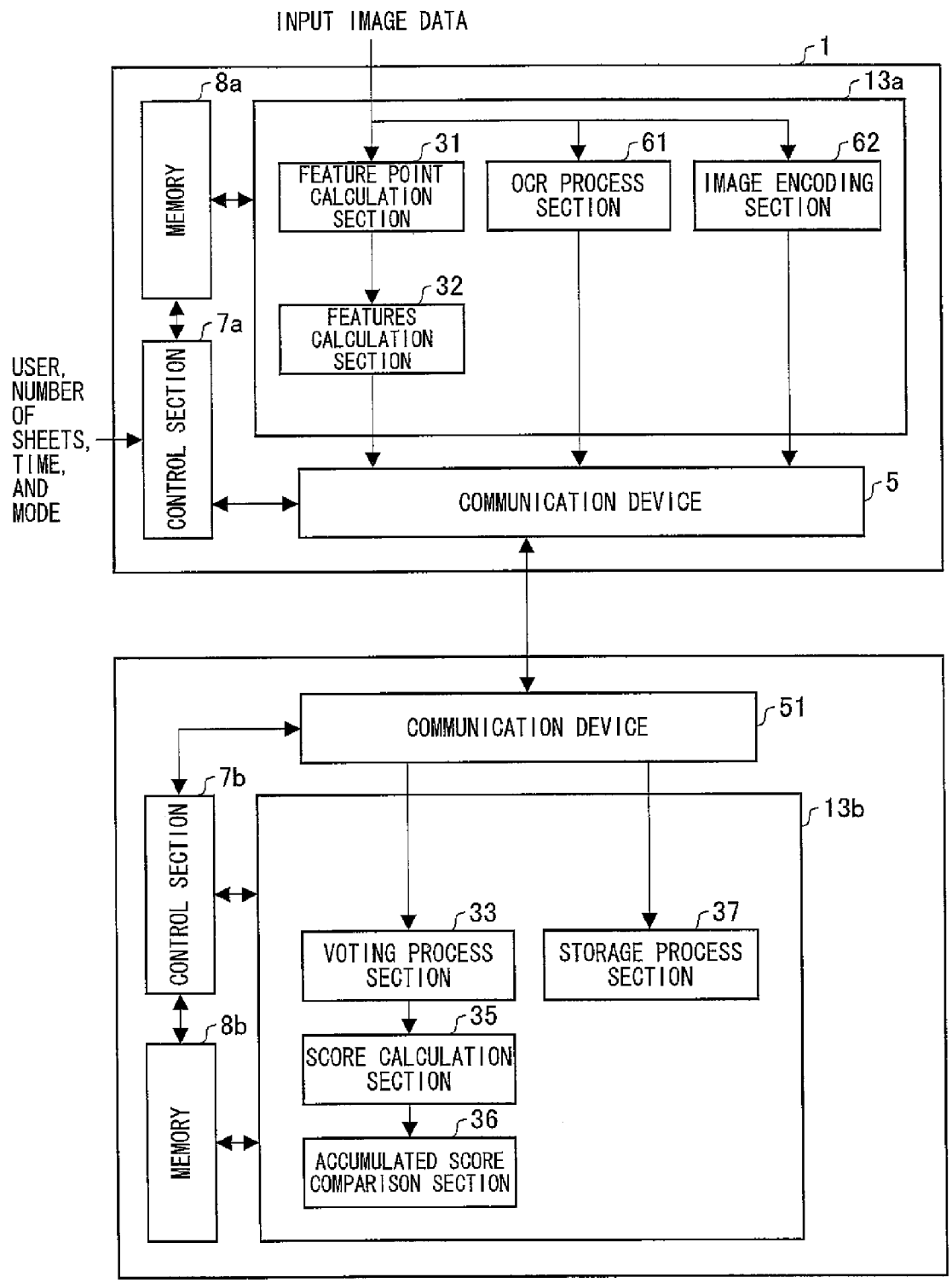
FIG. 26 is a block diagram illustrating another modification example of the image processing system in FIG. 21.

Further, the present invention may be arranged so that not only features (hash value or invariant) but also text information extracted form input image data and encoded image data obtained by encoding input image data etc. for example are transmitted to the server 50. FIG. 26 is a block diagram illustrating an example of a structure of the image processing system 100 in this case.

In the image processing system 100 in FIG. 26, the digital color multi-function printer 1 includes an OCR process section 61 and an image encoding section 62 in addition to the structure of FIG. 21.

The OCR (Optical Character Recognition) process section 61 extracts text information (text data) from input image data. The OCR process section 61 may be similar to one of conventional and publicly known OCR devices.

The image encoding section 62 encodes input image data so as to generate encoded image data. A method for encoding input image data is not particularly limited and may be one of conventional and publicly known methods. For example, data in a high encoding format such as high encoding PDF and data in an encoding format such as TIFF and JPEG may be generated.

Further, the present invention may be arranged so that there is provided a segmentation process section for classifying input image data into a text region including texts and/or lines and a region other than the text region, and the image encoding section 62 encodes input image data indicative of the text region and input image data indicative of the region other than the text region in different manners in order to improve legibility of texts. Encoded image data may be generated through the method disclosed in Japanese Patent No. 2611012 for example. That is, encoded image data may be generated as follows: input image data is subjected to a segmentation process so as to be classified into a text region (texts and lines) and a color image region (full color image, half tone image etc.), and the text region is encoded as a whole through MMR etc. after a portion from which the color image region was removed is filled with blank information, and the color image region is encoded through ADCT encoding (Adaptive Discrete Cosine Transform encoding) etc. after a portion from which the text region was removed is filled with average image data surrounding the portion so as to prevent a great change in density. By using data in a high encoding format such as high compression PDF, it is possible to reduce the amount of image data to be transferred, and to transmit image data whose texts have high legibility to the server 50. Consequently, it is possible to store image data whose texts have high legibility as an image log in the server 50.

Figure 27:
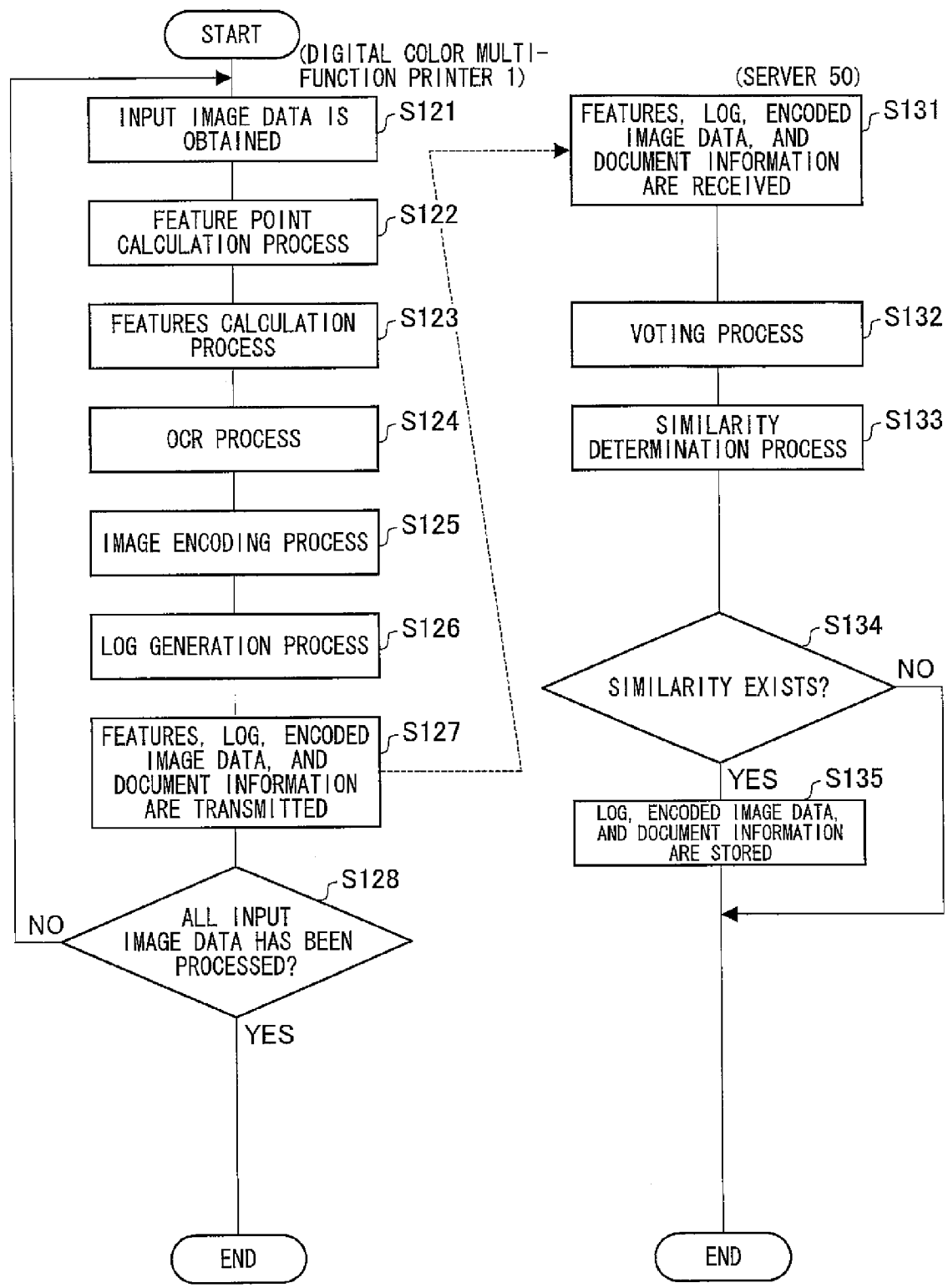
FIG. 27 is a flowchart illustrating a flow of a process in the image processing system in FIG. 26.
Figure 28:
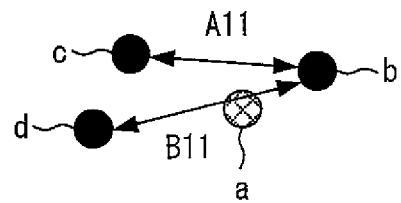
FIGS. 28(a) to 28(d) are explanatory drawings each illustrating an example of a combination of a target feature point and a peripheral feature point that are extracted at a time when the features calculation section in the image processing apparatus in accordance with one embodiment of the present invention calculates features.
Figure 28:
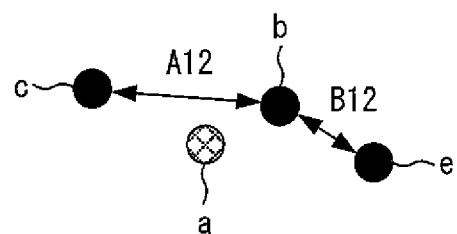
Figure 28:
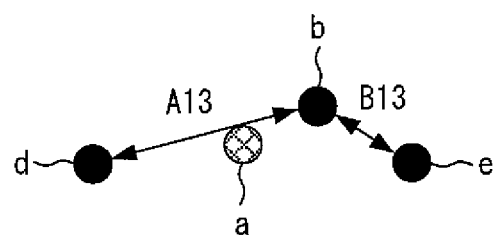
Figure 28:
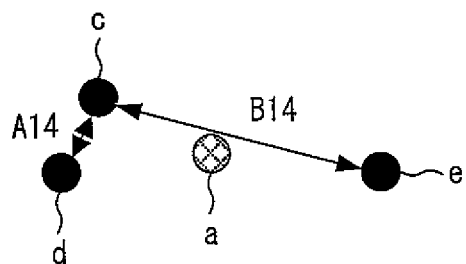
Figure 29:
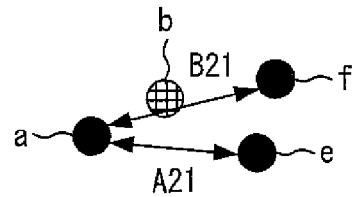
FIGS. 29(a) to 29(d) are explanatory drawings each illustrating an example of a combination of a target feature point and a peripheral feature point that are extracted at a time when the features calculation section in the image processing apparatus in accordance with one embodiment of the present invention calculates features.
Figure 29:
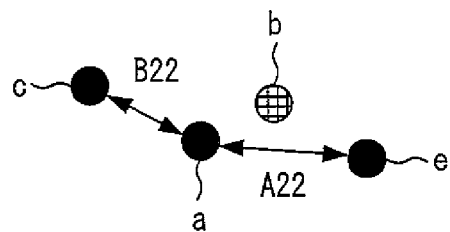
Figure 29:
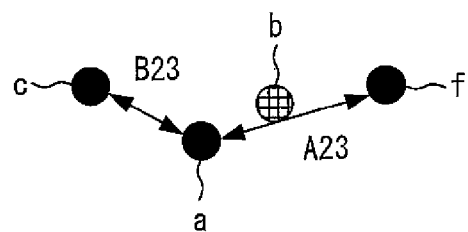
Figure 29:
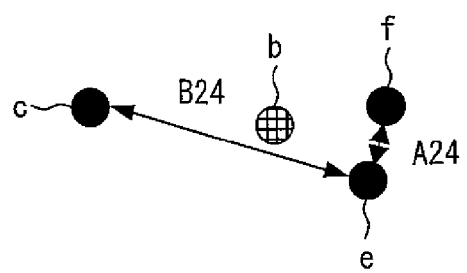

FIG. 27 is a flowchart illustrating a flow of the similarity determination process in the image processing system 100 in FIG. 26. In the digital color multi-function printer 1, when the control section 7a obtains input image data (S121), the control section 7a controls the feature point calculation section 31 so that a feature point calculation process is performed (S122), and the control section 7*a* controls the features calculation section 32 so that features (hash value) are calculated (S123). Further, the control section 7*a* controls the OCR process section 61 so that text information is extracted from input image data (S124). Further, the control section 7*a* controls the image encoding section 62 so that input image data is encoded to generate encoded image data (S125). Further, the control section 7*a* generates a log (operation recording information) based on document ID of an input image, user ID having input a process request, date/day of the week/time when the process request was input, contents of the process request etc. for example (S126). The process for calculating features, the process for extracting text information, and the process for generating encoded image data may be performed in parallel.

Then, the control section 7*a* causes features, text information, encoded image data, and a log to be transmitted from the communication device 5 to the server 50 (S127). The control section 7*a* judges whether all input image data has been processed or not (S128). When unprocessed input image data remains, the control section 7*a* causes the unprocessed input image data to be subjected to the process of S121 and the subsequent processes. When all input image data has been processed, the control section 7*a* finishes the operation.

In the server 50, when the communication device 51 receives the features, the text information, the encoded image data, and the log (S131), the control section 7*b* controls the voting process section 33 so that a voting process is performed based on the received features and the hash table stored in the memory 8*b* (S132). Further, the control section 7*b* controls the score calculation section 35 and the accumulated score comparison section 36 so that a similarity determination process (S133) is performed.

Then, the control section 7*b* judges whether the result of the similarity determination process indicates that a similarity exists or not (S134). When a similarity exists, the control section 7*b* stores the log, the text information, and the encoded image data in the memory 8*b* (S135), and finishes the process. When a similarity does not exist, the control section 7*b* finishes the process without storing the log etc.

As described above, text information extracted from input image data and encoded image data obtained by encoding the input image data are generated, and the text information and the encoded image data are stored in the memory 8*b* when it is determined that a similarity exists. Consequently, when a plurality of document images with a high similarity are extracted, it is possible for an administrator to search a particular document image according to text information or perform similar operation, or to judge whether the similarity determination is appropriate or not by checking the text information and the encoded image data.

In the example of FIG. 26, an explanation was made as to a case where the image processing system 100 includes the OCR process section 61 and the image encoding section 62. Alternatively, the present invention may be arranged so that the image processing system 100 includes only one of the OCR process section 61 and the image encoding section 62.

Further, in the present embodiment, an explanation was made as to a case where the image processing system 100 includes the digital color multi-function printer 1 and the server 50. Alternatively, the present invention may be arranged so that the image processing system 100 includes the server 50 and at least one of a multi-function printer, a printer (image forming apparatus), a facsimile, a computer, a digital camera (image reading apparatus), and a scanner (image reading apparatus). That is, the present invention may be arranged so that input image data, a hash value calculated from the input image data, an invariant etc. are transmitted from the multi-function printer, the printer, the facsimile, the computer, the digital camera, the scanner etc. to the server 50, and the server 50 performs the similarity determination process and transmits a signal corresponding to the result of the similarity determination process.

The scanner includes a scanner platen, an optical scanning section, CCD (charge coupled device) etc. The scanner scans a document image on the scanner platen with use of the optical scanning section, thereby reading the document image and forming image data. The digital camera includes an image-capture lens, a CCD etc. The digital camera captures a document image, a person image, a landscape image etc. and generates image data. The scanner and the digital camera may have a function for performing a predetermined image process (such as various correction processes) in order to reproduce an image suitably.

The printer prints on a sheet (recording paper) an image according to image data generated by the computer, the scanner, and the digital camera. The facsimile performs a process such as a binary process, a resolution conversion process, and a rotation process on image data supplied from an image input device to obtain image data encoded into a predetermined format and sends the image data to the other end, or the facsimile receives image data from the other end, decodes the image data, performs a rotation process, a resolution conversion process, and a halftone process on the image data in accordance with performance of an image output device, and outputs the image data as an image per page.

The multi-function printer includes at least two functions out of a scanner function, a facsimile transmission function, and a printing function (copy function, printer function).

The computer edits image data read by the scanner and the digital camera, or generates a document with use of application software.

In the above embodiments, an explanation was made as to a case where an index and features of a reference image are stored in the memory 8. Alternatively, image data indicative of a reference image may be stored in the memory. In the latter case, the similarity determination process is performed in such a manner that at a time of performing a similarity determination process, the feature point calculation section 31 and the features calculation section 32 calculate features of the reference image data, and the similarity determination process is performed in accordance with the calculated features.

In each of the above embodiments, each section (each block) constituting the document matching process section and the control section included in the digital color multi-function printer 1 and/or the server 50 may be realized by software by using a processor such as a CPU. Namely, the digital color multi-function printer 1 and/or the server 50 include: a CPU (central processing unit) for executing a control program for realizing each function; a ROM (read only memory) that stores the program; a RAM (random access memory) that develops the program; a storage device (storage medium) such as a memory in which the program and various data are stored; and the like. The object of the present invention can be realized in such a manner that the digital color multi-function printer 1 and/or the server 50 are provided with a computer-readable storage medium for storing program codes (such as executable program, intermediate code program, and source program) of control programs of the digital color multi-function printer 1 and/or the server 50 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a Floppy Disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the digital color multi-function printer 1 and/or the server 50 may be arranged so as to be connectable to a communication network so that the program code is supplied to the digital color multi-function printer 1 and/or the server 50 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR, mobile phone network, satellite connections, and terrestrial digital network. Note that the present invention can be also realized by the program codes in the form of a computer data signal embedded in a carrier wave, which is the program that is electrically transmitted.

Furthermore, each block of the digital color multi-function printer 1 and/or the server 50 may be realized by hardware logic. Each block of the digital color multi-function printer 1 and/or the server 50 may be a combination of hardware carrying out some of the processes and the computing means controlling the hardware and executing program code for the other processes.

The computer system of the present invention may be composed of: an image input apparatus such as a flat bed scanner, a film scanner, and a digital camera; a computer loaded with a predetermined program to execute processes such as the similarity calculation process and the similarity determination process; an image display apparatus, such as a CRT display and a liquid crystal display, for displaying a result of the process by the computer; and an image forming apparatus, such as a printer, for outputting a result of the process by the computer on a paper etc. Furthermore, a network card or a modem may be provided as communication means for connecting a server etc. via a network.

As described above, the image processing apparatus of the present invention is an image processing apparatus, including: an input data obtaining section for obtaining input image data; a features extracting section for extracting features of the input image data; at least one of a storage section in which features of a reference image are stored and a reference image obtaining section for obtaining features of a reference image from an external apparatus communicably connected with the image processing apparatus; and a similarity determination section for comparing the features of the input image data with the features of the reference image so as to perform a determination process in which it is determined whether the input image data is image data corresponding to the reference image or not, the similarity determination section changing the determination process in accordance with related information of the input image data. The input data obtaining section may obtain the input image data by reading a document image, or may obtain the input image data via communications from other apparatus that are communicably connected with the image processing apparatus, or may obtain the input image data by superposing information input by a user on a pre-specified format.

With the arrangement, the image processing apparatus includes: the input data obtaining section for obtaining input image data; the features extracting section for extracting features of the input image data; at least one of the storage section in which features of a reference image are stored and the reference image obtaining section for obtaining features of a reference image from an external apparatus communicably connected with the image processing apparatus; and the similarity determination section for comparing the features of the input image data with the features of the reference image so as to perform a determination process in which it is determined whether the input image data is image data corresponding to the reference image or not. Further, the similarity determination section changes the determination process in accordance with related information of the input image data. Therefore, with the arrangement, it is possible to perform the determination process in accordance with the related information of the input image data.

Further, the image processing apparatus may be arranged so as to further include a process input section for receiving an input of a request to process the input image data, the related information including at least one of user information for specifying a user having input the request, information indicative of date, day of the week, or time when the request was input, information indicative of a size or the number of pages of the input image data, information indicative of the request, and information indicative of whether input image data includes an image with a specific hue or not. The process input section may receive a process request that is attached to the input image data (e.g. attached as header information to the input image data), or may receive a process request that is separated from the input image data and that is input via user's operation or via communications.

With the arrangement, it is possible to perform a determination process in accordance with user information for specifying a user having input the request, information indicative of date, day of the week, or time when the request was input, information indicative of a size or the number of pages of the input image data, information indicative of the request, and information indicative of whether input image data includes an image with a specific hue or not.

Further, the image processing apparatus of the present invention may be arranged so as to further include: a similarity calculation section for calculating a similarity between the input image data and the reference image; and a coefficient storage section in which a coefficient predetermined according to the related information is stored, the similarity determination section performing the determination process in such a manner that a similarity calculated by the similarity calculation section is modified in accordance with the coefficient to calculate a modified similarity, and the modified similarity and a predetermined threshold value are compared with each other. The related information corresponding to the coefficient is not particularly limited. Examples of the related information include user information for specifying a user having input the request, information indicative of date, day of the week, or time when the request was input, information indicative of a size or the number of pages of the input image data, and information indicative of a process to be performed on input image data. In this case, the coefficient is set with respect to each user, each date, each day of the week, or each time, each size or each page, or each process.

With the arrangement, the determination process is performed in such a manner that a similarity is modified in accordance with the related information to obtain a modified similarity, and the modified similarity is compared with a threshold value. Thus, the determination process is performed in accordance with the modified similarity obtained by modifying a similarity in accordance with the related information. This allows determining a similarity in accordance with a determination reference corresponding to the related information.

Further, the image processing apparatus of the present invention may be arranged so that when the input image data includes image data with plural pages, the similarity determination section performs the determination process in such a manner that the modified similarity is calculated with respect to each of the plural pages, a summation of similarities is calculated by adding the modified similarity corresponding to each of the plural pages, and the summation of similarities is compared with a predetermined first threshold value.

With the arrangement, the determination process is performed in accordance with the summation of similarities obtained by adding the modified similarity corresponding to each of the plural pages, thereby reducing frequency in false determination. Even when a similarity is calculated with respect to image data of the same document, a similarity varies according to a condition under which an image of the document is read. This may result in erroneous determination in the determination process. In contrast, with above arrangement, the determination process is performed in accordance with the summation of similarities obtained by adding the modified similarity corresponding to each of the plural pages. This reduces the influence of variation in a similarity due to an error in reading etc. with respect to each page, thereby reducing frequency of false determination.

Further, the image processing apparatus of the present invention may be arranged so that the similarity determination process performs the determination process in such a manner that the input image data is divided into plural blocks, the modified similarity is calculated with respect to each of the plural blocks, a summation of similarities is calculated by adding the modified similarity corresponding to each of the plural blocks, and the summation of similarities is compared with a predetermined second threshold value.

With the arrangement, the determination process is performed in accordance with the summation of similarities calculated by adding the modified similarity corresponding to each of the plural blocks, thereby reducing frequency of false determination.

Further, the image processing apparatus of the present invention may be arranged so as to further include: a validity input section for receiving an input of information regarding validity of a result of the determination process; and a coefficient changing section for changing the coefficient used in the determination process, in a case where the validity input section receives an input of information that the result of the determination process is false.

With the arrangement, when the validity input section receives an input of information that the result of the determination process is false, the coefficient changing section changes the coefficient, thereby increasing accuracy in the determination process.

Further, the image processing apparatus of the present invention may be arranged so as to further include: an evaluated value storage section in which (i) an evaluated value set with respect to each of groups into which each item of the relation information is classified in accordance with contents of the item and (ii) a reference evaluated value set with respect to each item of the relation information are stored; and an evaluated value calculation section for calculating an evaluated value for each item of related information of input image data, in accordance with contents of each item and the evaluated value stored in the evaluated value storage section, the similarity determination section performing the determination process in such a manner that a difference between the evaluated value for each item calculated by the evaluated value calculation section and the reference evaluated value for each item is calculated with respect to each item, a summation calculated by adding each difference is compared with a third threshold value, and a similarity is determined in accordance with a result of the comparison.

With the arrangement, the determination process is performed in accordance with contents of each item of related information of input image data.

Further, the image processing apparatus of the present invention may be arranged so as to further include: a validity input section for receiving an input of information regarding validity of a result of the determination process; and a reference evaluated value changing section for changing the reference evaluated value stored in the evaluated value storage section, in a case where the validity input section receives an input of information that the result of the determination process is false.

With the arrangement, when the validity input section receives an input of information that the result of the determination process is false, the reference evaluated value changing section changes the reference evaluated value, thereby increasing accuracy in the determination process.

Further, the image processing apparatus of the present invention may be arranged so as to further include a condition storage section in which at least one of (i) a condition of the related information under which the determination process is performed with respect to input image data and (ii) a condition of the related information under which the determination process is not performed with respect to input image data is stored, the similarity determination section judging whether to perform the determination process or not in accordance with the related information of input image data and the condition stored in the condition storage section.

With the arrangement, the similarity determination section judges whether to perform the determination process or not with respect to input image data, in accordance with related information of the input image data and a condition stored in the condition storage section. Therefore, for example, by causing (i) a condition for a case where a predetermined process is performed on input image data regardless of the result of similarity determination between the input image data and a reference image and (ii) a condition for a case where a process on input image data is changed to be stored in the condition storage section, it is possible to perform a process on the input image data in accordance with the case.

Further, the image processing apparatus of the present invention may be arranged so as to further include: a similarity calculation section for calculating a similarity between the input image data and the reference image; and a weighting coefficient storage section in which a weighting coefficient set with respect to each reference image is stored, the similarity determination section performing the determination process in such a manner that a value resulting from multiplication of the similarity calculated by the similarity calculation section and the weighting coefficient corresponding to the reference image is compared with a predetermined threshold value, or in such a manner that the similarity calculated by the similarity calculation section is compared with a value resulting from multiplication of the weighting coefficient corresponding to the reference image and a predetermined threshold value.

With the arrangement, the determination process is performed in such a manner that a weighting coefficient set with respect to each reference image is multiplied by a similarity between input image data and a reference image or by a predetermined threshold value. Thus, by setting a weighting coefficient in accordance with priority etc. of a reference image, it is possible to perform the determination process in accordance with a similarity determination reference corresponding to the priority etc. of the reference image.

Further, the image processing apparatus of the present invention may be arranged so as to further include a process restricting section for restricting input image data from being subjected to a process corresponding to a request to process the input image data, in a case where it is determined in the determination process that the input image data is image data corresponding to the reference image.

With the arrangement, the determination process is performed in accordance with related information of input image data, and the input image data is restricted from being subjected to a process corresponding to the request.

Further, the image processing apparatus of the present invention may be arranged so as to further include a notification process section for notifying a predetermined notification destination, in a case where it is determined in the determination process that input image data is image data corresponding to the reference image.

With the arrangement, the determination process is performed in accordance with related information of input image data, and when it is determined input image data corresponding to a reference image is input, a predetermined notification destination is notified.

Further, the image processing apparatus of the present invention may be arranged so that when it is determined in the determination process that input image data is image data corresponding to the reference image, the input image data or the reference image corresponding to the input image data is stored in a predetermined storage location.

With the arrangement, input image data determined as corresponding to a reference image, the input image data or the reference image corresponding to the input image data is stored in a predetermined storage location. This allows an administrator etc. to check the validity of the determination process on the input image data afterward.

Further, the image processing apparatus of the present invention may be arranged so as to further include: a storage section in which features of a reference image are stored; and a storage process section for causing the features of the reference image to be stored in the storage section, the features extracting section extracting features of a reference image, and the storage process section causing the features of the reference image that are extracted by the features extracting section to be stored in the storage section.

With the arrangement, it is possible to add/update features of a reference image to be stored in the storage section.

Further, the image processing apparatus of the present invention may be arranged so as to further include: a reference image obtaining section for obtaining features of a reference image from an external apparatus communicably connected with the image processing apparatus; and a reference image output section for transmitting the features of the reference image to the external apparatus, the features extracting section extracting features of a reference image, and the reference image output section transmitting, to the external apparatus, the features of the reference image that are extracted by the features extracting section.

With the arrangement, it is possible to transmit features of a reference image that were obtained by the reference image obtaining section to the external apparatus, thereby causing the features to be stored in the external apparatus or adding/updating the features stored in the external apparatus.

The image forming apparatus of the present invention is an image forming apparatus for forming an image corresponding to input image data, including one of the aforementioned image processing apparatuses.

With the arrangement, the determination process is performed in accordance with related information of input image data, and an image formation process is restricted in accordance with the result of the determination process.

The image processing system of the present invention is an image processing system, including an image processing apparatus and a server communicably connected with the image processing apparatus, there are provided: an input data obtaining section for obtaining input image data; a features extracting section for extracting features of the input image data; a storage section in which features of a reference image are stored; and a similarity determination section for performing a determination process in which the features of the input image data are compared with the features of the reference image so as to determine whether the input image data is image data corresponding to the reference image or not, the input data obtaining section, the features extracting section, the storage section, and the similarity determination section being divided into the image processing apparatus and the server, the similarity determination section changing the determination process in accordance with related information of the input image data. The image processing apparatus is not particularly limited as long as it performs a predetermined process on image data. Examples of the image processing apparatus include a copier, a printer, a facsimile, a display device, a communication device, an image editing device for editing synthesizing, modifying etc. image data, and a device obtained by combining two or more of the above devices.

With the arrangement, there are provided: an input data obtaining section for obtaining input image data; a features extracting section for extracting features of the input image data; a storage section in which features of a reference image are stored; and a similarity determination section for performing a determination process in which the features of the input image data are compared with the features of the reference image so as to determine whether the input image data is image data corresponding to the reference image. The similarity determination section changes the determination process in accordance with related information of the input image data. Consequently, the above arrangement allows a determination process in accordance with related information of input image data.

Further, the image processing system of the present invention may be arranged so that the features extracting section is included in the image processing apparatus and the similarity determination section is included in the server, the image processing apparatus outputs the features of the input image data that are extracted by the features extracting section to the server, and the server performs the determination process in accordance with the features from the image processing apparatus.

With the arrangement, the image processing apparatus extracts features of input image data and outputs the extracted features to the server, allowing the server to perform the determination process. Consequently, it is unnecessary to transmit image data from the image processing apparatus to the server, so that it is possible to reduce the amount of data transmitted from the image processing apparatus to the server.

Further, the image processing system of the present invention may be arranged so that the image processing apparatus includes a log generating section for generating log information regarding the input image data, the image processing apparatus outputs the log information to the server, and when the similarity determination section determines that the input image data is image data corresponding to the reference image, the server causes the log information to be stored in a log storage section included in the server.

With the arrangement, an administrator etc. can see log information stored in the log storage section so as to check a document image determined as image data corresponding to the reference image. This allows the administrator etc. to easily check the validity of the result of the similarity determination.

Further, the image processing system may be arranged so that the image processing apparatus includes an image encoding section for generating encoded image data by encoding input image data, the image processing apparatus outputs the encoded image data to the server, and when the similarity determination section determines that the input image data is image data corresponding to the reference image, the server causes the encoded image data to be stored in an image storage section included in the server.

With the arrangement, an administrator etc. can see encoded image data stored in the image storage section so as to check a document image determined as image data corresponding to the reference image. This allows the administrator etc. to easily check the validity of the result of the similarity determination.

The image processing system of the present invention may be arranged so that the image processing apparatus includes a segmentation section for classifying input image data into a text region including a text and/or a line and a region other than the text region, and the image encoding section encodes the text region and the region other than the text region through different encoding methods.

With the arrangement, by causing a method for encoding a text region to be a method allowing higher legibility of a text than a method for encoding a region other than the text region, it is possible for an administrator etc. to check a document image suitably.

Further, the image processing system of the present invention may be arranged so that the image processing apparatus includes a text identifying section for identifying text information included in input image data, the image processing apparatus outputs the text information to the server, and when the similarity determination section determines that the input image data is image data corresponding to the reference image, the server causes the text information to be stored in a text information storage section included in the server.

With the arrangement, an administrator etc. can see text information stored in the text information storage section so as to check a document image determined as image data corresponding to the reference image. This allows the administrator etc. to easily check the validity of the result of the similarity determination.

The image processing system of the present invention may be arranged so that the image processing apparatus or the server includes a notification process section for notifying a predetermined notification destination when the similarity determination section determines that input image data is image data corresponding to the reference image.

With the arrangement, the determination process is performed in accordance with related information of input image data, and when the input image data is determined as image data corresponding to a reference image, a predetermined notification destination is notified.

The image processing system of the present invention may be arranged so that when the similarity determination section determines that input image data is image data corresponding to the reference image, the image processing apparatus or the server causes at least one of the input image data or log information regarding the input image data to be stored in a predetermined storage location.

With the arrangement, the determination process is performed in accordance with related information of input image data, and when the input image data is determined as image data corresponding to a reference image, at least one of the input image data and log information regarding the input image data is stored in a predetermined storage location. This allows an administrator etc. to check the validity of the determination process on the input image data afterward.

The image processing system of the present invention may be arranged so as to further include: a second features extracting section for extracting features of a reference image; and a storage process section for causing the features of the reference image that are extracted by the second features extracting section to be stored in the storage section. Alternatively, the image processing system of the present invention may be arranged so as to further include a storage process section for causing features of a reference image to be stored in the storage section, the features extracting section extracting features of a reference image, and the storage process section causing the features of the reference image that are extracted by the features extracting section to be stored in the storage section.

With the arrangement, it is possible to add/update features of a reference image stored in the storage section.

The image processing method of the present invention is an image processing method, including the steps of: (i) obtaining input image data; (ii) extracting features of input image data; (iii) obtaining features of a reference image; and (iv) performing a determination process in which the features of the input image data are compared with the features of the reference image so as to determine whether the input image data is image data corresponding to the reference image or not, the determination process in the step (iv) being changed in accordance with related information of the input image data.

The method includes the steps of: (i) obtaining input image data; (ii) extracting features of input image data; (iii) obtaining features of a reference image; and (iv) performing a determination process in which the features of the input image data are compared with the features of the reference image so as to determine whether the input image data is image data corresponding to the reference image. The determination process in the step (iv) is changed in accordance with related information of the input image data. Therefore, the above arrangement allows a determination process in accordance with related information of input image data.

The image processing apparatus may be realized by a computer. In this case, the present invention also includes: an image processing program for causing a computer to operate as each of the above sections so as to realize the image processing apparatus by use of the computer; and a computer-readable storage medium in which the program is stored.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus, comprising:
an input data obtaining section for obtaining input image data;
a features extracting section for extracting features of the input image data;
at least one of a storage section in which features of a reference image are stored and a reference image obtaining section for obtaining features of a reference image from an external apparatus communicably connected with the image processing apparatus; and
a similarity determination section for comparing the features of the input image data with the features of the reference image so as to perform a determination process in which it is determined whether the input image data is image data corresponding to the reference image or not,
the similarity determination section changing the determination process in accordance with related information of the input image data, and further comprising:
an evaluated value storage section in which (i) an evaluated value set with respect to each of groups into which each item of the relation information is classified in accordance with contents of the item and (ii) a reference evaluated value set with respect to each item of the relation information are stored; and
an evaluated value calculation section for calculating an evaluated value for each item of related information of input image data, in accordance with contents of each item and the evaluated value stored in the evaluated value storage section,
the similarity determination section performing the determination process in such a manner that a difference between the evaluated value for each item calculated by the evaluated value calculation section and the reference evaluated value for each item is calculated with respect to each item, a summation calculated by adding each difference is compared with a third threshold value, and a similarity is determined in accordance with a result of the comparison.

2. The image processing apparatus as set forth in claim 1, further comprising a process input section for receiving an input of a request to process the input image data,
the related information including at least one of user information for specifying a user having input the request, information indicative of date, day of the week, or time when the request was input, information indicative of a size or the number of pages of the input image data, information indicative of the request, and information indicative of whether input image data includes an image with a specific hue or not.

3. The image processing apparatus as set forth in claim 1, further comprising:
a similarity calculation section for calculating a similarity between the input image data and the reference image; and
a coefficient storage section in which a coefficient predetermined according to the related information is stored,
the similarity determination section performing the determination process in such a manner that a similarity calculated by the similarity calculation section is modified in accordance with the coefficient to calculate a modified similarity, and the modified similarity and a predetermined threshold value are compared with each other.

4. An image processing apparatus, comprising:
an input data obtaining section for obtaining input image data;
a features extracting section for extracting features of the input image data;
at least one of a storage section in which features of a reference image are stored and a reference image obtaining section for obtaining features of a reference image from an external apparatus communicably connected with the image processing apparatus; and
a similarity determination section for comparing the features of the input image data with the features of the reference image so as to perform a determination process in which it is determined whether the input image data is image data corresponding to the reference image or not,
the similarity determination section changing, the determination process in accordance with related information of the input image data;
a similarity calculation section for calculating a similarity between the input image data and the reference image; and
a coefficient storage section in which a coefficient predetermined according to the related information is stored,
the similarity determination section performing the determination process in such a manner that a similarity calculated by the similarity calculation section is modified in accordance with the coefficient to calculate a modified similarity, and the modified similarity and a predetermined threshold value are compared with each other,
wherein when the input image data includes image data with plural pages, the similarity determination section performs the determination process in such a manner that the modified similarity is calculated with respect to each of the plural pages, a summation of similarities is calculated by adding the modified similarity corresponding to each of the plural pages, and the summation of similarities is compared with a predetermined first threshold value.

5. The image processing apparatus as set forth in claim 3, wherein the similarity determination process performs the determination process in such a manner that the input image data is divided into plural blocks, the modified similarity is calculated with respect to each of the plural blocks, a summation of similarities is calculated by adding the modified similarity corresponding to each of the plural blocks, and the summation of similarities is compared with a predetermined second threshold value.

6. An image processing apparatus, comprising:
an input data obtaining section for obtaining input image data;
a features extracting section for extracting features of the input image data;
at least one of a storage section in which features of a reference image are stored and a reference image obtaining section for obtaining features of a reference image from an external apparatus communicably connected with the image processing apparatus; and
a similarity determination section for comparing the features of the input image data with the features of the reference image so as to perform a determination process in which it is determined whether the input image data is image data corresponding to the reference image or not,
the similarity determination section changing the determination process in accordance with related information of the input image data;
a similarity calculation section for calculating a similarity between the input image data and the reference image; and a coefficient storage section in which a coefficient predetermined according to the related information is stored, the similarity determination section performing the determination process in such a manner that a similarity calculated by the similarity calculation section is modified in accordance with the coefficient to calculate a modified similarity, and the modified similarity and a predetermined threshold value are compared with each other, further comprising:

a validity input section for receiving an input of information regarding validity of a result of the determination process; and a coefficient changing section for changing the coefficient used in the determination process, in a case where the validity input section receives an input of information that the result of the determination process is false.

7. The image processing apparatus as set forth in claim 1, further comprising:

a validity input section for receiving an input of information regarding validity of a result of the determination process; and a reference evaluated value changing section for changing the reference evaluated value stored in the evaluated value storage section, in a case where the validity input section receives an input of information that the result of the determination process is false.

8. The image processing apparatus as set forth in claim 1, further comprising a condition storage section in which at least one of (i) a condition of the related information under which the determination process is performed with respect to input image data and (ii) a condition of the related information under which the determination process is not performed with respect to input image data is stored, the similarity determination section judging whether to perform the determination process or not in accordance with the related information of input image data and the condition stored in the condition storage section.

9. The image processing apparatus as set forth in claim 1, further comprising:

a similarity calculation section for calculating a similarity between the input image data and the reference image; and a weighting coefficient storage section in which a weighting coefficient set with respect to each reference image is stored, the similarity determination section performing the determination process in such a manner that a value resulting from multiplication of the similarity calculated by the similarity calculation section and the weighting coefficient corresponding to the reference image is compared with a predetermined threshold value, or in such a manner that the similarity calculated by the similarity calculation section is compared with a value resulting from multiplication of the weighting coefficient corresponding to the reference image and a predetermined threshold value.

10. The image processing apparatus as set forth in claim 1, further comprising a process restricting section for restricting input image data from being subjected to a process corresponding to a request to process the input image data, in a case where it is determined in the determination process that the input image data is image data corresponding to the reference image.

11. The image processing apparatus as set forth in claim 1, further comprising a notification process section for notifying a predetermined notification destination, in a case where it is determined in the determination process that input image data is image data corresponding to the reference image.

12. The image processing apparatus as set forth in claim 1, wherein when it is determined in the determination process that input image data is image data corresponding to the reference image, the input image data or the reference image corresponding to the input image data is stored in a predetermined storage location.

13. The image processing apparatus as set forth in claim 1, further comprising:

a storage section in which features of a reference image are stored; and a storage process section for causing the features of the reference image to be stored in the storage section, the features extracting section extracting features of a reference image, and the storage process section causing the features of the reference image that are extracted by the features extracting section to be stored in the storage section.

14. The image processing apparatus as set forth in claim 1, further comprising:

a reference image obtaining section for obtaining features of a reference image from an external apparatus communicably connected with the image processing apparatus; and a reference image output section for transmitting the features of the reference image to the external apparatus, the features extracting section extracting features of a reference image, and the reference image output section transmitting, to the external apparatus, the features of the reference image that are extracted by the features extracting section.

15. An image forming apparatus for forming an image corresponding to input image data, comprising an image processing apparatus as set forth in claim 1.

16. An image processing system, comprising an image processing apparatus and a server communicably connected with the image processing apparatus, including:

an input data obtaining section for obtaining input image data;

a features extracting section for extracting features of the input image data;

a storage section in which features of a reference image are stored; and a similarity determination section for performing a determination process in which the features of the input image data are compared with the features of the reference image so as to determine whether the input image data is image data corresponding to the reference image or not, the input data obtaining section, the features extracting section, the storage section, and the similarity determination section being divided into the image processing apparatus and the server, the similarity determination section changing the determination process in accordance with related information of the input image data, and further comprising:

an evaluated value storage section in which (i) an evaluated value set with respect to each of groups into which each item of the relation information is classified in accordance with contents of the item and (ii) a reference evaluated value set with respect to each item of the relation information are stored; and an evaluated value calculation section for calculating an evaluated value for each item of related information of input image data, in accordance with contents of each item and the evaluated value stored in the evaluated value storage section, the similarity determination section performing the determination process in such a manner that a difference between the evaluated value for each item calculated by the evaluated value calculation section and the reference evaluated value for each item is calculated with respect to each item, a summation calculated by adding each difference is compared with a third threshold value, and a similarity is determined in accordance with a result of the comparison.

17. The image processing system as set forth in claim 16, wherein
the features extracting section is included in the image processing apparatus and the similarity determination section is included in the server,
the image processing apparatus outputs the features of the input image data that are extracted by the features extracting section to the server, and
the server performs the determination process in accordance with the features from the image processing apparatus.

18. The image processing system as set forth in claim 16, wherein
the image processing apparatus includes a log generating section for generating log information regarding the input image data,
the image processing apparatus outputs the log information to the server, and
when the similarity determination section determines that the input image data is image data corresponding to the reference image, the server causes the log information to be stored in a log storage section included in the server.

19. The image processing system as set forth in claim 16, wherein
the image processing apparatus includes an image encoding section for generating encoded image data by encoding input image data,
the image processing apparatus outputs the encoded image data to the server, and
when the similarity determination section determines that the input image data is image data corresponding to the reference image, the server causes the encoded image data to be stored in an image storage section included in the server.

20. The image processing system as set forth in claim 19, wherein
the image processing apparatus includes a segmentation section for classifying input image data into a text region including a text and/or a line and a region other than the text region, and
the image encoding section encodes the text region and the region other than the text region through different encoding methods.

21. The image processing system as set forth in claim 16, wherein
the image processing apparatus includes a text identifying section for identifying text information included in input image data,
the image processing apparatus outputs the text: information to the server, and
when the similarity determination section determines that the input image data is image data corresponding to the reference image, the server causes the text information to be stored in a text information storage section included in the server.

22. The image processing system as set forth in claim 16, wherein the image processing apparatus or the server includes a notification process section for notifying a predetermined notification destination when the similarity determination section determines that input image data is image data corresponding to the reference image.

23. The image processing system as set forth in claim 16, wherein when the similarity determination section determines that input image data is image data corresponding to the reference image, the image processing apparatus or the server causes at least one of the input image data or log information regarding the input image data to be stored in a predetermined storage location.

24. The image processing system as set forth in claim 16, further comprising:
a second features extracting section for extracting features of a reference image; and
a storage process section for causing the features of the reference image that are extracted by the second features extracting section to be stored in the storage section.

25. The image processing system as set forth in claim 16, further comprising a storage process section for causing features of a reference image to be stored in the storage section,
the features extracting section extracting features of a reference image, and
the storage process section causing the features of the reference image that are extracted by the features extracting section to be stored in the storage section.

26. A non-transitory computer-readable storage medium, in which a program for causing an image processing apparatus as set forth in claim 1 to operate is stored, the program causing a computer to function as each section of the image processing apparatus.

* * * * *